(12) United States Patent
Wu et al.

(10) Patent No.: US 12,531,003 B2
(45) Date of Patent: Jan. 20, 2026

(54) METHOD FOR MANAGING PIXEL OF DISPLAY, AND ELECTRONIC DEVICE SUPPORTING SAME

(71) Applicant: Samsung Electronics Co., Ltd., Suwon-si (KR)

(72) Inventors: Yilin Wu, Suwon-si (KR); Jeonghun Kim, Suwon-si (KR); Sungyoung Shin, Suwon-si (KR); Minsuk Uhm, Suwon-si (KR); Hyunchang Shin, Suwon-si (KR); Sungdae Choi, Suwon-si (KR); Seungyeop Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 358 days.

(21) Appl. No.: 18/158,100

(22) Filed: Jan. 23, 2023

(65) Prior Publication Data

US 2023/0230521 A1 Jul. 20, 2023

Related U.S. Application Data

(63) Continuation of application No. PCT/KR2021/010060, filed on Aug. 2, 2021.

(30) Foreign Application Priority Data

Sep. 29, 2020 (KR) .................. 10-2020-0127594
Apr. 22, 2021 (KR) .................. 10-2021-0052294

(51) Int. Cl.
*G09G 3/20* (2006.01)
*G09G 3/3208* (2016.01)

(52) U.S. Cl.
CPC ......... *G09G 3/2074* (2013.01); *G09G 3/2096* (2013.01); *G09G 3/3208* (2013.01);
(Continued)

(58) Field of Classification Search
CPC ............. G09G 3/2074; G09G 3/2096; G09G 3/3208; G09G 2310/04; G09G 2320/0242;
(Continued)

(56) References Cited

U.S. PATENT DOCUMENTS 7,965,268 B2   6/2011   Gass et al.
8,144,093 B2   3/2012   Gass et al.
(Continued)

FOREIGN PATENT DOCUMENTS

KR   10-2007-0069693 A   7/2007
KR   10-1295217 B1   8/2013
(Continued)

OTHER PUBLICATIONS

Son et al (KR20180135342A ) English translation. (Year: 2018).*
(Continued)

*Primary Examiner* — Vijay Shankar
(74) *Attorney, Agent, or Firm* — Jefferson IP Law, LLP

(57) ABSTRACT

An electronic device is provided. The electronic device includes a display including a plurality of pixels, and a processor, each of a plurality of pixels may include a plurality of sub pixels, the plurality of sub pixels may include first type pixels including first type sub pixels observed at a first viewing angle, and second type pixels being adjacent to the first type pixels and including second type sub pixels observed at a second viewing angle that is smaller than the first viewing angle, and the processor configured to, for a plurality of groups including first type pixels and second type pixels, perform a control such that turn-on ratios of the first type pixels and the second type pixels in, a plurality of groups, a first group are different from turn-on ratios of those of, among the plurality of groups, a second group that is different from the first group.

21 Claims, 31 Drawing Sheets

(52) U.S. Cl.
CPC .......... *G09G 2310/04* (2013.01); *G09G 2320/0242* (2013.01); *G09G 2320/043* (2013.01); *G09G 2320/0613* (2013.01); *G09G 2320/0626* (2013.01); *G09G 2320/068* (2013.01); *G09G 2358/00* (2013.01)

(58) Field of Classification Search
CPC ..... G09G 2320/043; G09G 2320/0613; G09G 2320/0626; G09G 2320/068; G09G 2358/00; G09G 5/14; G09G 2300/0452; G09G 2320/028; G09G 2320/0686; G09G 2360/16; G09G 3/2003
See application file for complete search history.

(56) References Cited

U.S. PATENT DOCUMENTS

| | | | |
|---|---|---|---|
| 8,400,384 B2 | 3/2013 | Gass et al. | |
| 8,698,718 B2 | 4/2014 | Gass et al. | |
| 9,099,048 B2 | 8/2015 | Matsushima | |
| 9,402,073 B2 | 7/2016 | Broughton et al. | |
| 9,626,919 B2 | 4/2017 | Cao et al. | |
| 9,898,957 B2* | 2/2018 | Lin | G09G 3/2096 |
| 9,966,022 B2 | 5/2018 | Cao et al. | |
| 10,804,340 B2 | 10/2020 | Lee et al. | |
| 10,809,551 B2 | 10/2020 | Chung et al. | |
| 11,011,724 B2 | 5/2021 | Lim et al. | |
| 11,067,736 B2 | 7/2021 | Robinson et al. | |
| 12,175,928 B2* | 12/2024 | Wu | G09G 3/3208 |
| 2009/0237594 A1 | 9/2009 | Matsushima | |
| 2012/0056914 A1 | 3/2012 | Gass et al. | |
| 2015/0042769 A1 | 2/2015 | Broughton et al. | |
| 2015/0378085 A1 | 12/2015 | Robinson et al. | |
| 2017/0154563 A1* | 6/2017 | Lin | G09G 3/36 |
| 2017/0169773 A1 | 6/2017 | Cao et al. | |
| 2019/0179180 A1 | 6/2019 | Chung et al. | |
| 2019/0180664 A1 | 6/2019 | Sun et al. | |
| 2019/0214440 A1 | 7/2019 | Lee et al. | |
| 2020/0006694 A1 | 1/2020 | Lim et al. | |
| 2023/0126522 A1* | 4/2023 | Wu | G09G 3/3208 345/694 |

FOREIGN PATENT DOCUMENTS

| | | |
|---|---|---|
| KR | 10-1374098 B1 | 3/2014 |
| KR | 10-2014-0086126 A | 7/2014 |
| KR | 10-2015-0028091 A | 3/2015 |
| KR | 10-2018-0021597 A | 3/2018 |
| KR | 10-2018-0068678 A | 6/2018 |
| KR | 10-2018-0135342 A | 12/2018 |
| KR | 10-2019-0016591 A | 2/2019 |
| KR | 10-2020-0076317 A | 6/2020 |

OTHER PUBLICATIONS

Lee (KR20150028091A) English translation. (Year: 2015).*
Korean Office Action dated Dec. 10, 2024, issued in Korean Application No. 10-2021-0052294.
International Search Report dated Nov. 22, 2021, issued in International Application No. PCT/KR2021/010060.
Extended European Search Report dated Dec. 8, 2023, issued in European Patent Application No. 21875929.8.
Notice of Final Rejection dated May 7, 2025, issued in Korean Application No. 10-2021-0052294.
Notice of Allowance dated Dec. 8, 2025, issued in Korean Application No. 10-2021-0052294.

* cited by examiner

|  | 0 degree | 45 degree |
|---|---|---|
| Normal mode | 하다고 | 하다고 |
| Private mode | | |

FIG.9B

METHOD FOR MANAGING PIXEL OF DISPLAY, AND ELECTRONIC DEVICE SUPPORTING SAME

CROSS-REFERENCE TO RELATED APPLICATION(S)

This application is a continuation application, claiming priority under § 365(c), of an International application No. PCT/KR2021/010060, filed on Aug. 2, 2021, which is based on and claims the benefit of a Korean patent application number 10-2020-0127594, filed on Sep. 29, 2020, in the Korean Intellectual Property Office, and of a Korean patent application number 10-2021-0052294, filed on Apr. 22, 2021, in the Korean Intellectual Property Office, the disclosure of each of which is incorporated by reference herein in its entirety.

BACKGROUND

1. Field

The disclosure relates to control of pixels of a display. More particularly, the disclosure relates to a method for operating pixels of a display, by which a more stable display quality may be provided while a screen observation viewing angle may be adjusted, and an electronic device supporting the same.

2. Description of Related Art

A portable electronic device may be used in various environments. For example, a user of a portable electronic device may use the electronic device in various public sites, such as department stores, buses, or subways. When an electronic device is used at the above-described public sites, for example, at sites, such as subways, at which the user is close to other persons, a screen of the electronic device of the user may be identified by a third person regardless of an intention of the user.

The above information is presented as background information only to assist with an understanding of the disclosure. No determination has been made, and no assertion is made, as to whether any of the above might be applicable as prior art with regard to the disclosure.

SUMMARY

As described above, an in-use environment of an electronic device of the related art has a danger of exposing user information which a user does not open to a third person. To prevent this, a method for attaching a polarizer film on a front surface of a display of an electronic device has been suggested, but separate costs for attaching the polarizer film are necessary, and in an electronic device of a specific type, for example, in a foldable electronic device, a folding operation may become problematic when the polarizer film is attached.

Aspects of the disclosure are to address at least the above-mentioned problems and/or disadvantages and to provide at least the advantages described below. Accordingly, an aspect of the disclosure is to provide a method for operating pixels of a display, by which a more stable display quality may be provided while a screen observation viewing angle may be adjusted, and an electronic device supporting the same.

Additional aspects will be set forth in part in the description which follows and, in part, will be apparent from the description, or may be learned by practice of the presented embodiments.

In accordance with an aspect of the disclosure, an electronic device is provided. The electronic device includes a display including a plurality of pixels, and a processor that drives the display, each of a plurality of pixels may include a plurality of sub pixels, the plurality of sub pixels may include first type pixels including first type sub pixels observed at a first viewing angle, and second type pixels being adjacent to the first type pixels and including second type sub pixels observed at a second viewing angle that is smaller than the first viewing angle, and the processor may be configured to, for a plurality of groups including one or more first type pixels and one or more second type pixels, perform a control such that turn-on ratios of the first type pixels and the second type pixels in, a plurality of groups, a first group are different from turn-on ratios of those of, among the plurality of groups, a second group that is different from the first group, according to gradation values of partial areas of contents displayed by the plurality of groups.

In accordance with another aspect of the disclosure, a method for driving pixels of a display is provided. The display includes first type pixels including first type sub pixels observed at a first viewing angle, and second type pixels being adjacent to the first type pixels and including second type sub pixels observed at a second viewing angle that is smaller than the first viewing angle may include receiving a request for execution of an application, and performing a control such that, for a plurality of groups including one or more first type pixels and one or more second type pixels, turn-on ratios of first type pixels and second type pixels of, among the plurality of groups, a first group are different from turn-on ratios of those of, among the plurality of groups, a second group that is different from the first group.

In accordance with another aspect of the disclosure, a method for driving pixels of a display comprises receiving a request for execution of an application, and in response to the request for execution of the application, displaying a content by a plurality of groups including at least one pixel of the first type pixels and at least one pixel of the second type pixels, wherein the plurality of groups includes at least a first group and a second group, wherein the displaying the content comprises controlling turn-on ratios of the first type pixels and the second type pixels in the first group differently from the turn-on ratios of the first type pixels and the second type pixels in the second group that is different from the first group in response to gradation values of partial areas of the content.

In accordance with an aspect of the disclosure, an electronic device is provided. The electronic device includes a display including a plurality of pixels and a processor configured to drive the display. each of a plurality of pixels includes a plurality of sub pixels, wherein the plurality of sub pixels include first type pixels including first type sub pixels observed at a first viewing angle, and second type pixels being adjacent to the first type pixels and including second type sub pixels observed at a second viewing angle that is smaller than the first viewing angle, and wherein the processor is configured to display a content by a plurality of groups including at least one pixel of the first type pixels and at least one pixel of the second type pixels, wherein the plurality of groups includes at least a first group and a second group, wherein the processor is further configured to control turn-on ratios of the first type pixels and the second type pixels in the first group differently from turn-on ratios of the first type pixels and the second type pixels in the second group different from the first group in response to gradation values of partial areas of contents, in related to display of the content.

According to various embodiments of the disclosure, more stable display of a screen may be supported while exposure of information may be controlled according to an intention or setting of a user.

Furthermore, according to an embodiment of the disclosure, distortion of a screen may be restrained by making physical characteristics of a pixel structure of a display uniform while the display is operated in a normal mode and a narrow angle-of-view mode.

Furthermore, according to an embodiment of the disclosure, a relatively improved life span may be achieved as compared with a display including only narrow pixels related to a narrow viewing angle. For example, according to the disclosure, a burn-in phenomenon of the display may be restrained, and a burn-in phenomenon of narrow viewing angle pixels may be restrained by adjusting driving balances of wide pixels that support a relatively wide viewing angle and narrow pixels that support a relatively narrow viewing angle (a narrow viewing angle).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9B is a view illustrating a screen observation form at specific viewing angles for modes according to an embodiment of the disclosure;

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
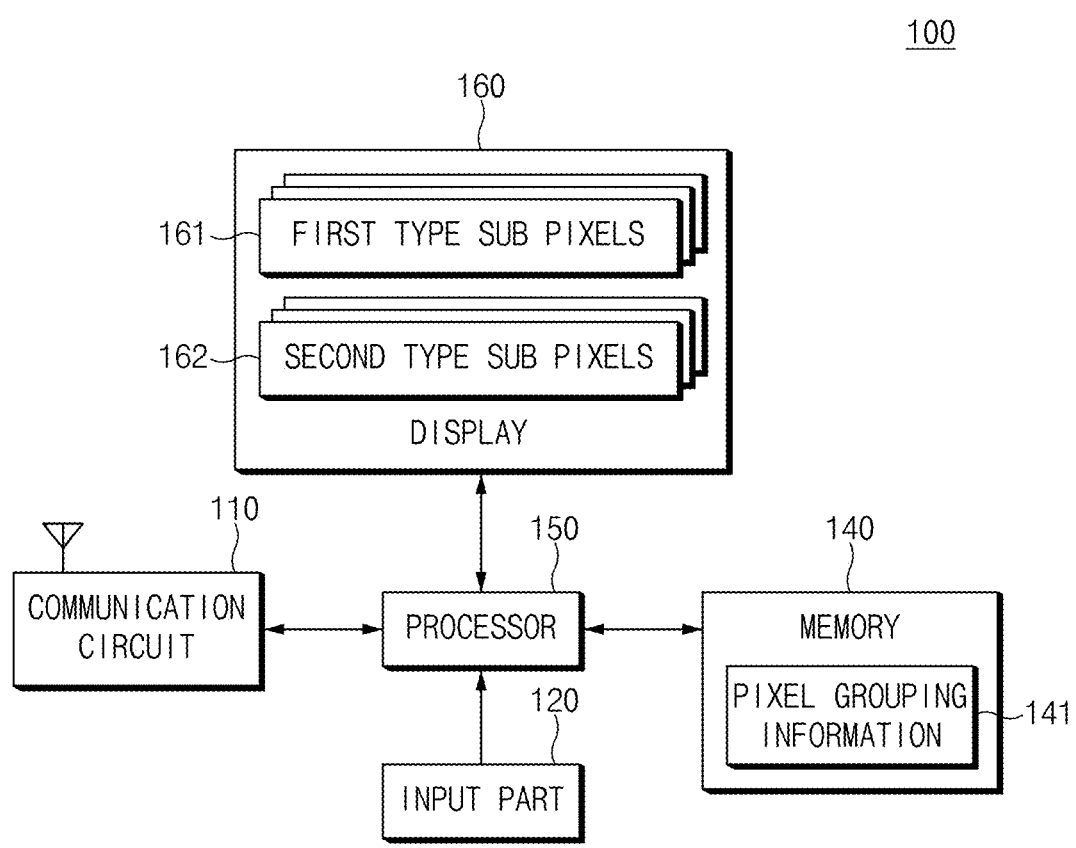
FIG. 1 is a view illustrating a configuration of an electronic device according to an embodiment of the disclosure.

FIG. 1 is a view illustrating a configuration of an electronic device according to an embodiment of the disclosure.

Referring to FIG. 1, an electronic device 100 (or a display device) according to an embodiment of the disclosure may include a communication circuit 110, an input part 120, a memory 140, a display 160 (or a display panel), and/or a processor 150. In the following description, the display 160 may include a plurality of pixels, and each of the plurality of pixels may include red, green, blue (RGB) or red, green1, green2, blue (RGGB) sub pixels. According to an embodiment of the disclosure, the plurality of pixels may be used to provide various display driving schemes (e.g., a scheme of selectively driving at least one of first type sub pixels (wide sub pixels) having light irradiation characteristics of a first viewing angle and second type sub pixels (narrow sub pixels) having light irradiation characteristics of a second viewing angle). For example, the plurality of pixels may support an operation of a normal mode, in which a screen is constituted by operating the first type sub pixels and the second type sub pixels together, an operation of a first private mode (or a first narrow viewing angle mode), in which the screen is constituted by operating only the second type sub pixels, or a second private mode, in which a screen is constituted by operating some of the second type sub pixels and some of the first type sub pixels. The second type sub pixels may include micro pixels (e.g., micro pixels of the same color) that are driven together by one electrode. The sub pixel, as mentioned above, may mean a light emitting means or a light emitting member that irradiates color, such as R, G, and B, and at least some of the light emitting means and the light emitting member may include a sub pixel structure having a plurality of configurations (e.g., configurations at least including an anode electrode, a cathode electrode, an organic light emitting layer, and a semiconductor layer). Accordingly, the term of a sub pixel may at least include a meaning of a sub pixel structure.

The communication circuit 110 may support communication functions of the electronic device 100. For example, the communication circuit 110 may support at least one of long-distance communication based on a base station of the electronic device 100 or short-distance communication. In this regard, the communication circuit 110 may include a plurality of communication modules (or circuitries) (e.g., a mobile communication module that uses a mobile communication network, such as third generation (3G), fourth generation (4G), and fifth generation (5G) networks, and a short-distance communication module that supports a short-distance communication channel, such as Bluetooth or wireless fidelity (Wi-Fi)). According to an embodiment of the disclosure, the communication circuit 110 may form a communication channel with a server according to a control of the processor 150, and may receive a webpage or information (e.g., contents) provided by a server. A driving scheme (e.g., a first private mode, a second private mode, or a normal mode) of the display 160 according to a kind (e.g., a short-distance communication channel or a long-distance communication channel) of a communication channel formed based on the communication circuit 110. Furthermore, a scheme of driving the display 160 may be changed according to a kind of a server accessed through the communication circuit 110 or a kind of the information received through the communication circuit 110.

The input part 120 may support input functions of the electronic device 100. For example, the input part 120 may include at least one of at least one physical buttons, an electronic pen, a microphone that receives a voice input by a user, a touch means, or a sensor. When the display 160 includes a touch input function, the display 160 may be included in a configuration of the input part 120. The input part 120 may generate a set input signal related to the scheme of driving the display 160 according to a control of the user, and may deliver the signal to the processor 150. Furthermore, the input part 120 may generate an input signal that requests execution of at least one application or execution of contents installed in the electronic device 100 according to a control of the user, and may deliver the signal to the processor 150.

The memory 140 may store at least one of data, a program, or an application related to an operation of the electronic device 100. According to an embodiment of the disclosure, the memory 140 may store set information related to the scheme of driving the display 160. The set information, for example, may include information for selecting the scheme of driving the display 160 according to an operation environment (e.g., a kind of an application that is being executed or an operation state of the communication circuit 110) of the electronic device 100. According to various embodiments of the disclosure, the setting information may include an app list. The app list may include at least one application and information for determining the scheme of driving the display 160 when the at least one application is executed. According to various embodiments of the disclosure, the app list may include information for determining a driving scheme of the display 160 when at least one content is executed. The scheme of driving the display, for example, may include a first driving scheme, a second driving scheme, or a third driving scheme. The first driving scheme may include a scheme of turning on all of the first type sub pixels 161 (or a first pixel group or a first type pixel set) of the display 160 and second type sub pixels 162 (or a second pixel group or a second type pixel set) for driving. The second driving scheme may include a scheme of turning off the first type sub pixels 161 and turning on the second type sub pixels 162 for driving. The third driving scheme may include a scheme of turning off some of the first type sub pixels 161 and turning on at least some of the second type sub pixels 162 for driving. In relation to the third driving scheme, the memory 140 may include pixel grouping information 141. The pixel grouping information 141 may include grouping information, in which a specific number of the first type sub pixels 161 and a specific number of the second type sub pixels 162 are grouped. For example, the pixel grouping information 141 may include grouping information, in which a plurality of first type sub pixels 161 and a plurality of second type sub pixels 162 are grouped. Furthermore, the pixel grouping information 141 may include matrix size information (e.g., 2×2, 4×4, 8×8, 1×4, 2×4, . . . ) including the first type sub pixels 161 and the second type sub pixels 162, which are alternately disposed while being adjacent to each other. The pixel grouping information 141 may vary according to a kind of the application or characteristics of the content screen. The pixel grouping information 141 may be generated by the processor 150 to be stored, or may be stored in application information to be provided.

The display 160 may include at least one screen related to an operation of the electronic device 100. According to an embodiment of the disclosure, the display 160 may output a screen that displays the set information related to the driving scheme or a screen related to change of the set information. For example, the display 160 may output an app list display screen, a driving scheme display screen according to the app list, an app addition or deletion screen, a driving scheme change screen according to an app, or a content list display screen. When the display 160 is operated according to the first driving scheme, a screen output through the display 160 may be observed within a first viewing angle. When the display 160 is operated according to the second driving scheme, a screen output through the display 160 may be observed within a second viewing angle that is smaller than the first viewing angle. When the display 160 is operated according to the third driving scheme, a screen output through the display 160 may be observed within a viewing angle that is smaller than the first viewing angle and is equal to or larger than the second viewing angle. According to an embodiment of the disclosure, the third driving scheme may provide an excellent luminance performance or an excellent contrast performance as compared with the second driving scheme by turning on some of the first type sub pixels 161 having an excellent luminance performance as compared with the second type sub pixels 162. To support the above-described driving schemes, the display 160 may include the first type sub pixels 161 and the second type sub pixels 162. The first type sub pixels 161 may irradiate the light such that the screen may be observed at the first viewing angle. The second type sub pixels 162 may irradiate the light such that the screen may be observed at the second viewing angle that is smaller than the first viewing angle.

The processor 150 may perform delivery and signal processing of data related to an operation of the electronic device 100. According to an embodiment of the disclosure, the processor 150 may determine a scheme of driving the display 160 according to a kind of a communication channel formed through the communication circuit 110. For example, the processor 150 may drive the display 160 according to a first driving scheme when the display 160 is driven as a base station-based communication channel is formed, and may drive the display 160 according to the second driving scheme or the third driving scheme when the display 160 is driven as a short-range communication channel is formed According to an embodiment of the disclosure, the processor 150 may determine a scheme of driving the display 160 according to a kind of a sever accessed through the communication circuit 110. For example, the processor 150 may drive the display 160 according to the first driving scheme when the accessed server is a portal site, and may drive the display 160 according to the second driving scheme or the third driving scheme when the accessed server is a finance or stock site. According to an embodiment of the disclosure, the processor 150 may determine a scheme of driving the display 160 according to a kind of information received through the communication circuit 110. For example, the processor 150 may drive the display 160 according to the first driving scheme when the information received through the communication circuit 110 is a general message or information, and may drive the display 160 according to the second driving scheme or the third driving scheme when the information received through the communication circuit 110 is security information (or an information transmission/reception channel through the communication circuit 110 is a security channel).

According to an embodiment of the disclosure, the processor 150 may determine the scheme of driving the display 160 according to a kind of an application that is being executed. For example, the processor 150 may drive the display 160 according to the first driving scheme when output of a screen according to execution of a web application is requested, and may drive the display 160 according to the second driving scheme or the third driving scheme when output of a screen according to execution of a gallery, mail, or messenger application.

According to an embodiment of the disclosure, the processor 150 may change the scheme of driving the display 160 according to a user input or a change in setting. For example, when a user input for changing the scheme of driving the display 160 is received from the input part 120, the display 160 having an input function, or a microphone, the scheme of driving the display 160 may be changed according to the corresponding input.

According to an embodiment of the disclosure, the processor 150 may change the scheme of driving the display 160 according to information of a sensor. In this regard, the electronic device 100 may further include a sensor (e.g., an illumination sensor). For example, the processor 150 may drive the display 160 according to the first driving scheme when an external intensity of light is a specific value or more (e.g., in the case of an exterior environment), and may drive the display 160 according to the second driving scheme or the third driving scheme when the external intensity of light is less than the specific value (e.g., in the case of an interior environment). As another example, the sensor may include at least one of a fingerprint sensor, an iris sensor, a gesture sensor, a gyro sensor, an atmosphere sensor, a magnetic sensor, an acceleration sensor, a grip sensor, a proximity sensor, a color sensor, an infrared (IR) sensor, a biometric sensor, a temperature sensor, or a humidity sensor, and the processor 150 may drive the display 160 in the second driving scheme or the third driving scheme based on the sensor information collected by the sensor.

According to various embodiments of the disclosure, in an operation in the second driving scheme (e.g., a narrow viewing angle mode), the processor 150 may perform a control to turn off the first type sub pixels 161 or display a color of a specific gradation value (e.g., a black color of a gradation value of a specific value or less (e.g., 10 or less). According to various embodiments of the disclosure, the processor 150 may adjust at least one of the values or the colors of the specific gradation values of the first type sub pixels 161 as the brightness of the display 160 is adjusted. For example, when an event related to adjustment of the brightness occurs according to a user input or according to an operation of a specific application, the processor 150 may adjust at least one of the values or colors of the specific gradation values of the first type sub pixels 161 according to the event. When the processor 150 is operated in the second driving scheme (e.g., the narrow viewing angle mode), shadow rates of the first type sub pixels 161 may be operated to be lower than the shadow rates of the first type sub pixels 161 in a normal mode.

According to various embodiments of the disclosure, the processor 150 may include an application processor related to driving of the electronic device 100. Alternatively, the processor 150 may include a display driver integrated circuit (IC) (DDI) that controls driving of the display 160 in correspondence to a control of the application processor (AP). The above-described determination of the driving method may be processed by at least one of the AP or the DDI. Alternatively, when the driving scheme is determined according to an input by a user, or a kind of contents or an application that is executed, the driving of the pixels may be controlled by the DDI in correspondence to the control of the AP.

According to various embodiments of the disclosure, the processor 150 may make a turn-on control or a turn-off control of the pixels grouped according to the gradation values (or grayscales) of the output screen different in relation to an operation of the third driving scheme. For example, the processor 150 may turn on only the second type sub pixels 162 in a display area, in which a relatively high gradation value is expressed. The processor 150 may set, among the turn-on ratios of the first type sub pixels 161 and the second type sub pixels 162, the turn-on ratios of the first type sub pixels 161 to be higher in a display area, in which a relatively low gradation value is expressed. The processor 150 may set, among the turn-on ratios of the first type sub pixels 161 and the second type sub pixels 162, the turn-on ratios of the first type sub pixels 161 to be lower or the same in a display area, in which a gradation value between the higher gradation value and the lower gradation value is expressed. Based on the above-described control, the processor 150 may perform a control such that contrast decays of the display areas, in which different gradation values are displayed, is viewed as the same brightness decay at a specific observation viewing angle (e.g., about 45 degrees) or less.

According to various embodiments of the disclosure, the processor 150 may make grouping ratios or grouping sizes of the first type pixels (e.g., the first type RGB (or RGGB) sub pixels) (wide pixels) and the second type pixels (e.g., the second type RGB (or RGGB) sub pixels) (narrow pixels), according to the kind of the application or the kind of the content screen. According to an embodiment of the disclosure, the processor 150 may set the grouping size to be relatively large or a specific value or more when there are many content partial areas of a relatively low gradation or a low gradation value of a specific value or less. Alternatively, the processor 150 may set the grouping size to be relatively large or a specific value or more when there are many content partial areas of a relatively high gradation or a high gradation value of a specific value or more. According to various embodiments of the disclosure, the processor 150 may set the grouping size to be relatively small when there are many content partial areas of the middle gradation value. In one screen, the grouping size also may vary.

Figure 2A:
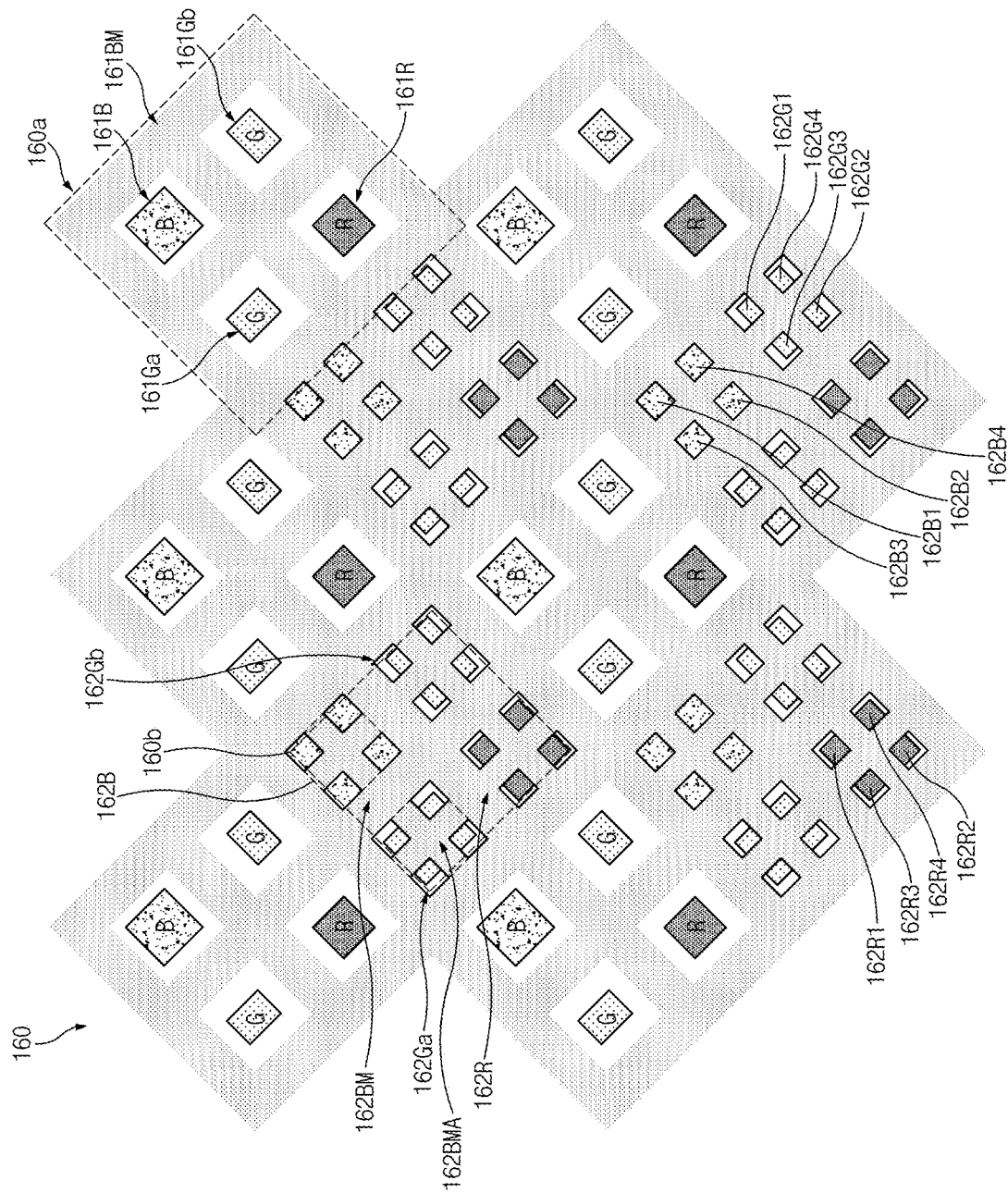
FIG. 2A is a view illustrating some pixel structures of a display device according to an embodiment of the disclosure.
Figure 2B:
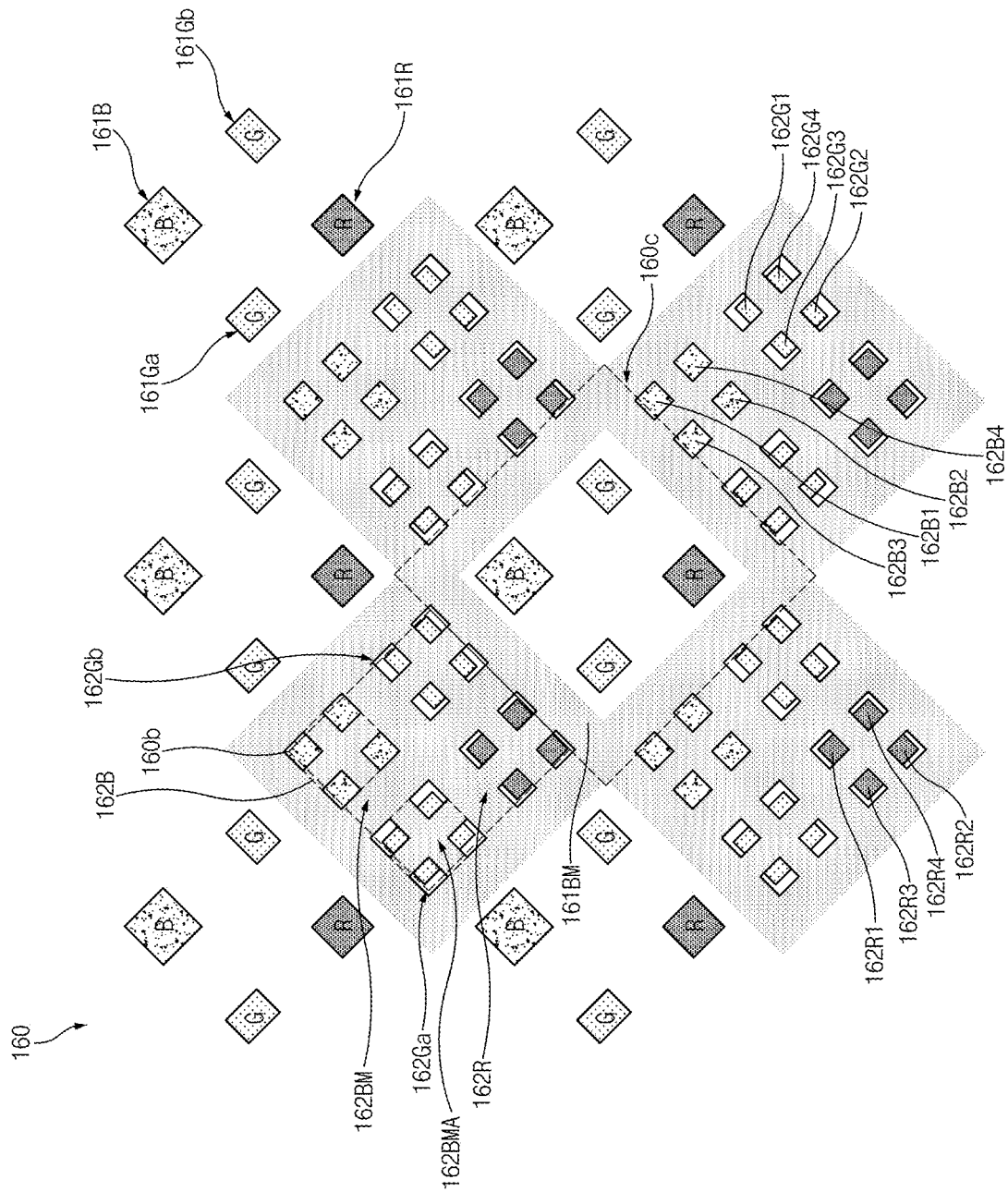
FIG. 2B is a view illustrating some pixel structures of the display device according to an embodiment of the disclosure.

FIG. 2A is a view illustrating some pixel structures of a display device according to an embodiment of the disclosure. FIG. 2B is a view illustrating some pixel structures of the display device according to an embodiment of the disclosure.

Referring to FIGS. 2A and 2B, in the display 160 according to an embodiment of the disclosure, the first type sub pixels 161 and the second type sub pixels 162 may be alternately disposed. Prior to a description, in the illustrated drawings, a structure, in which the first type sub pixels 161 and the second type sub pixels 162 are alternately disposed, but the disclosure is not limited thereto. For example, a disposition ratio of the first type sub pixels 161 and the second type sub pixels 162 may be changed. For example, a structure for disposing pixels of the display 160 according to an embodiment may include a structure, in which one first type sub pixel 161 is disposed while two second type sub pixels 162 are disposed or vice versa.

According to an embodiment of the disclosure, the display 160 may include first type pixels 160a and second type pixels 160b. Each of the first type pixels 160a may include first type sub pixels 161R, 161B, 161Ga, and 161Gb, at least some of which have different sizes. For example, light emission areas of, among the first type sub pixels 161R, 161B, 161Ga, and 161Gb, the first type blue sub pixels 161B are larger than the light emission areas of the first type red sub pixels 161R, and the light emission areas of the first type red sub pixels 161R may be larger than the light emission areas of the first type green sub pixels 161Ga and 161Gb. According to various embodiments of the disclosure, among the first type sub pixels, the first type green sub pixels 161Ga and 161Gb may have the same size.

As illustrated in FIG. 2A, first shield members 161BM (e.g., a black matrix (BM)) may be disposed between a periphery of the first type pixel 160a and the first type sub pixels 161R, 161B, 161Ga, and 161Gb. The first shield members 161BM may have a specific thickness and a specific width, and may be disposed on the first type sub pixels 161R, 161B, 161Ga, and 161Gb. With respect to a direction that is perpendicular to a front surface of the display 160, the first shield member 161BM may be disposed at a location that is spaced apart from peripheries of the first type sub pixels 161R, 161B, 161Ga, and 161Gb. According to various embodiments of the disclosure, an opening formed by the shield members 161BM, 162BM, 162BMA of the first type pixel 160a and the second type pixel 160b may be filled with color filters for colors. According to an embodiment of the disclosure, in a pixel structure of the openings formed by the shield members of the first type sub pixels and the second type sub pixels (or micro pixels) and filled with the color filters, no polarizing plate (polarizing film) is prevent between an encapsulation layer (e.g., a thin film encapsulation (TFE)) and a window (e.g., a light transmission protecting layer) of the display 160 and the shield member may function to prevent visual recognition of areas, except for pixels, due to the exterior light.

According to various embodiments of the disclosure, as illustrated in FIG. 2B, the modified first type pixel 160c may include a first shield member 161BM that is disposed at a periphery of the pixel. According to various embodiments of the disclosure, the modified first type pixel 160c may include a structure, in which not separate shield member is disposed at a periphery of the pixel. Accordingly, in the modified first type pixel 160c, no first shield member 161BM may be disposed between the first type sub pixels 161R, 161B, 161Ga, and 161Gb. Meanwhile, the modified first type pixel 160c may have a structure, in which the second shield members 162BM disposed in relation to the second type pixel 16-b are disposed to surround a periphery of the pixel while being surrounded by the second type pixel 16-b. Accordingly, the first shield member 161BM of the modified first type pixel 160c may be substantially at least a portion of the second shield member 162BM of the second type pixel 160b or may be the same configuration as the second shield member.

According to an embodiment of the disclosure, each of the second type pixels 160b may include first type sub pixels 161R, 162B, 161Ga, and 161Gb, at least some of which have different sizes. Among the second type sub pixels 162R, 162B, 162Ga, and 162Gb, a second type blue sub pixel 162B may include a first blue micro pixel 162B1, a second blue micro pixel 162B2, a third blue micro pixel 162B4, and a fourth blue micro pixel 162B4. The second type red sub pixel 162R may include a first red micro pixel 162R1, a second red micro pixel 162R2, a third red micro pixel 162R3, and a fourth red micro pixel 162R4. The second type green sub pixels 162Ga and 162Gb may include a first green micro pixel 162G1, a second green micro pixel 162G2, a third green micro pixel 162G3, and a fourth green micro pixel 162G4. According to various embodiments of the disclosure, among the second type sub pixels, the second type green sub pixels 162Ga and 162Gb may have the same size.

According to various embodiments of the disclosure, the second shield members 162BM (e.g., black matrices (BMs)) may be disposed between a periphery of the second type pixel 160b and peripheries of the second type sub pixels 162R, 162B, 162Ga, and 162Gb, and the third shield members 162BMA may be disposed to divide areas of the second type sub pixels 162R, 162B, 162Ga, and 162Gb. The second shield members 162BM may have a specific thickness and a specific width, and may be disposed around the second type sub pixels 162R, 162B, 162Ga, and 162Gb. With respect to a direction that is perpendicular to a front surface of the display 160, the second shield member 162BM may be disposed at a location that is spaced apart from peripheries of the second type sub pixels 162R, 162B, 162Ga, and 162Gb. The third shield member 162BMA may have a thickness and a width that are the same as or similar to those of the second shield member 162BM. Furthermore, the third shield member 162BMA may have a width that is smaller than that of the second shield member 162BM. According to an embodiment of the disclosure, the second shield member 162BM may shield the light that is input from an outside. The second shield member 162BM and the third shield member 162BMA may be formed of the same material. The second shield member 162BM and the third shield member 162BMA may be disposed on the same layer or may be integrally implemented.

According to various embodiments of the disclosure, sizes of opening areas (e.g., areas opened by the shield members) of the first blue micro pixel 162B1, the red micro pixel 162R1, and the green micro pixel 162G1 may be the same or similar. In this condition, the light emission area of the first blue micro pixel 162B1 may be larger than the light emission area of the first red micro pixel 162R1, and the light emission area of the first red micro pixel 162R1 may be larger than the light emission area of the green micro pixel 162G1.

The drawing illustrated in FIG. 2A illustrates a display of a pen tile structure, in which fourth sub pixels constitute one pixel, but the disclosure is not limited thereto. A disposition structure of the first type pixel 160a and the second type pixel 160b according to an embodiment of the disclosure also may be applied to the display 160 of a stripe structure. According to various embodiments of the disclosure, the second type sub pixels 162R, 162B, 162Ga, and 162Gb may include different numbers of micro pixels. For example, each of the second type blue sub pixel 162B and the second type red sub pixel 162R may include four micro pixels, and each of the second type green sub pixels 162Ga and 162Gb may include two micro pixels, but the disclosure is not limited thereto.

Figure 2C:
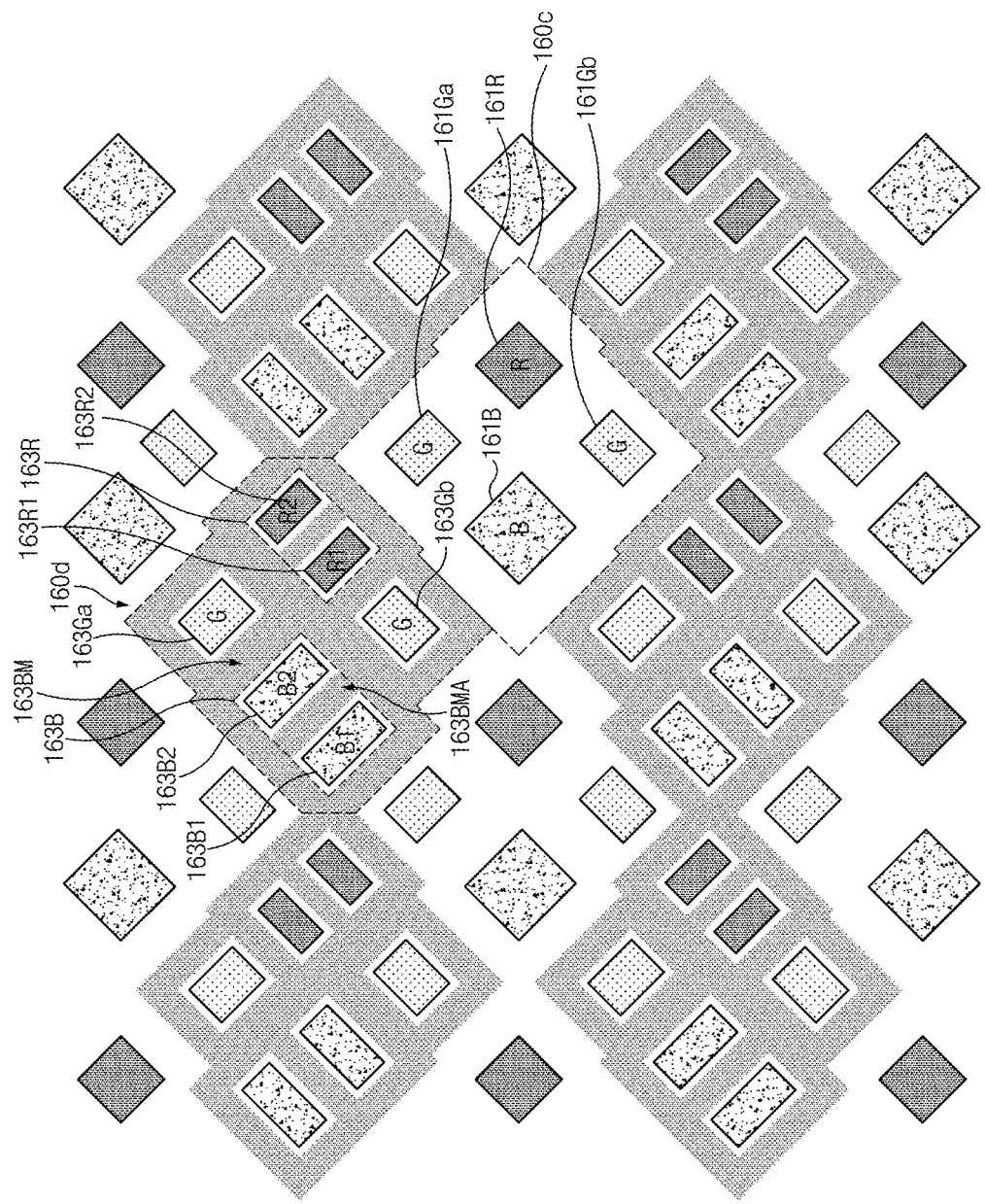
FIG. 2C is a view illustrating some pixel structures of the display device according to an embodiment of the disclosure.

FIG. 2C is a view illustrating some pixel structures of the display device according to an embodiment of the disclosure.

Referring to FIG. 2C, in the display 160 according to an embodiment of the disclosure, the modified first type pixels 160c and the third type pixels 160d may be alternately disposed. Prior to a description, in the illustrated drawings, a structure, in which the first type pixels 160c and the third type pixels 160d are alternately disposed, but the disclosure is not limited thereto. For example, a disposition ratio of the first type pixels 160c and the third type pixels 160d may be changed. For example, a structure for disposing pixels of the display 160 according to an embodiment may include a structure, in which one first type pixel 160c is disposed while two third type pixels 160d are disposed or vice versa. According to various embodiments of the disclosure, in the display 160, pixels of the type that has been described above in FIGS. 2A and 2B may be configured together. For example, at least a partial area of the display 160 may include a structure, in which the first type pixels 160c, the second type pixels 160b (or 160c), and the third type pixels 160d are alternately disposed.

According to an embodiment of the disclosure, each of the modified first type pixels 160c may include first type sub pixels 161R, 161B, 161Ga, and 161Gb, at least some of which have different sizes. For example, a light emission area of, among the first type sub pixels 161R, 161B, 161Ga, and 161Gb, a first type blue sub pixel 161B may be larger a light emission area of a first type red sub pixel 161R, and a light emission area of the first type red sub pixel 161R may be larger than a light emission area of first type green sub pixels 161Ga and 161Gb. According to various embodiments of the disclosure, among the first type sub pixels, the first type green pixels 161Ga and 161Gb may have the same size. According to an embodiment of the disclosure, a separate shield member may be excluded between a periphery of the modified first type pixels 160c and the first type sub pixels 161R, 161B, 161Ga, and 161Gb. According to various embodiments of the disclosure, a separate shield member may be excluded only between the first type sub pixels 161R, 161B, 161Ga, and 161Gb, and the shield member may be disposed at a periphery of the modified first type pixel 160c. According to various embodiment of the disclosure, because one modified first type pixel 160c is disposed to be surrounded by fourth third type pixels 160d, at least some of the shield members disposed in the third type pixel 160d may be disposed at a periphery of the first type pixel 160c.

According to various embodiments of the disclosure, an opening formed by the shield members 163BM and 163BMA of the third type pixel 160d may be filled with color filters for colors. According to an embodiment of the disclosure, in a pixel structure of the openings formed by the shield members of the third type sub pixels 163B, 163R, 163Ga, and 163Gb (or intermediate type micro pixels) and filled with the color filters, no polarizing plate (polarizing film) is prevent between an encapsulation layer (e.g., a TFE)

and a window (e.g., a light transmission protecting layer) of the display 160 and the shield member may function to prevent visual recognition of areas, except for pixels, due to the exterior light.

According to an embodiment of the disclosure, each of the third type pixels 160d may include third type sub pixels 163R, 163B, 163Ga, and 163Gb, at least some of which have different sizes. According to various embodiments of the disclosure, among the third type sub pixels, the third type green pixels 163Ga and 163Gb may have the same size. Among the third type sub pixels 163B, 163R, 163Ga, and 163Gb, the third type blue sub pixel 163B may include a fifth blue micro pixel 163B1 and a sixth blue micro pixel 163B2. A sum of sizes of the fifth blue micro pixel 163B1 and the sixth blue micro pixel 163B2 may be the same as a size of the blue sub pixel 161B of the modified first type pixel 160c or may be larger than that by a specific size. The third type red sub pixel 163R may include a fifth red micro pixel 163R1 and a sixth red micro pixel 163R2. A sum of sizes of a fifth red micro pixel 163R1 and a sixth red micro pixel 163R2 may be the same as a size of the red sub pixel 161R of the first type pixel 160c or may be larger than that by a specific size. The third type pixel 160d may include the green sub pixels 162Ga and 162Gb. The size of the green sub pixels may be the same as that of the green sub pixels included in the modified first type pixel 160c.

According to various embodiment of the disclosure, the shield members 163BM and 163BMA (e.g., black matrixes (BMs)) may be disposed between a periphery of the third type pixel 160d and peripheries of the third type sub pixels 163R, 163B, 163Ga, and 163Gb. The sizes of the openings (e.g., the openings filled with an insulation material and in an aspect that the light may pass therethrough) formed by the shield members 164BM and 163BMA may be larger than those of the micro pixels 163R1, 163R2, 163B1, and 163B2 and those of the green sub pixels 163Ga and 163Gb. The size of the first red micro pixel 162R1 of the above-described second type pixel 160b may be the same as or larger than a half of the size of the fifth red micro pixel 163R1 described in the third type pixel 160d Similarly, the size of the first blue micro pixel 162B2 of the second type pixel 160b may be the same as or larger than a half of the size of the fifth blue micro pixel 163B1 described in the third type pixel 160d. As described above, according to the display 160 including the third type pixel 160d, because a relatively large micro pixel may be applied as compared with the micro pixel described in FIGS. 2A and 2B, a design thereof may be easy and a lifespan performance of OLEDs may be improved. Furthermore, when the third type pixel 160d is applied to the entire display 160, a relatively excellent high resolution may be applied, and visibility and screen quality (e.g., color deviation) may be improved.

Figure 3A:
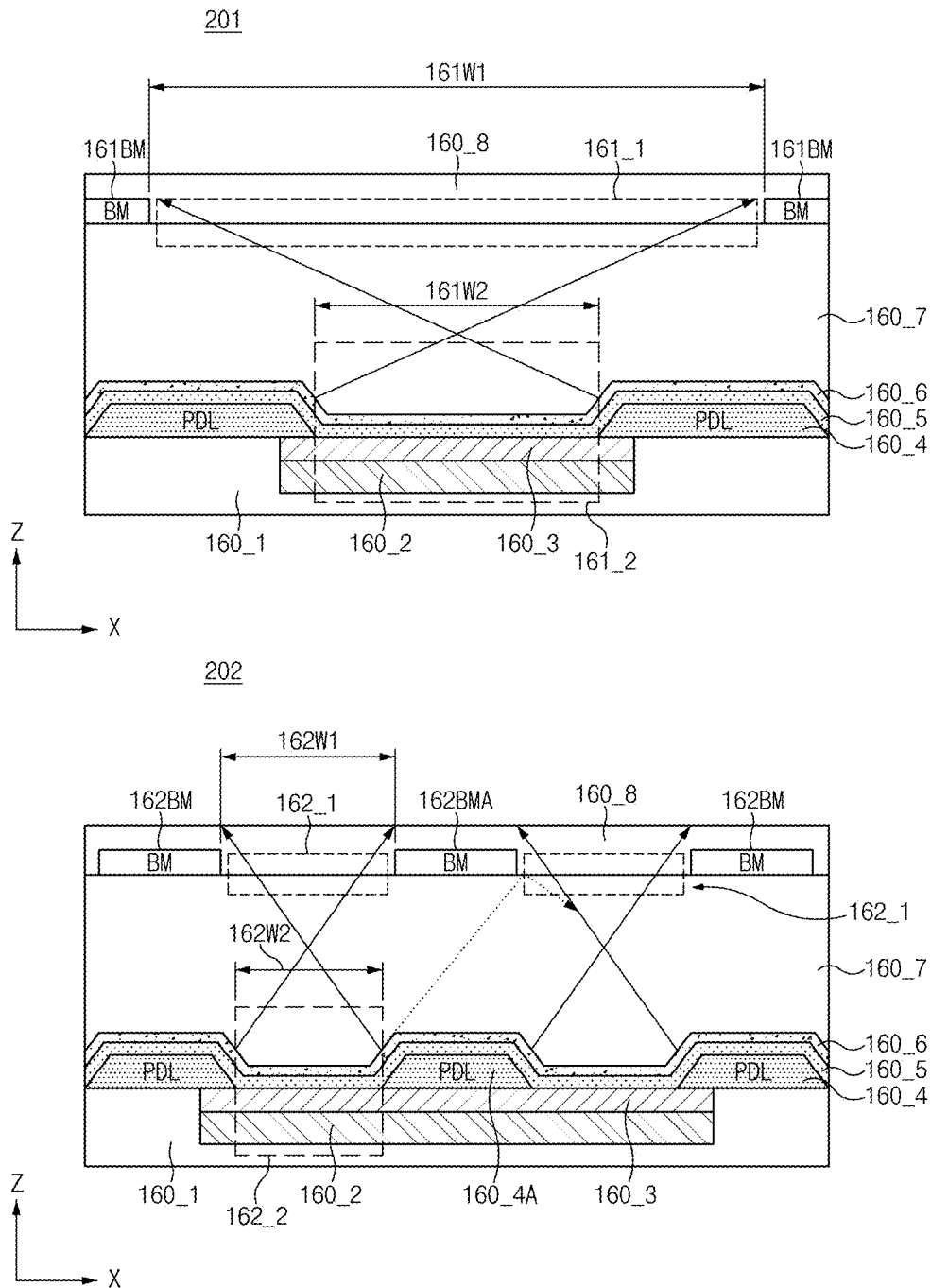
FIG. 3A is a view illustrating a stack structure of sub pixels for types thereof according to an embodiment of the disclosure.
Figure 3B:
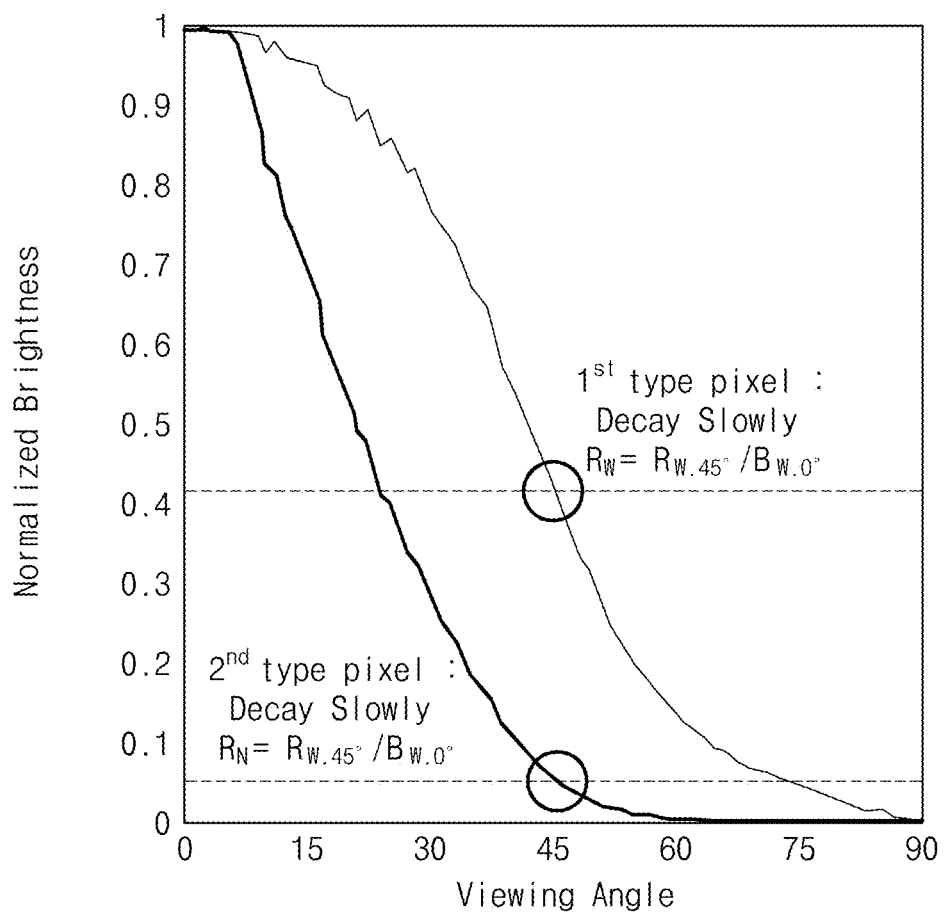
FIG. 3B is a view illustrating luminance characteristics according to an angle of first type sub pixels and second type sub pixels according to an embodiment of the disclosure.
Figure 3C:
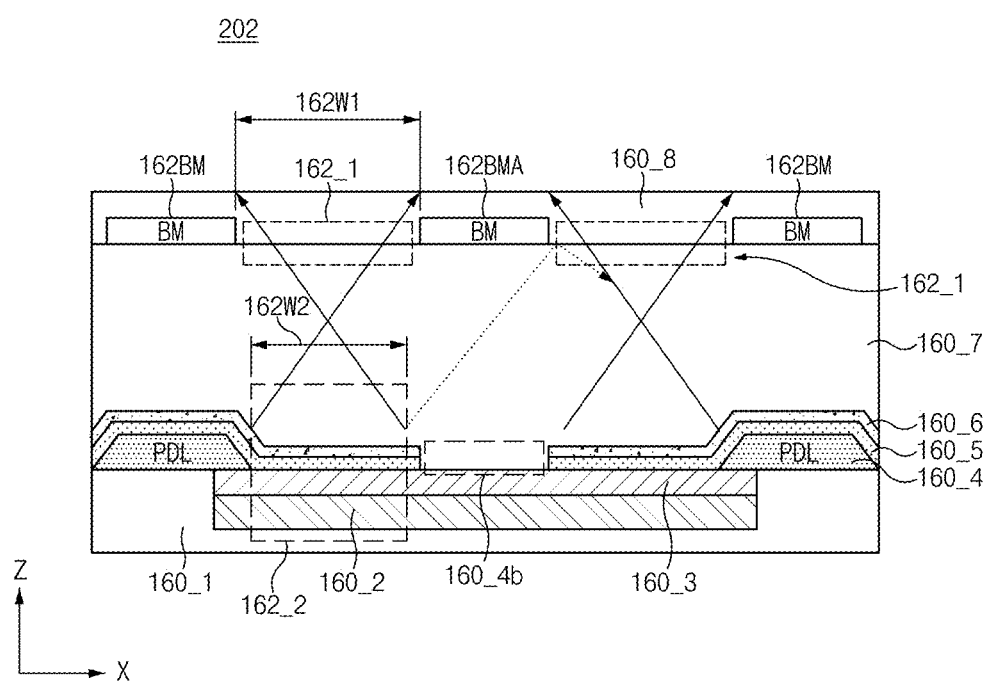
FIG. 3C is a view illustrating a stack structure of second type sub pixels according to an embodiment of the disclosure.

FIG. 3A is a view illustrating a stack structure of sub pixels for types thereof according to an embodiment of the disclosure. FIG. 3B is a view illustrating luminance characteristics according to angles of the first type sub pixel and the second type sub pixel according to an embodiment of the disclosure. FIG. 3C is a view illustrating a stack structure of a second type sub pixel according to an embodiment of the disclosure.

Referring to FIGS. 2A and 3A, a first type sub pixel structure 201 (e.g., a pixel structure corresponding to the first type blue sub pixel 161B of FIG. 2A or 2B, the first type red sub pixel 161R, and the first type green sub pixels 161Ga and 161Gb) corresponding to the first type sub pixel 161 may include a substrate part 160_1, a semiconductor layer 160_2, a first electrode 160_3 (e.g., an anode), a pixel definition member 160_4 (e.g., a pixel definition layer (PDL)), an organic light emitting layer 160_5, a second electrode 160_6 (e.g., a cathode), an encapsulation layer 160_7, a light transmission protecting layer 160_8, and/or a second shield member 162BM. The substrate part 160_1 may be formed of a deflectable material. For example, the substrate part 160_1 may be formed of a material, such as polyimide or acryl, which may be deflected. In various embodiments of the disclosure, the substrate part 160_1 may include at least one of polyethylene terephthalate, polymethyl methacrylate, polyamide, polyimide, polypropylene, or polyurethane. In various embodiments of the disclosure, the substrate part 160_1 may include a plurality of layers.

According to an embodiment of the disclosure, the semiconductor layer 160_2 may be disposed on the substrate part 160_1. The semiconductor layer 160_2 may be based on low temperature polycrystalline silicon (LTPS). The semiconductor layer 160_2 may be deposited under the first electrode 160_3. The first electrode 160_3 may be disposed on the semiconductor layer 160_2, and may form an electric field together with the second electrode 160_6 as the semiconductor layer 160_2 is driven. The pixel definition member 160_4 may be disposed to surround at least a portion of a periphery of the first electrode 160_3. The organic light emitting layer 160_5 may be deposited to cover at least the pixel definition member 160_4 and the first electrode 160_3. The second electrode 160_6 may be deposited on the organic light emitting layer 160_5. The first electrode 160_3 and the second electrode 160_6 may receive electric power to form an electric field according to a control of the semiconductor layer 160_2. In this case, organic materials disposed in the organic light emitting layer 160_5 may irradiate light by emitting light according to an influence of the electric field. The organic light emitting layer 160_5 may be formed to irradiate any one of blue light, red light, and green light.

According to various embodiments of the disclosure, the encapsulation layer 160_7 may be disposed to cover an upper side of the second electrode 160_6. The encapsulation layer 160_7, for example, may be formed of a thin film encapsulation (TFE). As the encapsulation layer 160_7 is disposed, an air gap may be excluded between the light transmission protecting layer 160_8 and the second electrode 160_6. According to various embodiments of the disclosure, the display 160 may be a flexible display. The encapsulation layer 160_7 may further include a touch panel or an MLP structure (a micro light control pattern) (or a material having a specific permittivity and a specific thickness between a panel and a pol, or an organic film or an inorganic film as a light path adjusting film) The encapsulation layer 160_7 may seal the second electrode 160_6 by covering the entire upper surface of the second electrode 160_6. The encapsulation layer 160_7 may prevent introduction of exterior moisture and oxygen by sealing the second electrode 160_6. The encapsulation layer 160_7 may include a plurality of layers, and may include a triple layer, in which an inorganic film, an organic film, and an inorganic film are sequentially located. The light transmission protecting layer 160_8 disposed on the encapsulation layer 160_7 may be formed of flexible polyimide, acryl, or thin tempered glass that may be bent, and may have a permittivity of a specific value or more. In various embodiments of the disclosure, the light transmission protecting layer 160_8 may include at least one of polyimide (PI), polyethylene (PET), polyurethane (PU), cellulose triacetate (TAC), or ultra-thin glass (UTG).

According to an embodiment of the disclosure, the first shield member 161BM may be disposed between the encapsulation layer 160_7 and the light transmission protecting layer 160_8. At least a portion of the first shield member 161BM may be disposed to overlap the pixel definition member 160_4 in a first direction (the z axis direction) (or a direction that faces the front surface of the display 160 while being perpendicular thereto or a direction that faces from an upper surface to a lower surface of the display 160 while being perpendicular thereto) that is perpendicular to the front surface of the display. According to an embodiment of the disclosure, with respect to the first direction (the z axis direction), the first shield member 161BM may be disposed to cover a portion of a periphery (e.g., a periphery in an outward direction with respect to the first electrode 160_3) of the pixel definition member 160_4. The first type sub pixel structure 201 may include a first opening 161_1 of a first size 161W1 formed by the first shield member 161BM. According to various embodiments of the disclosure, the first opening 161_1 may be formed as at least a portion of the light transmission protecting layer 160_8. According to various embodiments of the disclosure, the first opening 161_1 may be filled with a color filter. The first type sub pixel structure 201 may include an area, in which the pixel definition member 160_4 is not applied, as a light irradiation area of the light emitting member including the light emission area 161_2 (e.g., the semiconductor layer 160_2) of a second size 161W2, at least a portion of the first electrode 160_3, at least a portion of the organic light emitting layer 160_5, and at least a portion of the second electrode 160_6. The first opening 161_1 of the first size 161W1 may have a size that is larger than the light emission area 161_2 of the second size 161W2. Accordingly, the first type sub pixel structure 201 may support a normal mode, in which the screen of the display 160 may be watched at the first viewing angle.

A second type sub pixel structure 202 (e.g., a pixel structure corresponding to the second type blue sub pixel 162B of FIG. 2A or 2B, the second type red sub pixel 162R, and the second type green sub pixels 162Ga and 162Gb) corresponding to the second type sub pixel 162 may include a substrate part 160_1, a semiconductor layer 160_2, a first electrode 160_3 (e.g., an anode), a pixel definition member 160_4, an additional pixel definition member 160_4A (e.g., a photosensitive material or photoresist), an organic light emitting layer 160_5, a second electrode 160_6 (e.g., a cathode), an encapsulation layer 160_7, a light transmission protecting layer 160_8, a second shield member 162BM and/or a third shield member 162BMA. Second openings 162_1 of a third size 162W1 may be formed between the second shield member 162BM and the third shield member 162BMA. According to various embodiments of the disclosure, the second opening 162_1 may be formed as at least a portion of the light transmission protecting layer 160_8. According to various embodiments of the disclosure, the second opening 162_1 may be filled with a color filter.

The substrate part 160_1 may have the same configuration as that of the substrate part 160_1 described above in the first type sub pixel structure 201. Furthermore, the semiconductor layer 160_2 may be disposed on the substrate part 160_1 in a form of a matrix. The first electrode 160_3 may be disposed on the semiconductor layer 160_2. The first electrode 160_3 may be disposed on the semiconductor layer 160_2, and may form an electric field together with the second electrode 160_6 as the semiconductor layer 160_2 is driven. The pixel definition member 160_4 may be disposed to surround at least a portion of a periphery of the first electrode 160_3. The additional pixel definition member 160_4A may be disposed to divide the light emission areas 162_2 of a fourth size 162W2 of the second type sub pixel structure 202. For example, the additional pixel definition member 160_4A may be disposed to cross a central portion of the first electrode 160_3. The pixel definition member 160_4 and the additional pixel definition member 160_4A may be formed of the same material and through the same process. As the additional pixel definition member 160_4A is disposed in the first electrode 160_3, the additional definition member 160_4A may prevent formation of an electric field between the first electrode 160_3 and the second electrode 160_6. According to various embodiments of the disclosure, line widths of the pixel definition member 160_4 and the additional pixel definition member 160_4A may be different. According to various embodiments of the disclosure, the pixel definition member 160_4 and the additional pixel definition member 160_4A may be formed of different materials.

The organic light emitting layer 160_5 may be deposited to cover at least the pixel definition member 160_4, the additional pixel definition member 160_4A, and the first electrode 160_3. The second electrode 160_6 may be deposited on the organic light emitting layer 160_5. The first electrode 160_3 and the second electrode 160_6 may receive electric power to form an electric field according to a control of the semiconductor layer 160_2. In this case, organic materials disposed in the organic light emitting layer 160_5 may irradiate light by emitting light according to an influence of the electric field. According to various embodiments of the disclosure, light may not be emitted in an area of the organic light emitting layer 16-_5, in which the additional pixel definition member 160_4A is disposed. The encapsulation layer 160_7 may be disposed to cover an upper side of the second electrode 160_6. A material of the encapsulation layer 160_7 may be the same as that of the encapsulation layer 160_7 mentioned in the above description of the first type sub pixel structure 201. As the encapsulation layer 160_7 is disposed, an air gap may be excluded between the light transmission protecting layer 160_8 and the second electrode 160_6. The second shield member 162BM and the third shield member 162BMA may be disposed between the encapsulation layer 160_7 and the light transmission protecting layer 160_8. At least a portion of the second shield member 162BM may be disposed to overlap the pixel definition member 160_4 in the first direction (the z axis direction of FIG. 3A) that is perpendicular to the front surface of the display 160. According to an embodiment of the disclosure, at least a portion of the pixel definition member 160_4 may be exposed through the second opening 162_1. In the above-described structure, the size of the light emission area 162_2 may be smaller than the size of the second opening 162_1.

According to an embodiment of the disclosure, with respect to the first direction, the second shield member 162BM may be disposed to cover a portion of a periphery (e.g., a periphery in an outward direction with respect to the first electrode 160_3) of the pixel definition member 160_4. The second shield member 162BM may have a configuration that is the same as or similar to that of the second shield member 162BM mentioned above in the first type sub pixel structure 201. According to various embodiments of the disclosure, the third shield member 162BMA may be disposed between the second shield members 162BM. Furthermore, the third shield member 162BMA may be disposed to overlap at least a portion of the additional pixel definition member 160_4A with respect to the first direction. According to various embodiments of the disclosure, a width of the pixel definition member disposed in the second type sub pixel structure 202 may be the same as or smaller than that of the pixel definition member disposed in the first type sub pixel structure 201.

According to various embodiments of the disclosure, with respect to the first direction, the pixel definition member 160_4 and the additional pixel definition member 160_4A may have the same width in the second type sub pixel structure 202. According to various embodiments of the disclosure, line widths of the pixel definition member 160_4 and the additional pixel definition member 160_4A may be different. According to an embodiment of the disclosure, line widths of the pixel definition member 160_4 and the additional pixel definition member 160_4A may be different according to colors of the sub pixels. For example, a width of the pixel definition member 160_4 disposed in the pixel structure corresponding to the second type blue sub pixel 162B may be larger than a width of the pixel definition member 160_4 disposed in the pixel structure corresponding to the second type red sub pixel 162R, and a width of the pixel definition member 160_4 disposed in the pixel structure corresponding to the second type red sub pixel 162R may be larger than a width of the pixel definition member 160_4 disposed in the pixel structure corresponding to the second type green sub pixels 162Ga and 162Gb. According to various embodiments of the disclosure, a width of the additional pixel definition member 160_4A disposed in the pixel structure corresponding to the second type blue sub pixel 162B may be larger than a width of the additional pixel definition member 160_4A disposed in the pixel structure corresponding to the second type red sub pixel 162R, and a width of the additional pixel definition member 160_4A disposed in the pixel structure corresponding to the second type red sub pixel 162R may be larger than a width of the additional pixel definition member 160_4A disposed in the pixel structure corresponding to the second type green sub pixels 162Ga and 162Gb.

According to an embodiment of the disclosure, the second type sub pixel structure 202 may include second openings 162_1 of the third size 162W1 by the second shield member 162BM and the third shield member 162BMA. The second openings 162_1 may be disposed for micro pixels. The second openings 162_1 may have the same or similar sizes. The second openings 162_1 may have the same size (e.g., the third size 162_W1 regardless of the colors of the micro pixels. For example, the openings (or an interval between the second shield member 162BM and the third shield member 162BMA or an opening between the second shield member 162BM and the third shield member 162BMA) allocated in relation to the structures of the first blue micro pixel 162B1, the second blue micro pixel 162B2, the third blue micro pixel 162B3, the fourth blue micro pixel 162B4, the first red micro pixel 162R1, the second red micro pixel 162R2, the third red micro pixel 162R3, the fourth red micro pixel 162R4, the first green micro pixel 162G1), the second green micro pixel 162G2, the third green micro pixel 162G3, and/or the fourth green micro pixel 162G4, which have been described in FIG. 2A or 2B may have the same or similar sizes.

According to various embodiments of the disclosure, the sizes of the openings of the pixel structure corresponding to the blue micro pixels 162B1, 162B2, 162B3, and 162B4 may be the same as the sizes of the light emission areas (e.g., an interval or an area between the pixel definition member and the additional pixel definition member) of the corresponding blue micro pixels. According to various embodiments of the disclosure, sizes of the openings of the pixel structure corresponding to the red micro pixels 162R1, 162R2, 162R3, and 162R4 and sizes of the light emission areas (an interval or an area between the pixel definition member and the additional pixel definition member) may be different. For example, sizes of the openings of the pixel structure corresponding to the red micro pixels 162R1, 162R2, 162R3, and 162R4 and sizes of the light emission areas (an interval or an area between the pixel definition member and the additional pixel definition member) may be larger than a first size. According to various embodiments of the disclosure, sizes of the openings of the pixel structure corresponding to the green micro pixels 162G1, 162G2, 162G3, and 162G4 may be larger than sizes of the light emission areas (an interval or an area between the pixel definition member and the additional pixel definition member) by a second size (e.g., the second size that is larger than the first size).

According to various embodiments of the disclosure, the light emission area may include various forms. For example, the light emission area may include a square shape having the same four sides, a rectangular shape having different transverse widths and longitudinal widths, a circular shape, or a polygonal shape.

In the above-described structure, an embodiment of the disclosure may provide the display 160 based on the first type sub pixels 161 and the second type sub pixels 162, and may selectively the screen, a viewing angle is adjusted. In this process, the display 160 of the disclosure may support an individual mode or a private mode (e.g., a mode for restricting a light emission angle such that a third person cannot easily observe at least a partial screen of the display 160) based on driving of light emission for a viewing angle (a small viewing angle or a small angle) that is relatively small in the second type sub pixel structure 202 while heights of the first type sub pixel structure 201 and the second type sub pixel structure 201 are made uniform. Additionally, the display 160 of the disclosure may provide the second type sub pixel structure 202 that provides a narrow viewing angle based on a structure, in which no air gap is present between an organic light emitting layer and the encapsulation layer or an electrode layer and the encapsulation layer such that there is neither folded nor bending.

According to various embodiments of the disclosure, it has been descried in the drawings of FIGS. 2A, 2B, and 3A that the second shield members 162BM that divide the sub pixels are disposed in the second type pixel 160b, but the disclosure is not limited thereto. For example, the second shield member 162BM may be disposed to surround a periphery of the second type pixel 160b, and no separate member may be disposed between the sub pixels 162R, 162Ga, 162Gb, and 162B. In the second type pixels 160b, partial areas of the sub pixels covered by the shield members may include partial areas of the sub pixels, which do not emit light due to the disposition of the pixel definition member. The pixel definition member disposed in the second type pixel 160b may be aligned with the shield member and a width of the pixel definition member may be larger than a width of the shield member between the two or more openings, and thus some of the sub pixels, which do not emit light, may be exposed through the plurality of openings. According to various embodiments of the disclosure, the plurality of openings by the shield members 162BM and 162BMA disposed in the second type pixel 160b may have substantially the same width. According to various embodiments of the disclosure, in the first type pixel 160a, the first shield member 161BM may be disposed in the area of the encapsulation layer. Accordingly, the sub pixels of the first type pixel 160a may be divided by the plurality of openings.

Referring to FIG. 3B, it may be seen that the first type sub pixel 161 has a rate of a luminance (with respect to a luminance measured in a direction that is perpendicular to the display 160) of about 10% or more even to a range of 80 to 85 degrees from the direction that is perpendicular to the front surface of the display 160. It may be seen that the second type sub pixel 162 has a rate of a luminance (with respect to a luminance measured in a direction that is perpendicular to the display 160) of about 10% or less in a range of 45 degrees from the direction that is perpendicular to the front surface of the display 160. Accordingly, the first viewing angle (or a viewing angle according to simultaneous operations of the first type sub pixel 161 and the second type sub pixel 162) according to an operation of the first type sub pixel 161, for example, is of a level of about 80 to 85 degrees in the upward/downward and/or leftward/rightward directions with respect to a line that is perpendicular to the front surface of the display 160, and the second viewing angle of the screen of the display 160, which is operated based on the second type sub pixel 162 is of a level of about 40 degrees in the upward/downward and/or leftward/rightward directions, and only light of 10% or less as compared with the front surface may be viewed outside the angle-of-view range. Accordingly, when the screen is configured based on the second type sub pixel 162, luminance may be low on a side surface and thus, it may be difficult to recognize the screen of the display 160 from a lateral side.

According to various embodiments of the disclosure, when an angle, at which the display 160 is viewed from a front side, is 0 degrees, the luminance characteristics at a viewing angle, at which the display 160 is observed at 45 degrees, may be very significantly different in the first type sub pixels 161 and the second type sub pixels 162. For example, as illustrated, the brightness decays according to the viewing angles of the first type sub pixels 161 (or the first type pixels 160a) occur slowly, whereas the brightness decays according to the viewing angles of the second type sub pixels 162 (or the second type pixels 160b) may occur rapidly up to 45 degrees. For example, when the brightness at an angle, at which the display 160 is viewed from a front side, is set to 1.0, the brightness decay of the first type sub pixels 161 at 45 degrees is about 0.75 whereas the brightness of the second type sub pixels 162 at 45 degrees corresponds to about 0.05 whereby when only the second type sub pixels 162 are turned on to constitute the screen, it is difficult to recognize the screen of the display 160 at an observation viewing angle of 45 degrees or more and thus a targeted private mode (a mode, in which the screen of the display 160 is prevented from being identified by a third person) may be supported. However, areas expressed by various gradation values may be present in one screen displayed on the display 160, and accordingly, in an area expressed by a relative dark gradation (or a low gradation), it may be difficult to recognize the screen even within an observation viewing angle of 45 degrees. Accordingly, a measure of improving a screen recognition rate by adjusting the brightnesses of the areas of the screen in a situation, in which the observation viewing angle is within a specific angle.

Meanwhile, as illustrated in FIG. 3C, the light emission areas of the corresponding sub pixels may be separated as in FIG. 3A by providing a removal area 160_4b, from which a portion of the second electrode corresponding to the area, in which the additional pixel definition member 160_4A illustrated in FIG. 3C is disposed, is removed. Accordingly, a disposition location and a form of the shield member described in the embodiments of the disclosure may be described as a structure, in which it is disposed to correspond to the area 160_4b, from which a portion of the second electrode is removed. According to various embodiments of the disclosure, in relation to separation of the light emission area of the sub pixel for adjusting a viewing angle of the sub pixel according to an embodiment of the disclosure, the organic light emitting layer 160_5 in addition to the second electrode 160_6 may be removed. For example, the removed area 160_4b may include an area, from which at least one of the second electrode 160_6 and the organic light emitting layer 16-_5 is removed.

Figure 4:
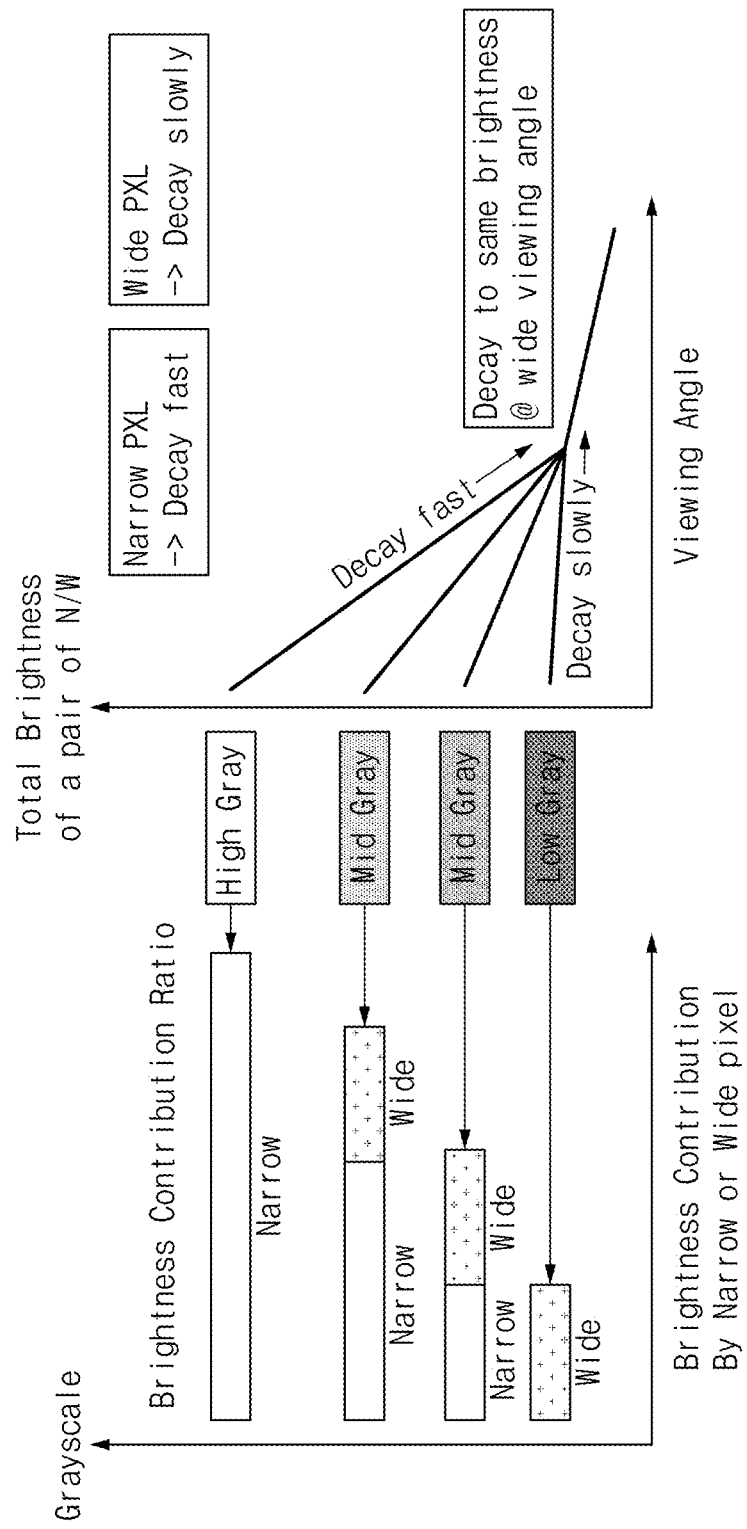
FIG. 4 is a view illustrating brightness contribution ratios for gradations according to an embodiment of the disclosure.

FIG. 4 is a view illustrating brightness contribution ratios for gradations according to an embodiment of the disclosure.

Referring to FIGS. 3B and 4, the processor 150 of the electronic device 100 may determine a grouping size or a grouping area of the pixels in correspondence to the contents that are to be output on the display 160. Alternatively, the processor 150 may identify the areas of the display 160 in correspondence to the grouped pixels based on the pixel grouping information 141 stored in the memory 140.

For example, the processor may perform a control to turn on only at least one second type pixel 160b (or the second type sub pixels 162) and turn off at least one first type pixel 160a (or the first type sub pixels 161) for the grouped pixels corresponding to, among the areas corresponding to the grouped pixels (e.g., the pixels grouped to M×N ("M" and "N" are natural numbers) of the first type pixel 160a (or described with reference to a modified type pixel 160c (hereinafter, the first type pixel 160a)) and the second type pixel 160b (or the third type pixel 160d (hereinafter, described as the second type pixel 160b)) of the display 160, an area displayed by a high gradation (e.g., high gray, 200 gray or more, or 255 gray) of a specific value or more. Alternatively, the processor 150 may perform a control to turn on only the second type pixels 160b when the gradation value of the displayed content partial area is maximal, by at least one of the plurality of groups.

According to various embodiments of the disclosure, the processor 150 may perform a control such that, for the grouped pixels corresponding to, the areas corresponding to the grouped pixels of the display 160, an area expressed by a gradation (e.g., low gray, 50 gray or less, or 10 gray or less) of a specific value or less, the number of the turned-on first type pixels 160a is larger than the number of turned-on second type pixels 160b. Alternatively, the processor 150 may perform a control such that, for the grouped pixels corresponding to, the areas corresponding to the grouped pixels of the display 160, the area expressed by the gradation (e.g., low gray, 50 gray or less, or 10 gray or less) of the specific value or less, only the first type pixels 160a are turned on (the second type pixels 160b are turned off). According to various embodiments of the disclosure, the processor 150 may perform a control such that, for the grouped pixels corresponding to, the areas corresponding to the grouped pixels of the display 160, an area expressed by an intermediate gradation value (e.g., middle gray, more than 50 and less than 200) between the highest gradation value and the lowest gradation value), the number of the turned-on second type pixels 160b is equal to or larger than the number of the turned-on first type pixels 160a.

When the screen is displayed on the display 160 based on the above-described control, the brightness may converge regardless of the gradation values in a specific observation viewing angle (e.g., a viewing angle of 45 degrees), and the same brightness decay may be shown at a viewing angle of 45 degrees or more whereby the screen may be uniformly observed.

A brightness average in the normal mode and the brightness average in the private mode may correspond to Equation 1 as follows.

$$B_{N,normal.avg} = B_{W,normal.avg} = \frac{B_{N,normal} n_N + B_{W,normal} n_W}{n_N + n_W} \quad \text{Equation 1}$$

$B_{N,normal.avg}$ is an average brightness (or luminance) of the second type pixels 160b in the normal mode, and $B_{W,normal.avg}$ is an average brightness of the first type pixels 160a in the normal mode. $B_{N,normal}$ is a brightness (grayscale function) of the second type pixels 160b in the normal mode, and B a brightness (grayscale $B_{W,normal}$ is function) of the first type pixels 160a in the normal mode. $n_N$ is the number of the second type pixels 160b included in one group, and $n_W$ is the number of the first type pixels 160a included in one group. n is the number of the pixels pertaining to one group, and may be a sum of $n_N$ and $n_W$. A brightness (or luminance) value at a specific gradation may follow Equation 2 to 5 as follows.

$$B_{N,Private} = B_{max,normal} \frac{X_N R_W - R_P}{R_W - R_P} \quad \text{Equation 2}$$

$$B_{W,Private} = B_{max,normal} \frac{R_P - X_W R_N}{R_W - R_P} \quad \text{Equation 3}$$

$$B_{total,Private} = B_{N,Private} + B_{W,Private} = B_{max,normal} \frac{X_W R_N - X_N R_W}{R_W - R_P} \quad \text{Equation 4}$$

If: $BN$, Private $< 0$, $B_{N,Private} = 0$, Equation 5

$$B_{W,Private} = B_{max,normal} \frac{X_W R_N - X_N R_W}{R_W R_P}$$

In Equations 2 to 5, which have been described above, $X_n$ is a luminance ratio between a gradation of a narrow angle pixel and a maximum gradation (i.e., white or 255 G) and may correspond to $B_{N,normal\ avg}/B_{max,normal}$, and $X_w$ is a luminance ratio between a gradation of a wide angle pixel and a maximum gradation (i.e., white or 255 g) and may correspond to BW,normal.avg/$B_{max,normal}$. Bmax,normal is a maximum brightness of all the pixels in the normal mode. $B_{N,private}$ is a luminance of the second type pixels 160b in the private mode, and the grayscales and the colors may be different. $B_{W,private}$ is a luminance of the first type pixels 160a in the private mode, and the grayscales and the colors may be different. $B_{total,private}$ is a luminance of all the pixels (or the entire display 160) of one group in the private mode. $\theta_{wide}$ is a user defined viewing angle that is regarded as a light viewing angle (a viewing angle of 45 degrees or more when an angle, at which a front surface of the display is viewed, is 0 degrees and an angle that is parallel to the front surface of the display is 90 degrees), and for example, may include 45 degrees. $R_W$ is a luminance decay ratio of the light viewing angles of the wide angle pixels (e.g., the first type pixels 160a) and corresponds to a constant value based on a physical design of the pixels, $R_N$ is a luminance decay ratio of the light viewing angles of the narrow angle pixels (e.g., the second type pixels 160b) and has a constant value based on a physical design of the pixels, and $R_P$ is a luminance decay ratio of the wide viewing angles in the private mode at a maximum gradation (e.g., white color or 255 G) and corresponds to a parameter according to definition by a user. $R_P$ that has been described above may have a value that is obtained by dividing the brightness of the corresponding pixels at a specific angle by the brightness of the pixels at 0 degrees.

With reference to FIG. 3B, by simplifying Equation 1 further, the brightness mentioned in the disclosure may be expressed by a percentage and may be scaled to 0% to 100%. In correspondence, $B_{max,normal}$ may be set to 100%. Because $n_N=n_W=1$ and $B_{N,normal.avg}=B_{W,normal.avg}$ based on each group, in which one first type pixel 160 and one second type pixel 160b are adjacent to each other, the entire brightness of the pair values of the pixels may be $B_{total.normal}=B_{N,normal}+B_{W,normal}=2\times B_{N,normal}=2\times B_{W,normal}=2\times B_{N,normal.avg}=2\times B_{W,normal.avg}$.

In a relationship between the grayscales and the brightness, the information may be stored based on the grayscales in actual driving of the display. The grayscales may be generally expressed by 8 bits, and may have a range of 0 to 255. Transformation between the grayscales and the brightness is a nonlinear transformation, and follows Equations 6 and 7 as follows.

$$\text{Brightness}(\%) = 100\left(\frac{\text{Gray}}{255}\right)^{Gamma} \quad \text{Equation 6}$$

$$X_N (\text{or } X_W) = \left(\frac{\text{Gray}}{255}\right)^{Gamma} \quad \text{Equation 7}$$

The gamma value may be various values, and in the disclosure, for example, may be assumed to be a value of 2.2.

When the grayscales of the first type pixels 160a and the second type pixels 160b are not the same in the normal mode, the brightnesses of the first type pixels 160a and the second type pixels 160b may be different in the normal mode. In this case, an average value may be applied. For example, when the gradation value of the first type pixels 160 and the gradation value of the second type pixels 160b are different, the brightness of the first type pixels 160a in the normal mode and the brightness of the second type pixels 160b in the normal mode may be calculated by using gamma correction functions (gamma correction functions or gamma correction curves that are given in advance), and an average of the brightnesses of the corresponding pixels may be calculated. To determine the brightnesses of the first type pixels 160a and the second type pixels 160b, the above-described transformation between the normal mode and the private mode may be used. The brightness in the private mode may be transformed to the grayscales by using gamma corrections of the first type pixels 160a and the second type pixels 160b.

For example, with reference to FIG. 3B, the gradation of the second type pixels 160b is 255 and the gradation of the first type pixels 160a is 0 in the normal mode, the brightness of the second type pixels 160b may become 100% and the brightness of the first type pixels 160a may become 0%. When the average is 50%, the brightness average in the normal mode is 50%, and the brightness of the second type pixels 160b is 42.0% and the brightness or the first type pixels 160a is 7.6% in the private mode, the gradation of the second type pixels 160a may be 172 and the gradation of the first type pixels may be 79 in the private mode.

Figure 5A:
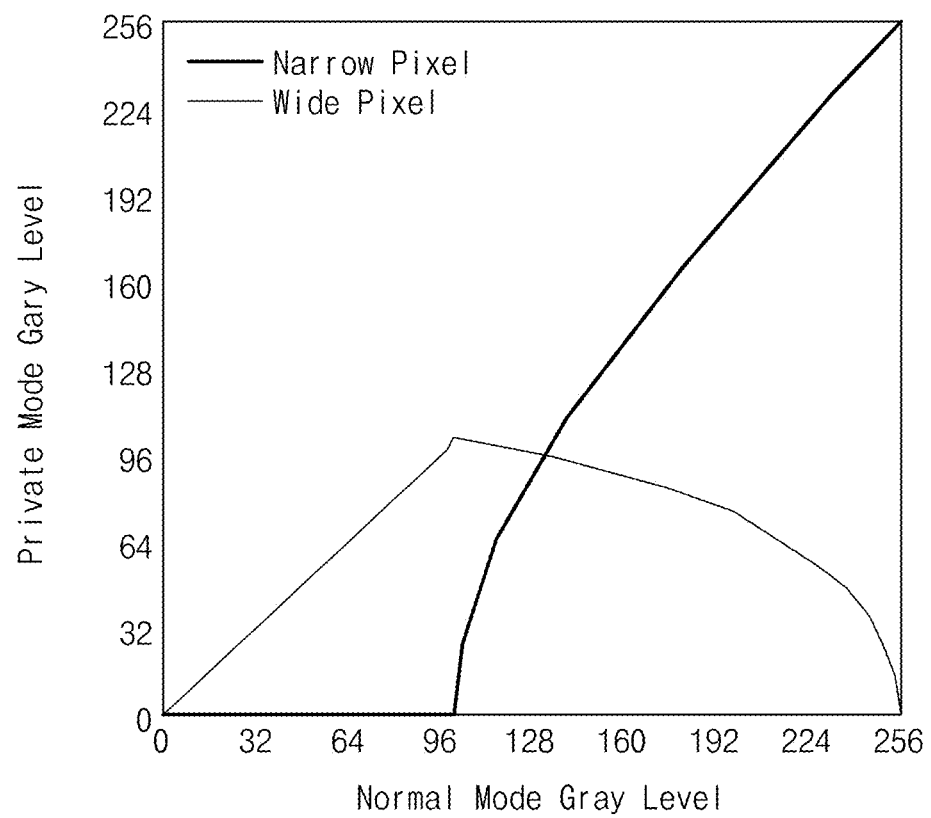
FIG. 5A is a view illustrating transformation of grayscales from a normal mode to a private mode in relation to first type pixels (wide pixels) and second type pixels (narrow pixels) according to an embodiment of the disclosure.
Figure 5B:
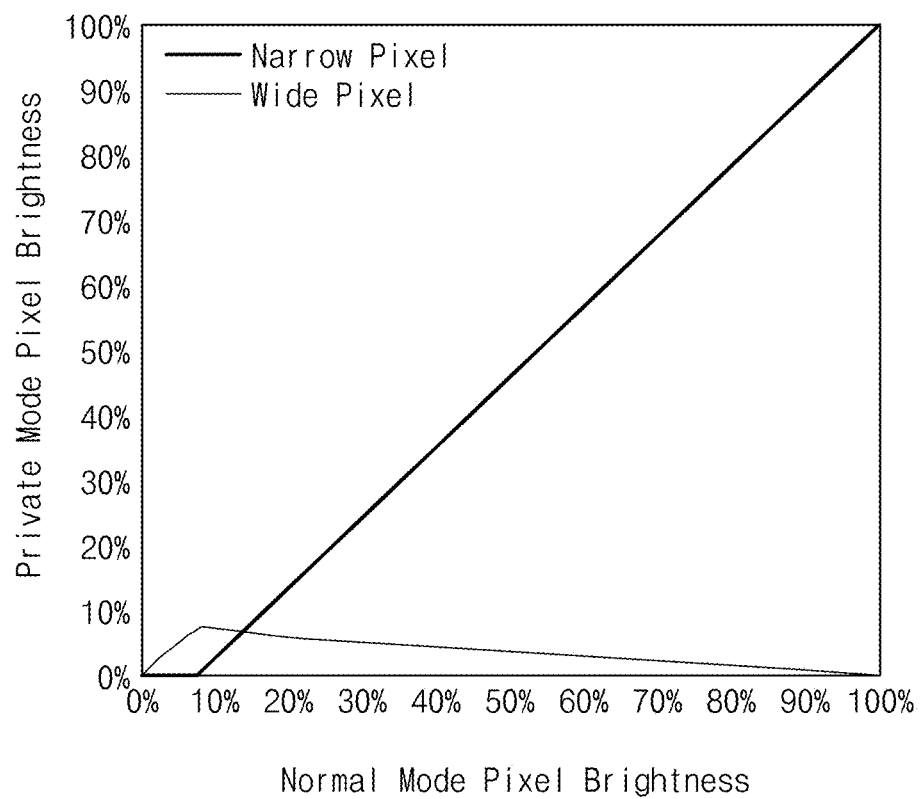
FIG. 5B is a view illustrating transformation of brightness from a normal mode to a private mode in relation to first type pixels (wide pixels) and second type pixels (narrow pixels) according to an embodiment of the disclosure.

FIG. 5A is a view illustrating transformation of grayscales from a normal mode to the private mode in relation to the first type pixels (wide pixels) and the second type pixels (narrow pixels) according to an embodiment of the disclosure. FIG. 5B is a view illustrating transformation of brightness from a normal mode to a private mode in relation to first type pixels (wide pixels) and second type pixels (narrow pixels) according to an embodiment of the disclosure.

Referring to FIGS. 3B, 5A, and 5B, when $R_N$ is 0.0551 and RW is 0.412, the $R_P$ and the RM may be set to be the same, and in the private mode, the first type pixels (wide pixels) 160a and the second type pixels (narrow pixels) 160b may contribute to the brightness by different grayscales.

According to the curves illustrated in FIGS. 5A and 5B, the brightnesses of the four grayscale values of 255, 192, 128, and 64 in the normal mode, and the grayscales, the brightnesses, and the brightnesses in a direction of 45 degrees in the private mode may show values of Table 1 as follows.

TABLE 1

| Normal mode | | | Private mode | | | | | |
|---|---|---|---|---|---|---|---|---|
| Grayscale | Brightness (%) | | | | Brightness at 0° (%) | | | Brightness at 45° (%) |
| Narrow pixel or wide pixel | Narrow pixel or wide pixel | Total | Grayscale | | | | | |
| | | | Narrow pixel | Wide pixel | Narrow pixel | Wide pixel | Total | Total |
| 255 | 100.0 | 200.0 | 255 | 0 | 100.0 | 0.0 | 100.0 | 5.5 |
| 192 | 53.6 | 107.1 | 179 | 77 | 45.9 | 7.2 | 53.1 | 5.5 |
| 128 | 22.0 | 43.9 | 89 | 97 | 9.9 | 11.9 | 21.8 | 5.5 |
| 64 | 4.8 | 9.6 | 0 | 64 | 0.0 | 4.8 | 4.8 | 2.0 |

Referring to FIGS. 5A and 5B, in the normal mode, the gradation value of 255 (the gradation value of the first type pixels 160a is 255 and the gradation value of the second type pixels 160b is 255) is a total brightness in the normal mode and may be 200%. When the gradation value of the first type pixels 160a is 255 and the gradation value of the second type pixels 160b is 0 in the private mode, the brightness of the first type pixels 160a may be 100%, the brightness of the second type pixels 160b may be 0%, and the total brightness may be 100%. According to the illustrated curves, at a viewing angle of about 45 degrees, the brightness is decayed to 5.51%. Referring to FIGS. 5A and 5B, in the normal mode, the gradation value of 192 (the gradation value of the first type pixels 160a is 192 and the gradation value of the second type pixels 160b is 192) is a total brightness in the normal mode and may be 107.1% (a contribution degree of the pixels is 53.6%). When the gradation value of the first type pixels 160a is 179 and the gradation value of the second type pixels 160b is 77 in the private mode, the brightness contribution degree of the first type pixels 160a may be 45.9%, the brightness contribution degree of the second type pixels 160b may be 7.2%, the total brightness may be 53.1%, and the brightness contribution degree of the first type pixels 160a may be increased in the private mode. At a viewing angle of about 45 degrees, the brightness is decayed to 5.48%. Referring to FIGS. 5A and 5B, in the normal mode, the gradation value of 128 (the gradation value of the first type pixels 160a is 128 and the gradation value of the second type pixels 160b is 128) is a total brightness in the normal mode and may be 43.9% (a contribution degree of the pixels is 22.0%). When the gradation value of the first type pixels 160a is 89 and the gradation value of the second type pixels 160b is 97 in the private mode, the brightness contribution degree of the first type pixels 160a may be 9.9%, the brightness contribution degree of the second type pixels 160b may be 11.9%, and the total brightness may be 21.8%. At a viewing angle of about 45 degrees, the brightness is decayed to 5.49%.

Referring to FIGS. 5A and 5B, in the normal mode, the gradation value of 64 (the gradation value of the first type pixels 160a is 64 and the gradation value of the second type pixels 160b is 64) is a total brightness in the normal mode and may be 9.6% (a contribution degree of the pixels is 4.8%). When the gradation value of the first type pixels 160a is 0 and the gradation value of the second type pixels 160b is 64 in the private mode, the brightness contribution degree of the first type pixels 160a may be 0%, the brightness contribution degree of the second type pixels 160b may be 4.8%, and the total brightness may be 4.8%. At a viewing angle of about 45 degrees, the brightness is decayed to 1.97%.

Figure 5C:
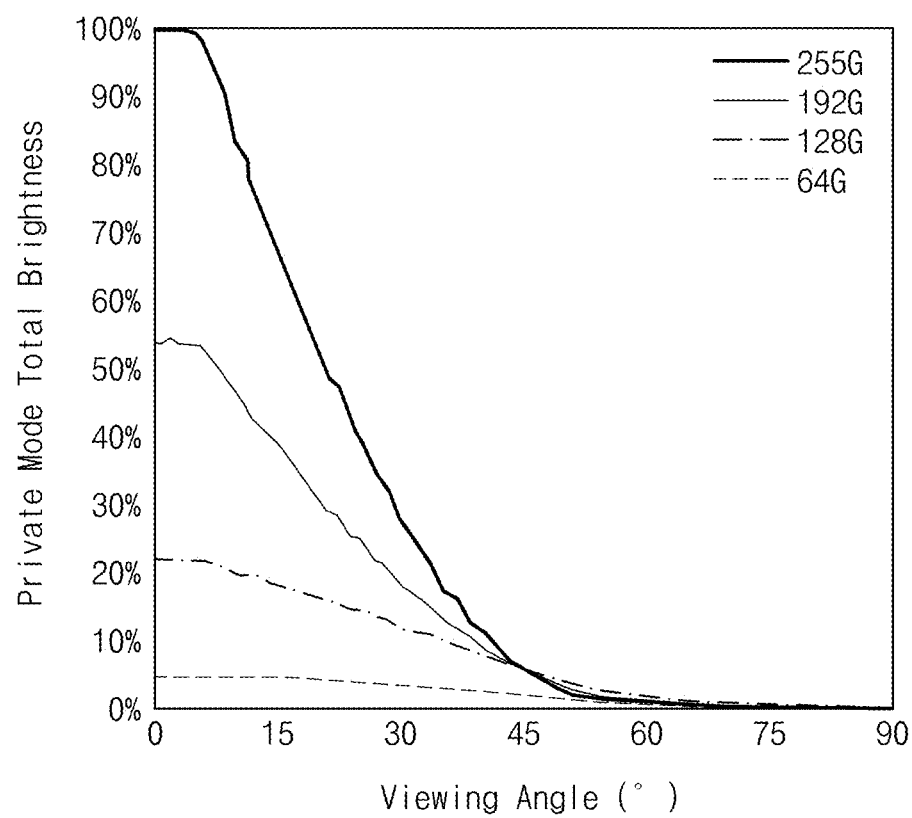
FIG. 5C is a view illustrating a relationship between brightness and viewing angles in a private mode according to an embodiment of the disclosure.

FIG. 5C is a view illustrating a relationship between brightness and viewing angles in a private mode according to an embodiment of the disclosure.

Referring to FIGS. 5A, 5B, and 5C, at 0 degrees (an angle, at which the front surface of the display 160 is viewed perpendicularly), all the grayscales may have different brightness levels with reference to the brightness of the normal mode. At 0 degrees, relative contrasts of the different gradations may be maintained. At 45 degrees (an angle, at which the display 160 is viewed at about 45 degrees between a direction that is perpendicular to the front surface of the display 160 and a direction that is parallel to the front surface of the display 160), the brightnesses of most of the grayscales (255 G, 192 G, and 128 G in the normal mode) are decayed to almost the same level (e.g., a value that is proximate to 5.51%, Bmax.normal×RP). When the viewing angle is increased, the brightness decays of all the grayscales may have different ratios. A relatively high grayscale (or a relatively high brightness) may be decayed (e.g., 255 G (gray): decayed from 100% to 5.5%) more rapidly, and a relatively low grayscale (or a relatively low brightness) may be decayed (e.g., 128 G: decayed from 21.8% to 5.5%) more slowly. A relatively high grayscale (or a relatively high brightness) may be decayed (e.g., 255 G (gray): decayed from 100% to 5.5%) more rapidly, and a relatively low grayscale (or a relatively low brightness) may be decayed (e.g., 128 G: decayed from 21.8% to 5.5%) more slowly. The light viewing angle brightness in the normal mode of 64 G may be lower. For example, the brightness of 64 G in the normal mode and at a viewing angle of 0 degrees is 4.8%, and may be lower than another grayscale (e.g., 5.51%) in the private mode and a viewing angle of 45 degrees. In this case, all the brightnesses at 64 G may be determined by the first type pixels.

Figure 5D:
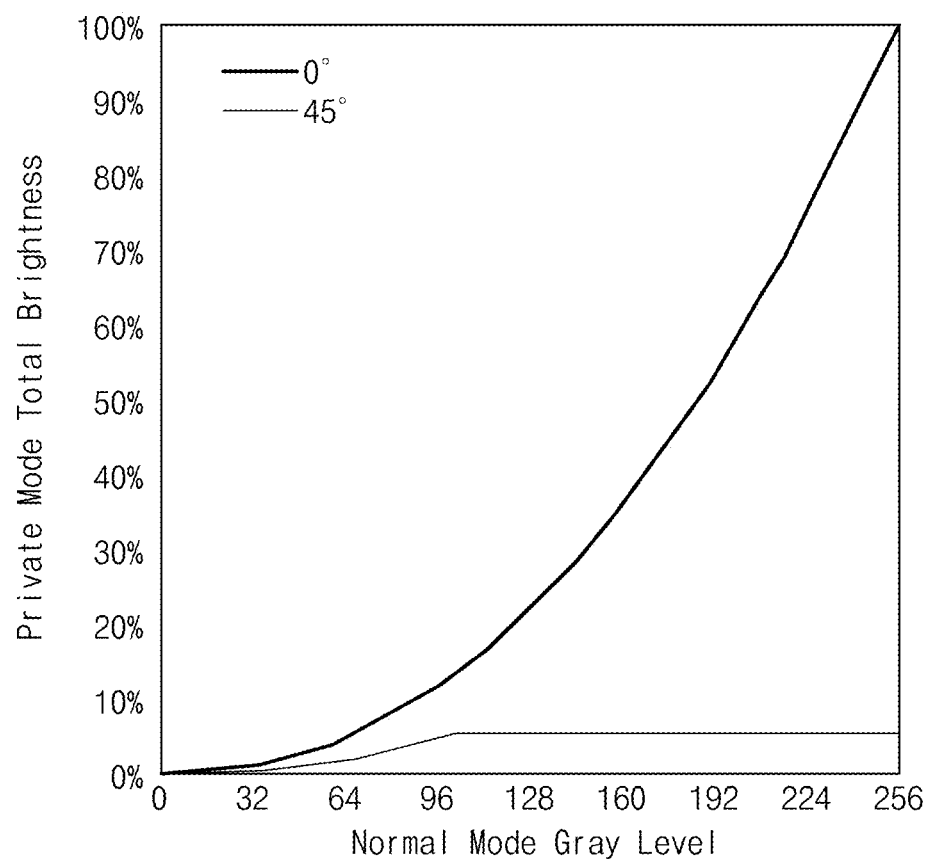
FIG. 5D is a view illustrating a gradation reference in a normal mode and a brightness relationship at 0 degrees and 45 degrees in a private mode according to an embodiment of the disclosure.

FIG. 5D is a view illustrating a gradation reference in a normal mode and a brightness relationship at 0 degrees and 45 degrees in the private mode according to an embodiment of the disclosure.

Referring to FIG. 5D, at a viewing angle of 0 degrees, a relationship between the grayscales and the brightnesses may correspond to a gamma correction relationship. At a viewing angle of 45 degrees, the brightness for all the gradations between 103 G (gray) and 255 G shows almost the same value, for example, a value up to about 5.5%. At a viewing angle of 45 degrees, the contents having a grayscale between 103 G to 255 G may not distinguished by the bright values (information may not be exposed). When the gradation value is lower than 103 G at 45 degrees, a difference value is present but a brightness of about 5% may be a sufficiently low value, by which no difference may be recognized.

Figure 6A:
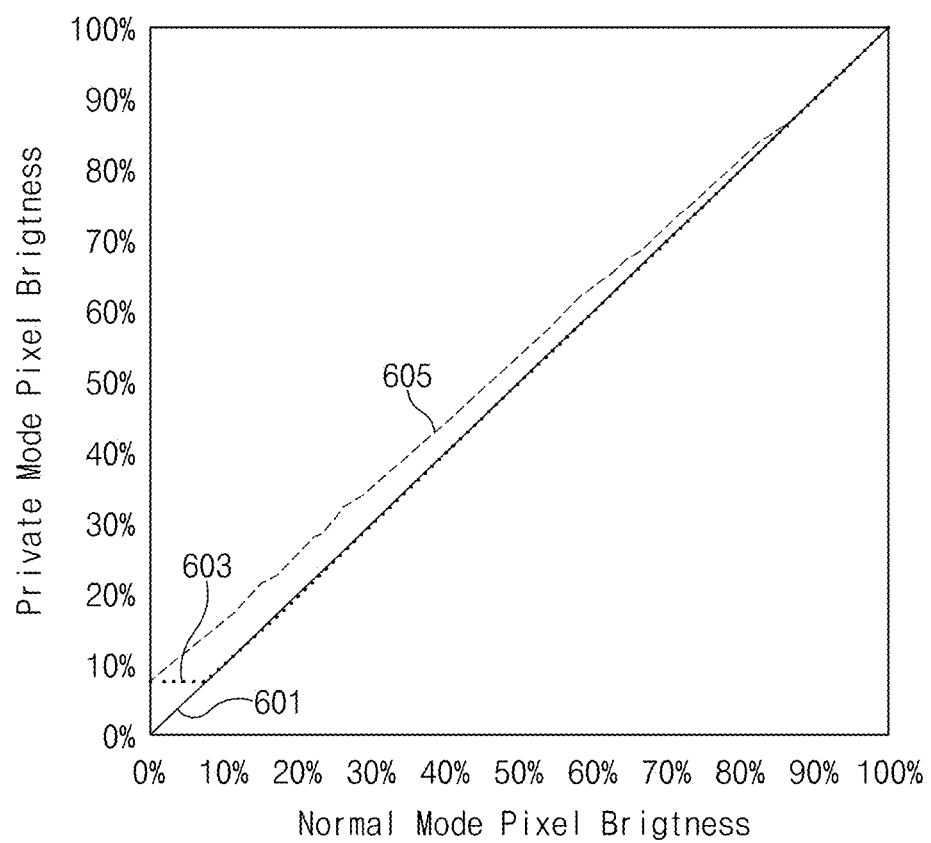
FIG. 6A is a view illustrating a measure of increasing visibility when a low brightness screen is output according to an embodiment of the disclosure.
Figure 6B:
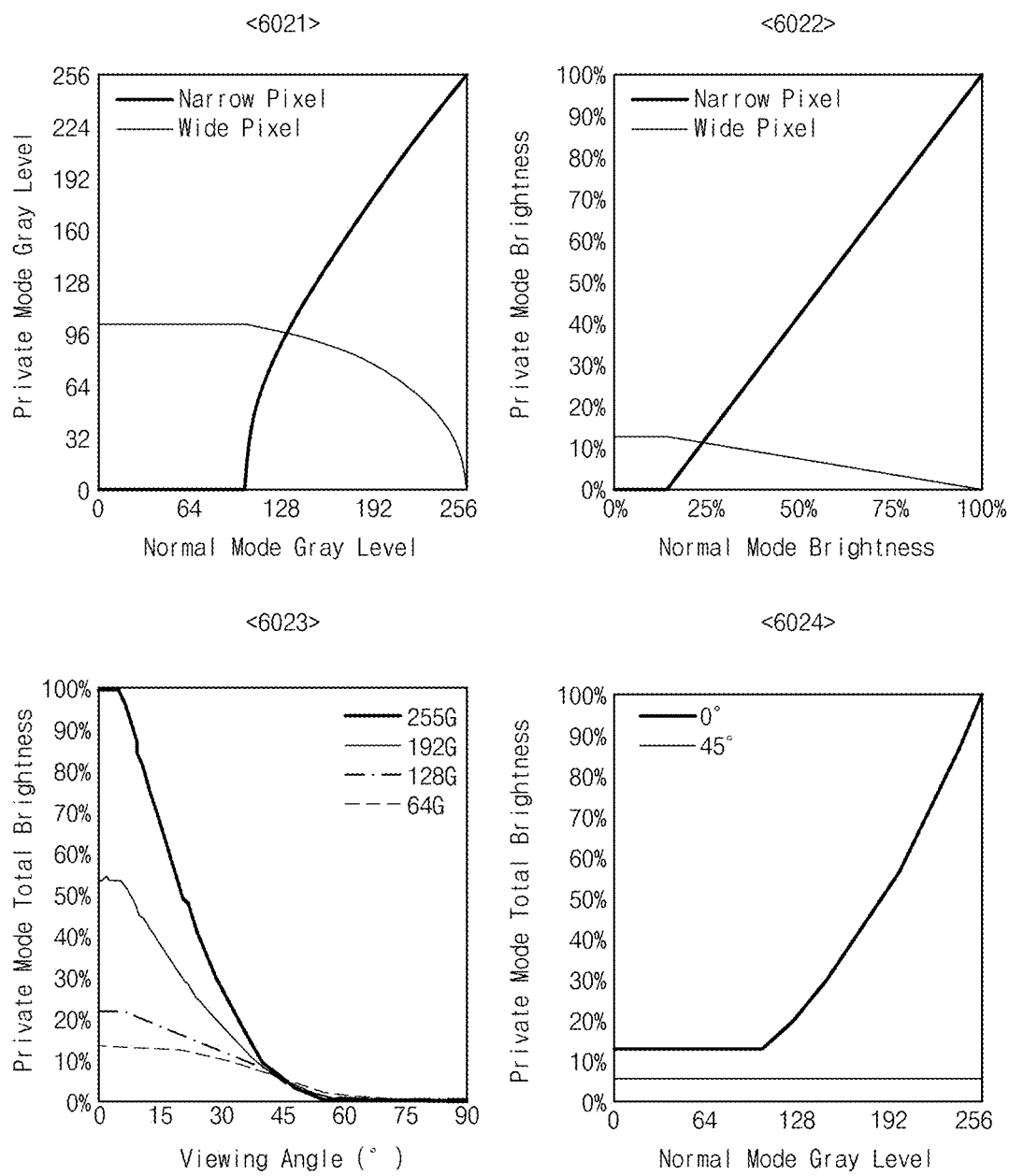
FIG. 6B is a view illustrating grayscale transformation characteristics in a second measure according to an embodiment of the disclosure.
Figure 6C:
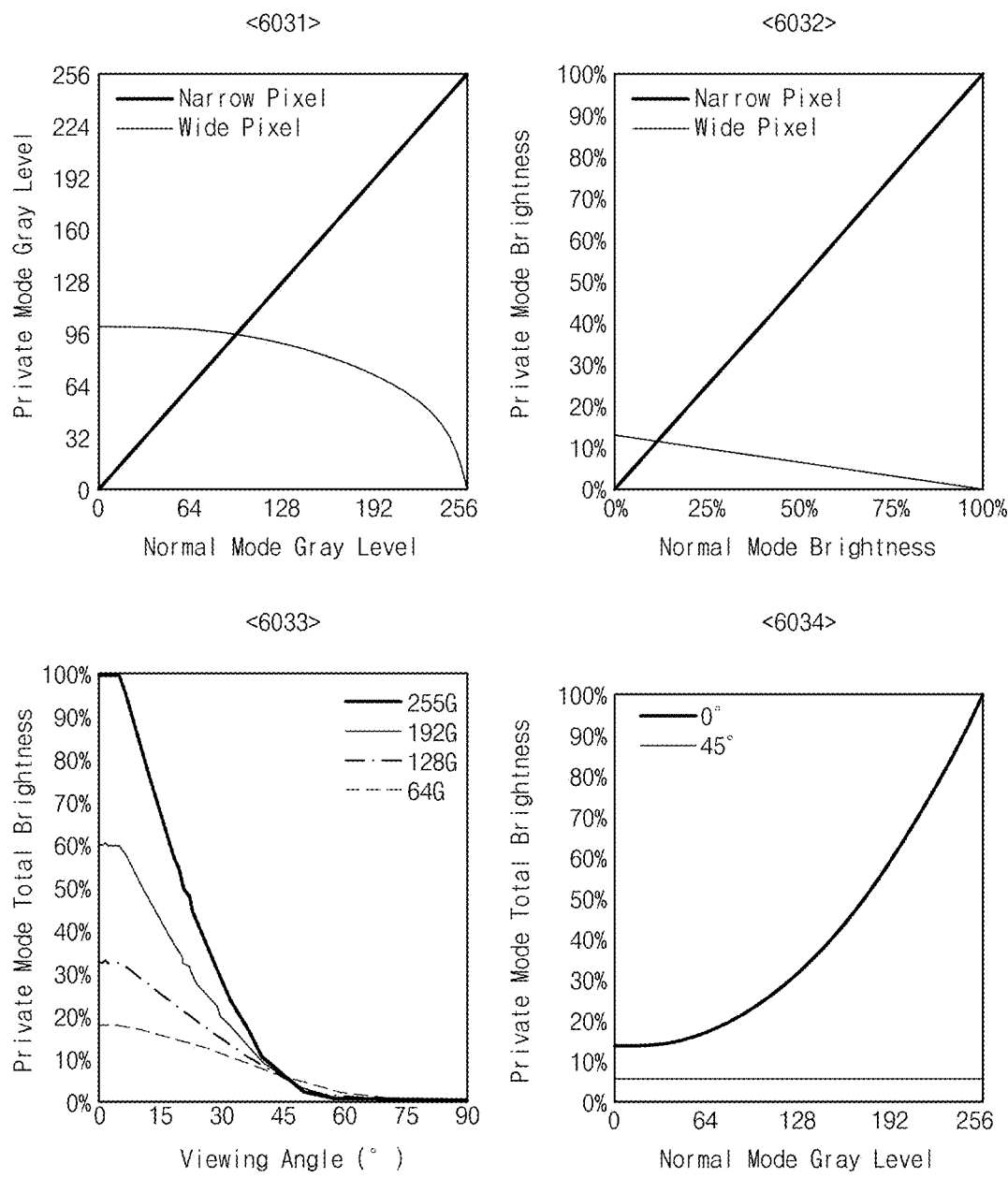
FIG. 6C is a view illustrating grayscale transformation characteristics in a third measure according to an embodiment of the disclosure.

FIG. 6A is a view illustrating a measure of increasing visibility when a low brightness screen is output according to an embodiment of the disclosure. FIG. 6B is a view illustrating grayscale transformation characteristics in a second measure according to an embodiment of the disclosure. FIG. 6C is a view illustrating grayscale transformation characteristics in a third measure according to an embodiment of the disclosure.

Referring to FIG. 6A, as the first measure related to visibility, a measure illustrated in graph 601 may include a measure of turning on a larger number of second type pixels 160*b* at a relatively high gradation and turning on a larger number of first type pixels 160*a* at a relatively low gradation according to the above description of FIGS. 5A to 5D and 6A. Because the wide viewing angle cannot be distinguished at a high gradation (e.g., a gradation that is higher than 103G (gray)) of the private mode when the measure is applied), the visibility on a lateral side may be lowered to a specific level or less, and the remaining parts that may be distinguished also may have a contrast of a high gradation and a low gradation whereby exposure of information may be prevented.

Referring to FIGS. 6A and 6B, as the second measure, as illustrated in graph 602, the grayscales of the contents may be adjusted by sailing the grayscale the grayscale having a brightness of a level (e.g., $B_{max,normal} * R_P/R_W$) of a specific value or less (fixing a specific value or less). The brightness value calculating formula may be Equations 2 to 5 that have been above. In the second measure, the mode gradation values in the private mode and at the wide viewing angle (the viewing angle at 45 degrees or more) have the same brightness at the wide viewing angle, they cannot be distinguished, and thus the visibility may be decayed. Some tradeoffs may make it difficult for the contents of a low gradation to be distinguished at a general viewing angle (e.g., 0 degrees, at which the front surface of the display is viewed perpendicularly), and thus the contrast may be decayed at 0 degrees. Graph 6021 is a graph illustrating transformation of grayscales from the normal mode for the first type pixels (wide pixels) 160*a* and the second type pixels (narrow pixels) 160*b* to the private mode, and graph 6022 is a graph illustrating transformation of brightness from the normal mode for the first type pixels (wide pixels) 160*a* and the second type pixels (narrow pixels) 160*b* to the private mode. Graph 6023 is a graph illustrating dependency of the brightness and the viewing angles in the private mode at the gradations (e.g., 255 G, 192 G, 128 G, and 64 G), and graph 6024 is a graph illustrating dependency of the gradations and the brightness with reference to the gradation levels in the normal mode at 0 degrees and 45 degrees.

Referring to FIGS. 6A and 6C, as the third measure, as illustrated in graph 603 and 605, a measure of shifting the grayscales of all the contents may be included. The minimum brightness may be 0 G. The other gradations may be shifted, and the gamma correction (e.g., the relationship between the grayscales and the brightness) may be adjusted. The linear transformation of the brightness may be expressed in Equations 8 and 9 as follows.

$$X^1_N = \frac{R_P}{R_W} + \left(1 - \frac{R_P}{R_W}\right)X_N \qquad \text{Equation 8}$$

$$X^1_W = \frac{R_P}{R_W} + \left(1 - \frac{R_P}{R_W}\right)X_W \qquad \text{Equation 9}$$

In the equation, $X^1_N$ and $X^2_W$ may be used as $X_n$ and $X_w$ in an equation for calculating $B_{N,Private}$ and $B_{W,Private}$. The other symbols may have the same meanings as the symbols used in Equations 1 to 5 above. In the third measure, the brightnesses of all the gradations with reference to the private mode at the wide viewing angle are the same (or the same within a specific error), and thus cannot be distinguished at the wide viewing angle (e.g., a viewing angle of 45 degrees or more). According to the third measure, the visibility at the wide viewing angle may be lowered to a specific level or less, and the contrast is partially decreased at 0 degrees, but all the gradations at 0 degrees may be distinguished. Graph 6031 illustrates transformation of grayscales from the normal mode for the first type pixels (wide pixels) 160*a* and the second type pixels (narrow pixels) 160*b* to the private mode, and graph 6032 is a graph illustrating transformation of brightness from the normal mode for the first type pixels (wide pixels) 160*a* and the second type pixels (narrow pixels) 160*b* to the private mode. Graph 6033 illustrates dependency of the brightness and the viewing angles in the private mode at some gradations (e.g., 255 G, 192 G, 128 G, and 64 G), and graph 6034 is illustrates dependency of the gradations and the brightness with reference to the gradation levels in the normal mode at 0 degrees and 45 degrees.

Figure 7:
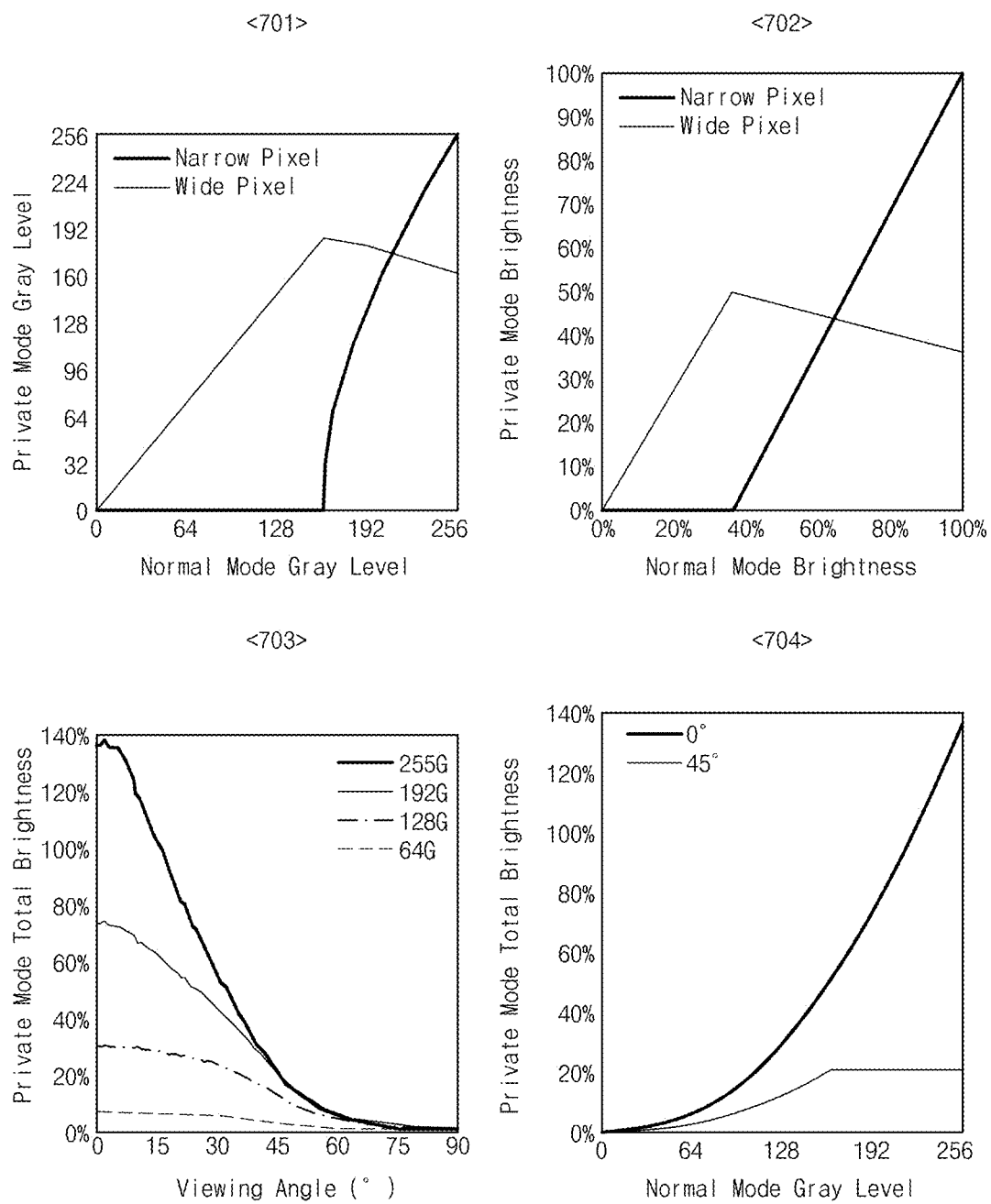
FIG. 7 is a view related to setting of an $R_P$ related to an increase in brightness according to an embodiment of the disclosure.

FIG. 7 is a view related to setting of an $R_P$ related to an increase in brightness according to an embodiment of the disclosure.

Referring to FIG. 7, unlike in FIGS. 5A and 5B above, in which $R_P$ is set to be the same as $R_N$, $R_P$ is set to be a higher value, and thus the total brightness of the viewing angle of 0 degrees may be increased in the private mode. For example, when $R_P$ is set to 0.15, the values of the graphs illustrated in FIG. 7 may be acquired through calculations in the equations described above in FIGS. 1, 2A to 2C, 3A to 3C, 4, and 5A to 5D. For example, by setting $R_P$ to be 0.15 that is larger than $R_N$, as illustrated in graph 701, the gradation level of the second pixels 160*b* may be gradually increased until the gradation level in the normal mode becomes 160 and the gradation level of the first type pixels 160*a* may be increased at the gradation value of 160 or more whereby the brightness value may be increased at 0 degrees. Graph 701 illustrates transformation of grayscales from the normal mode for the first type pixels (wide pixels) 160*a* and the second type pixels (narrow pixels) 160*b* to the private mode, and graph 702 is a graph illustrating transformation of brightness from the normal mode for the first type pixels (wide pixels) 160*a* and the second type pixels (narrow pixels) 160*b* to the private mode. Graph 703 illustrates dependency of the brightness and the viewing angles in the private mode at some gradations (e.g., 255 G, 192 G, 128 G, and 64 G), and graph 704 is illustrates dependency of the gradations and the brightness with reference to the gradation levels in the normal mode at 0 degrees and 45 degrees.

According to the above-described graphs of FIG. 7, transformation of grayscales and brightness between the normal mode and the private mode may be expressed as in Table 2 as follows.

TABLE 2

| Normal mode | | | Private mode | | | | | |
|---|---|---|---|---|---|---|---|---|
| Grayscale | Brightness (%) | | | | Brightness | | | |
| Narrow pixel or wide pixel | Narrow pixel or wide pixel | Total | Grayscale | | at 0° (%) | | | Brightness at 45° (%) Total |
| | | | Narrow pixel | Wide pixel | Narrow pixel | Wide pixel | Total | |
| 255 | 100.0 | 200.0 | 255 | 160 | 100.0 | 35.9 | 135.9 | 20.3 |
| 192 | 53.6 | 107.1 | 140 | 179 | 26.7 | 45.9 | 72.6 | 20.4 |
| 128 | 22.0 | 43.9 | 0 | 147 | 0.0 | 29.8 | 29.8 | 12.3 |
| 64 | 4.8 | 9.6 | 0 | 73 | 0.0 | 6.4 | 6.4 | 2.6 |

As illustrated above, the brightness in the private mode and the viewing angle of 0 degrees may be increased from 100% to 135.9% by 35.9%. The brightness at the wide viewing angle may be increased, but because the contrasts of relatively high grayscale levels are minimized, and thus the brightness at 45 degrees may be maintained at about 20.3% or less.

Figure 8:
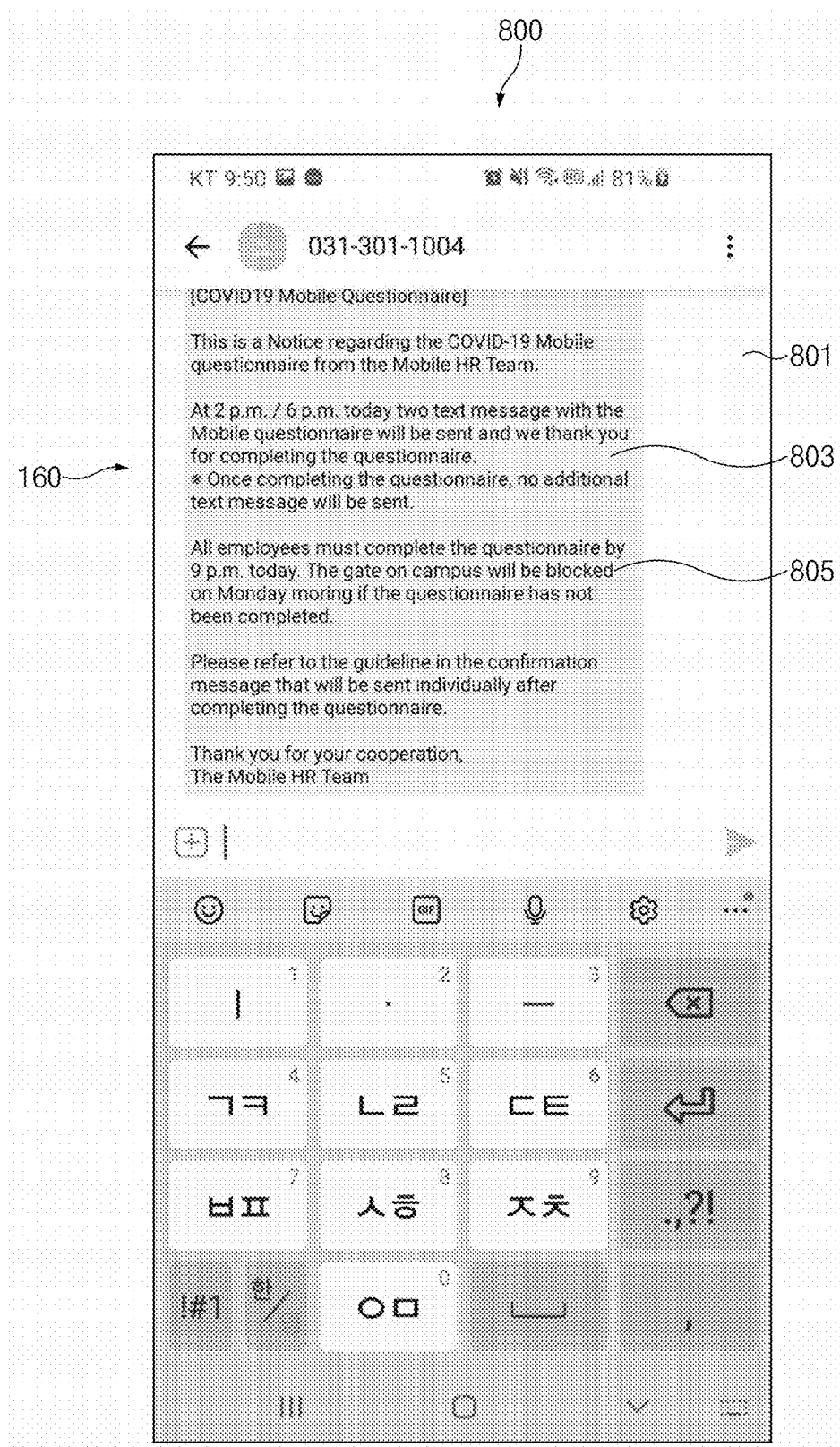
FIG. 8 is a view illustrating controlling screen pixels in a display, to which first type pixels and second type pixels are applied, according to an embodiment of the disclosure.

FIG. 8 is a view illustrating controlling screen pixels in a display, to which the first type pixels and the second type pixels are applied according to an embodiment of the disclosure.

Referring to FIG. 8, a screen 800 (or contents or a content screen) having areas of various brightnesses (or luminances) may be displayed on the display 160. According to an embodiment of the disclosure, the screen 800 may at least include an object display area 805, in which an object corresponding to a text is displayed, an object background area 803 that is a background of the object, and a background area 801 that is a background of the object display area 805 and the object background area 803. As illustrated, the brightness of the background area 801 may be higher than the brightness of the object background area 803. As an example, the brightness of the background area 801 may be a maximum brightness. The brightness of the object background area 803 may be higher than the brightness of the object display area 805.

According to various embodiments of the disclosure, as compared with the other areas (e.g., the object display area 805 and the object background area 803), the background area 801 may be displayed at a relatively high brightness (or a high gradation value) or a maximum brightness (or a maximum gradation value). In correspondence, the processor 150 may perform a control to display an image of the corresponding brightness by turning on, among the pixels (e.g., the first type pixels 160a (or the modified first type pixels 160c) and the second type pixels 160b (or the third type pixels) disposed in the background area 801, only some pixels (e.g., the second type pixels 160b). Alternatively, in relation to the display of the background area 801, the processor may perform a control such that the ratio of the first type pixels 160a and the second type pixels 160b, which are turned on, becomes a specific value or more (e.g., 0.9 or more).

According to various embodiments of the disclosure, the object display area 805 may be displayed at a relatively low brightness or a minimum brightness (or a minimum gradation value) as compared with the other areas (e.g., the background area 801 and the object background area 803). In correspondence, the processor 150 may perform a control to display an image of the corresponding brightness by turning on, among the pixels (e.g., the first type pixels 160a and the second type pixels 160b disposed in the object display area 805, some pixels (e.g., some of the first type pixels 160a and some of the second type pixels 160b). For example, the processor 150 may perform a control (e.g., perform a control such that a ratio of the turned-on second type pixels 160b is larger than a ratio of the turned-on first type pixels) such that a ratio of the turn-on second type pixels 160b and the turned-on first type pixels 160a is a specific value or more (e.g., not less than 0.5 and less than 0.9). Alternatively, the processor 150 may perform a control such that the numbers of the first type pixels 160a and the second type pixels 160b, which are turned on to display the object background area 803 are the same.

According to various embodiments of the disclosure, the object background area 803 may have a brightness value that is higher than that of the object display area 805, and may be displayed at a brightness value that is lower than that of the object background area 803. In correspondence, the processor 150 may perform a control to display an image of the corresponding brightness by turning on only some of the pixels (e.g., the first type pixels 160a and the second type pixels 160b) disposed in the object background area 803. For example, the processor 150 may perform a control such that the number of the turned-on first type pixels 160a is larger than the number of the turned-on second type pixels 160b.

According to various embodiments of the disclosure, the object display area 805 and the object background area 803 may correspond to a region of interest (ROI) of the screen 800 (or the contents). The processor 150 may set the turn-on ratio of, among the pixel groups disposed in the ROI area, the first type sub pixels to be higher and set the turn-on ratio of, among the pixel groups disposed in the background area 801, the first type sub pixels to be lower when the luminance of the ROI area is lower than the luminance of the background area 801.

According to various embodiments of the disclosure, the grouping sizes of the first pixels and the second pixels in the screen 800 may vary. For example, the processor 150 may set the grouping size of the background area 801 to a first size, set the grouping size of the object background area 803 to a second size (e.g., a second size that is smaller than the first size), and set the grouping size of the object display area 805 to a third size (e.g., a third size that is smaller than the first size). The third size may be equal to or smaller than the second size. According to various embodiments of the disclosure, the processor 150 may set the grouping sizes to be different according to the sizes of the areas having the same gradation value. For example, the processor may set the grouping sizes of the first type pixels and the second type pixels to a first size (e.g., the largest size or a size of a specific value or more) when a ratio of the object background area 803 occupied in the screen 800 is the largest, and may set the grouping sizes of the first pixels and the second pixels to a second size (e.g., a second size that is smaller than the first size) when the ratio occupied by the object display area 805 is the smallest. According to various embodiments of the disclosure, the grouping sizes of the first type pixels and the second type pixels may be constant over the entire content screen. According to various embodiments of the disclosure, the processor 150 may set the grouping sizes to be different for the content screens. For example, when a first grouping size (e.g., a size obtained by 2×2 grouping the first type pixels and the second type pixels) is set for the screen illustrated in FIG. 8, a second grouping size (e.g., a size obtained by 4×4 grouping the first type pixels and the second type pixels) corresponding to the corresponding content screen when the screen is changed (e.g., when the object display area 805, the object background area 803, and the background area 801 are changed). According to various embodiments of the disclosure, the grouping also may be applied to a case, in which various contents are displayed on one screen, as in a popup screen or a multi-window, in the same way. For example, in a state, in which a plurality of windows are displayed, a first window may be driven in the normal mode and a second window may be driven in the private mode.

Figure 9A:
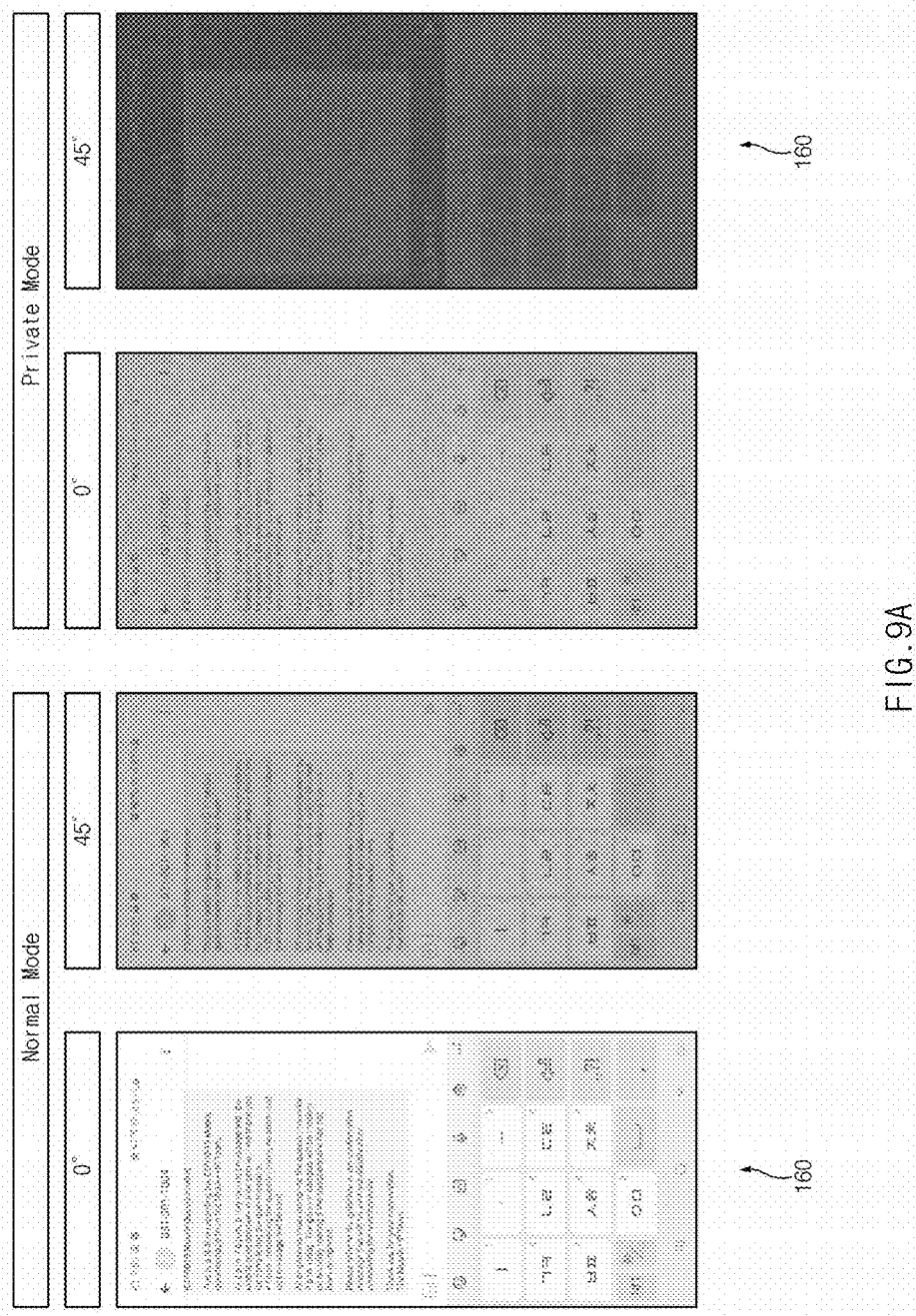
FIG. 9A is a view illustrating a screen observation form at specific viewing angles for modes according to an embodiment of the disclosure.

FIG. 9A is a view illustrating a screen observation form at specific viewing angles for modes according to an embodiment of the disclosure. FIG. 9B is a view illustrating a screen observation form at specific viewing angles for modes according to an embodiment of the disclosure.

Referring to FIG. 9A, as illustrated, in the normal mode, all of the first type pixels 160a and the second type pixels 160b may be turned on such that a partial screen of the screen may be displayed. The screen of the display 160 in the normal mode may be observed at a brightness provided by the display 160 when it is observed at 0 degrees (or when it is viewed perpendicularly to the front surface of the display 160). When the display 160 in the normal mode is observed at 45 degrees, as illustrated, it may be observed while the brightness is decreased by a specific value.

According to various embodiments of the disclosure, in the private mode, the screen may be constituted by only the second type pixels 160b, the screen may be constituted by only some of the second type pixels 160b and the first type pixels 160a, or the screen may be constituted by only some of the second type pixels 160b and some of the first type pixels 160a. In the private mode, when the display 160 is observed at 0 degrees (or when viewed perpendicularly to the front surface of the display 160), at least some first type pixels 160a are turned off and thus the screen may be observed at a relatively low brightness as compared with a 0 degree observation state in the normal mode. According to various embodiments of the disclosure, a 0 degree observation screen state in the private mode may be the same as or similar to a 45 degree observation screen state in the normal mode. According to various embodiments of the disclosure, in the private mode, the screen of the display 160 may be observed at a relatively low brightness as compared with a 0 degree observation state in the private mode according to a concentration degree of the light irradiated by the pixels (e.g., most of the light is irradiated within a specific angle range with reference to 0 degrees) when being observed at 45 degrees. For example, the 45 degree observation screen state in the private mode may be a state, in which information of the screen displayed on the display 160 cannot be identified. In the above-described various embodiments of the disclosure, the first type pixels 160a may be replaced by the modified first type pixels 160c, and the second type pixels 160b may be replaced by the third type pixels 160d.

Referring to FIG. 9B, at a 0 degree viewing angle, at which the front surface of the display is viewed perpendicularly in the normal mode, the screen may be displayed at a first brightness. At the 0 degree viewing angle, at which the front surface of the display is viewed perpendicularly in the normal mode, the screen may be displayed at the first brightness. At a specific angle between the front surface of the display 160 and a horizontal plane, for example, at a 45 degree viewing angle in the normal mode, the screen may be displayed at a second brightness (e.g., 50% of the first brightness) that is lower than the first brightness. At a 0 degree viewing angle, at which the front surface of the display 160 is viewed perpendicularly in the private mode, the screen may be displayed at a third brightness (e.g., a brightness that is improved by 36.9%) that is higher than the second brightness by a specific ratio. At a specific angle between the front surface of the display 160 and a horizontal plane, for example, at a 45 degree viewing angle in the normal mode, the screen may be displayed at a second brightness (e.g., 50% of the first brightness) that is lower than the first brightness. Accordingly, in the private mode, the screen information may not be exposed as a viewing angle of the side surface is displayed at a very low brightness.

Figure 9C:
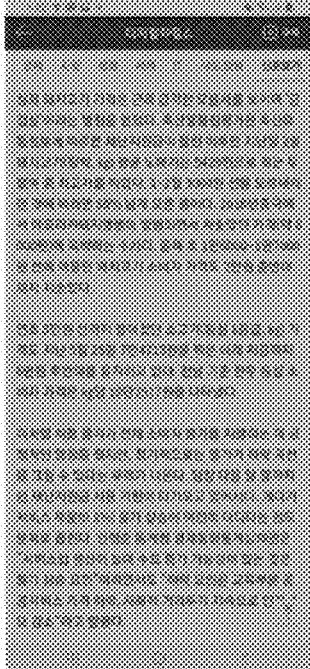
FIG. 9C is a view illustrating a comparative screen of a screen observation form at specific viewing angles for modes according to an embodiment of the disclosure.

FIG. 9C is a view illustrating a comparative screen of a screen observation form at specific viewing angles for modes according to an embodiment of the disclosure.

Referring to FIG. 9C, at the 0 degree viewing angle, at which the display 160 is viewed in a direction that is perpendicular to the front surface of the display 160, a first private mode, in which only the second type pixels 160b are turned on, may be displayed at the first brightness and a second private mode, in which the second type pixels 160b and some of the first type pixels 160a are applied, may be displayed at the second brightness that is higher than the first brightness. At a specific angle between the front surface of the display 160 and the horizontal plane, for example, the 45 degree viewing angle, the first private mode, in which only the second type pixels 160b are turned on, may be displayed at the third brightness that is lower than the second brightness and the second private mode, in which the second type pixels 160b and some of the first type pixels 160a are applied, may be displayed at a fourth brightness that is higher than the third brightness. When the first private mode is applied, a driving time of the second type pixels 160b may be 31.3, and when the second private mode is applied, a driving time of the second type pixels 160b may be 25.0. When the first private mode is applied, the driving time of the first type pixels 160a is 0, and when the second private mode is applied, the driving time of the first type pixels 160a may be 6.3. Referring to FIG. 9C, at the 0 degree viewing angle, at which the display 160 is viewed in a direction that is perpendicular to the front surface of the display 160, a first private mode, in which only the second type pixels 160b are turned on, may be displayed at the first brightness and a second private mode, in which the second type pixels 160b and some of the first type pixels 160a are applied, may be displayed at the second brightness that is higher than the first brightness.

Figure 9D:
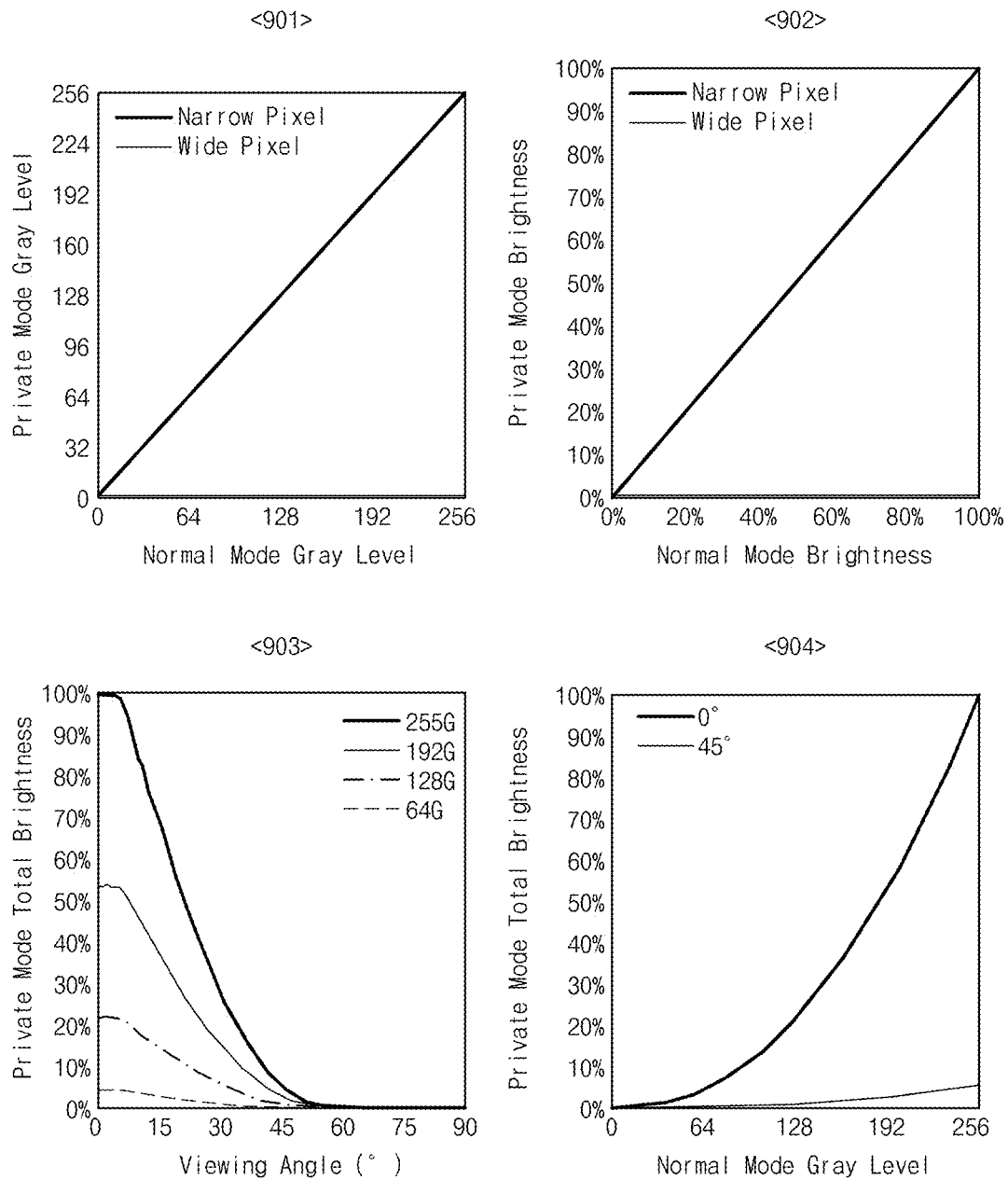
FIG. 9D is a view illustrating pixel characteristics according to an operation of a first private mode according to an embodiment of the disclosure.

FIG. 9D is a view illustrating pixel characteristics according to an operation of a first private mode according to an embodiment of the disclosure.

Referring to FIG. 9D, graph 901 illustrates transformation of grayscales from the normal mode for the first type pixels (wide pixels) 160a and the second type pixels (narrow pixels) 160b to the private mode when the first private mode is applied, and graph 902 is a graph illustrating transformation of brightness from the normal mode for the first type pixels (wide pixels) 160a and the second type pixels (narrow pixels) 160b to the private mode when the first private mode is applied. Graph 903 illustrates dependency of the brightness and the viewing angles in the private mode at some gradations (e.g., 255 G, 192 G, 128 G, and 64 G) when the first private mode is applied, and graph 904 is illustrates dependency of the gradations and the brightness with reference to the gradation levels in the normal mode at 0 degrees and 45 degrees when the first private mode is applied. As illustrated in graph 901, in the first private mode, the first type pixels 160a are not applied and the gradation level becomes 0, and as in graph 902, in the first private mode, the brightness contribution degree of the first type pixels 160a may become 0. As illustrated in graph 903 and graph 904, a gradation value of 255 has a brightness of 100& in the first private mode and the brightness of the first private mode at the 45 degree viewing angle has a brightness (e.g., 6% or less) of a specific value or less even when the gradation becomes higher, a function of preventing exposure of information at a high performance may be provided.

The above-described contrast ratio of the first private mode and the second private mode may be expressed by values in Table 3 that has been described above.

TABLE 3

| Characteristics of private mode at 45 degree viewing angle | First private mode | Second private mode (first measure) | Second private mode (second measure) | Second private mode (third measure) |
|---|---|---|---|---|
| Brightness contrast: 255 G/192 G | 1.87 | 1.01 | 1.01 | 1.01 |
| Brightness contrast: 255 G/128 G | 4.56 | 1.01 | 1.01 | 1.01 |
| Brightness contrast: 255 G/64 G | 20.93 | 2.80 | 1.01 | 1.00 |

As in Table 3 that has been described above, when the second private mode is applied, the brightness contrast may be decreased to 1.01 or less as a whole, and the function represents that contents having different grayscales cannot be distinguished at a wide viewing angle (e.g., an angle of 45 degrees or more).

Figure 10:
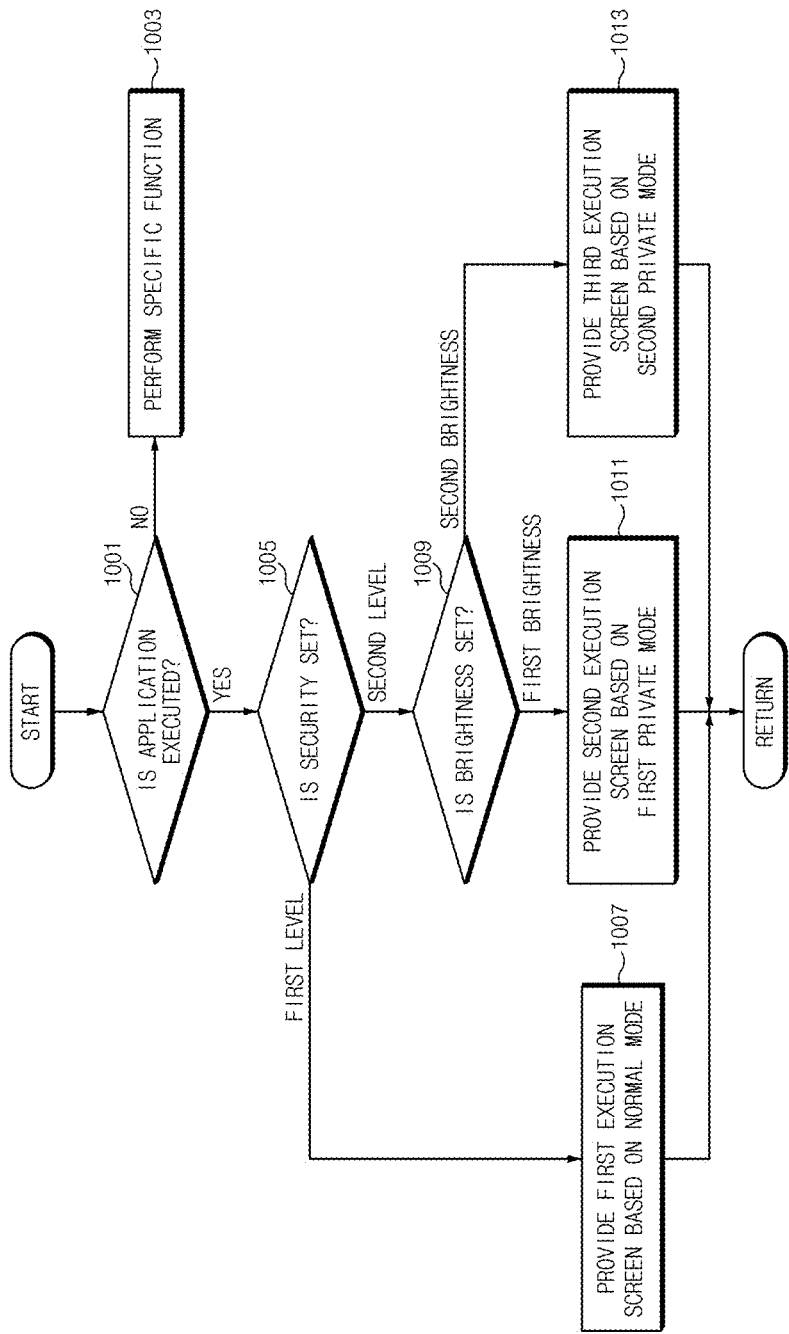
FIG. 10 is a view illustrating a method for operating an electronic device according to an embodiment of the disclosure.

FIG. 10 is a view illustrating a method for operating an electronic device according to an embodiment of the disclosure.

Referring to FIG. 10, in relation to the method for operating the electronic device according to an embodiment of the disclosure, in operation 1001, the processor 150 of the electronic device 100 may identify whether a request for execution of an application is made. For example, the processor 150 may identify whether output of a screen according to execution of a specific application is requested as the display 160 is changed from a turn-off state to a turn-on state. Alternatively, the processor 150 may identify whether execution of a specific application is requested according to reception of a specific voice instruction, reception of a gesture input, or selection of a specific item or a menu item. When there is no request for execution of a separate application, in operation 1003, the processor 150 may perform a control to perform a specific function defined in advance. For example, the processor 150 may maintain a current state of the electronic device 100, or may change a state of the display 160 from a turn-on state to a turn-off state.

When an event related to the request for execution of the application, in operation 1005, it may be identified whether a security is set in relation to execution of the corresponding application. In relation, the electronic device 100 may store information related to setting of a security for applications to manage the information. Alternatively, the security setting information for the applications may be included in the application (or the application information), and it may be identified whether a security is set, through identification of the application, in an application executing process. According to various embodiments of the disclosure, the electronic device 100 may identify whether a security is set for sections in one screen. When a security is set for the sections, modes applied for the sections may vary. For example, when a bank application is executed, pixels in an area related to input of a password may be controlled to be operated according to application of a private mode, and pixels in the remaining areas may be controlled to be operated according to application of a normal mode. According to various embodiments of the disclosure, the electronic device 100 may make applications of modes of areas selected through input by a user in one screen different. For example, the electronic device 100 may apply the private mode to an area selected through touch by the user, and may apply the normal mode to the remaining areas. In this regard, the electronic device 100 may recognize a plurality of objects displayed on a screen in relation to application of modes, and may provide an object selection screen such that the modes may be applied differently for the objects. Alternatively, at least some of the sections divided through a touch (e.g., a touch input that defines a closed curve) by the user may be applied to the private mode (or the normal mode) or the remaining areas may be applied to the normal mode (or the private mode).

When the security setting is of a first level (or is relatively low), in operation 1007, the processor 150 may provide a first execution screen based on the normal mode. For example, the processor 150 may turn on all of the first type pixels 160a (or the modified first type pixels 160c) and the second type pixels 160b (or the third type pixels 160d) and output the first execution screen according to execution of the application.

When the security setting is of a second level (e.g., a second level having a security grade that is higher than the first level), in operation 1009, the processor 150 may identify whether a brightness related to execution of the application is set. In relation, the electronic device 100 may store information related to setting of a brightness for applications to manage the brightness. Alternatively, the electronic device 100 may store information for setting of the brightness in the applications, and may identify the information in an application executing process. According to an embodiment of the disclosure, although it has been described that the security setting is of the first level and the second level, the disclosure is not limited thereto. For example, a third level, a security grade of which is higher than the second level, may be included.

When the security setting is of a first brightness setting (or is a relatively low brightness setting), in operation 1011, the processor 150 may provide a second execution screen based on the first private mode. For example, the processor 150 may turn on, among the pixels, the second type pixels 160*b* (or the third type pixels 160*d*), and may turn on all of the first type pixels 160*a* to output a second execution screen according to the execution of the application.

When the brightness setting is setting of a second brightness (e.g., a second brightness that is higher than the first brightness), in operation 1013, the processor 150 may provide a third execution screen based on the second private mode. For example, the processor 150 may turn on, among the pixels, some pixels (e.g., some of the first type pixels 160*a*, some of some (or the modified first type pixels 160*c*) of the second type pixels 160*b*, and some of the third type pixels 160*d*), and may output a third execution screen according to execution of the application. The third execution screen may be displayed brighter than the second execution screen in the first private mode (or a screen having a higher luminance may be displayed) in the first private mode.

Thereafter, when an input for requesting ending of the execution screen is made, an application ending screen may be output, and is branched to a standby screen or a previous execution screen. When the standby screen is output, the standby screen may be output (e.g., the screen is output in a state, in which all of the first type pixels 160 and the second type pixels 160*b* are turned on) based on the normal mode. In the previous execution screen, the pixels may be controlled to be operated according to any one of the normal mode, the first private mode, or the second private mode according to the characteristics of the previous execution screen.

According to various embodiments of the disclosure, an electronic device may include a display including a plurality of pixels, and a processor that drives the display, each of a plurality of pixels may include a plurality of sub pixels, the plurality of sub pixels may include first type pixels including first type sub pixels observed at a first viewing angle, and second type pixels being adjacent to the first type pixels and including second type sub pixels observed at a second viewing angle that is smaller than the first viewing angle, and the processor may be configured to, for a plurality of groups including one or more first type pixels and one or more second type pixels, perform a control such that turn-on ratios of the first type pixels and the second type pixels in, a plurality of groups, a first group are different from turn-on ratios of those of, among the plurality of groups, a second group that is different from the first group, according to gradation values of partial areas of contents displayed by the plurality of groups.

According to various embodiments of the disclosure, the processor may be configured to turn on only the second type pixels when gradation values of partial areas of contents displayed by at least one of the plurality of groups are a maximum value.

According to various embodiments of the disclosure, the processor may be configured to set the turn-on ratios of the second type pixels to be higher when the gradation values of the partial areas of the contents displayed by at least one of the plurality of groups are relatively high.

According to various embodiments of the disclosure, the processor may be configured to set the turn-on ratios of the second type pixels to be lower when the gradation values of the partial areas of the contents displayed by at least one of the plurality of groups are relatively low.

According to various embodiments of the disclosure, the processor may be configured to classify region of an interest (ROI) area and a background area of the contents, when a luminance of the ROI area is lower than a luminance of the background area, set the turn-on ratios of the first type pixels in pixel groups disposed in the ROI area to be higher, and set the turn-on ratios of the first type pixels in pixel groups disposed in the background area to be lower.

According to various embodiments of the disclosure, the processor may be configured to, when a text is displayed in the ROI area, set the turn-on ratios of the first type pixels in pixel groups disposed in an area, in which the text is displayed, to be lower, and set the turn-on ratios of the first type pixels in pixel groups disposed in an ROI background area around the text to be higher.

According to various embodiments of the disclosure, the electronic device may further include a memory, and the memory may store grouping information on the plurality of pixels.

According to various embodiments of the disclosure, the processor may be configured to make grouping sizes of the first type pixels and the second type pixels different according to a kind of an application.

According to various embodiments of the disclosure, the processor may be configured to make grouping sizes of the first type pixels and the second type pixels, which correspond to a size of an object or a background included in the contents, different.

According to various embodiments of the disclosure, the processor may be configured to make grouping sizes of the first type pixels and the second type pixels different according to a change in contents.

According to various embodiments of the disclosure, a method for driving pixels of a display, wherein the display includes first type pixels including first type sub pixels observed at a first viewing angle, and second type pixels being adjacent to the first type pixels and including second type sub pixels observed at a second viewing angle that is smaller than the first viewing angle may include receiving a request for execution of an application, and performing a control such that, for a plurality of groups including one or more first type pixels and one or more second type pixels, turn-on ratios of first type pixels and second type pixels of, among the plurality of groups, a first group are different from turn-on ratios of those of, among the plurality of groups, a second group that is different from the first group.

According to various embodiments of the disclosure, the performing of the control may include turning on only the second type pixels when gradation values of partial areas of contents displayed by at least one of the plurality of groups are a maximum value.

According to various embodiments of the disclosure, the performing of the control may include turning on a larger number of the second type pixels than the first type pixels to be higher when the gradation values of the partial areas of the contents displayed by at least one of the plurality of groups are relatively high.

According to various embodiments of the disclosure, the performing of the control may include turning on a larger number of the first type pixels than the second type pixels when gradation values of partial areas of contents displayed by at least one of the plurality of groups are relatively low.

According to various embodiments of the disclosure, the method may further include classifying an ROI area and a background area of the contents, and the performing of the control may include turning on a larger number of the first type pixels in the pixel groups disposed in the ROI area and turning on a smaller number of the first type pixels in the pixel groups disposed in the background area when a luminance of the ROI area is lower than a luminance of the background area.

According to various embodiments of the disclosure, the performing of the control may include turning on a smaller number of the first type pixels in the pixel groups disposed in an area, in which a text is displayed, and turning on a larger number of the first type pixels in the pixel groups disposed in an ROI background area around the text when the text is displayed in the ROI area.

According to various embodiments of the disclosure, the method may further include making grouping sizes of the first type pixels and the second type pixels different according to a change in the contents.

According to various embodiments of the disclosure, the method may further include identifying setting of security of the application, turning on all of the first type pixels and the second type pixels and displaying the contents when the setting of security of the application is relatively low, and turning on at least some of the second type pixels and displaying the contents when the setting of security of the application is relatively high.

According to various embodiments of the disclosure, the method may include identifying the setting of the brightness related to the execution of the application when the setting of the security of the application is relatively high, and turning off the second type pixels when the setting of the brightness is relatively low and turning on at least one of the second type pixels to display the contents.

According to various embodiments of the disclosure, the method may include identifying setting of a brightness related to execution of the application when the setting of security of the application is relatively high, and turning on some of the first type pixels and at least some of the second type pixels and displaying the contents when the setting of the brightness is relatively high.

Figure 11:
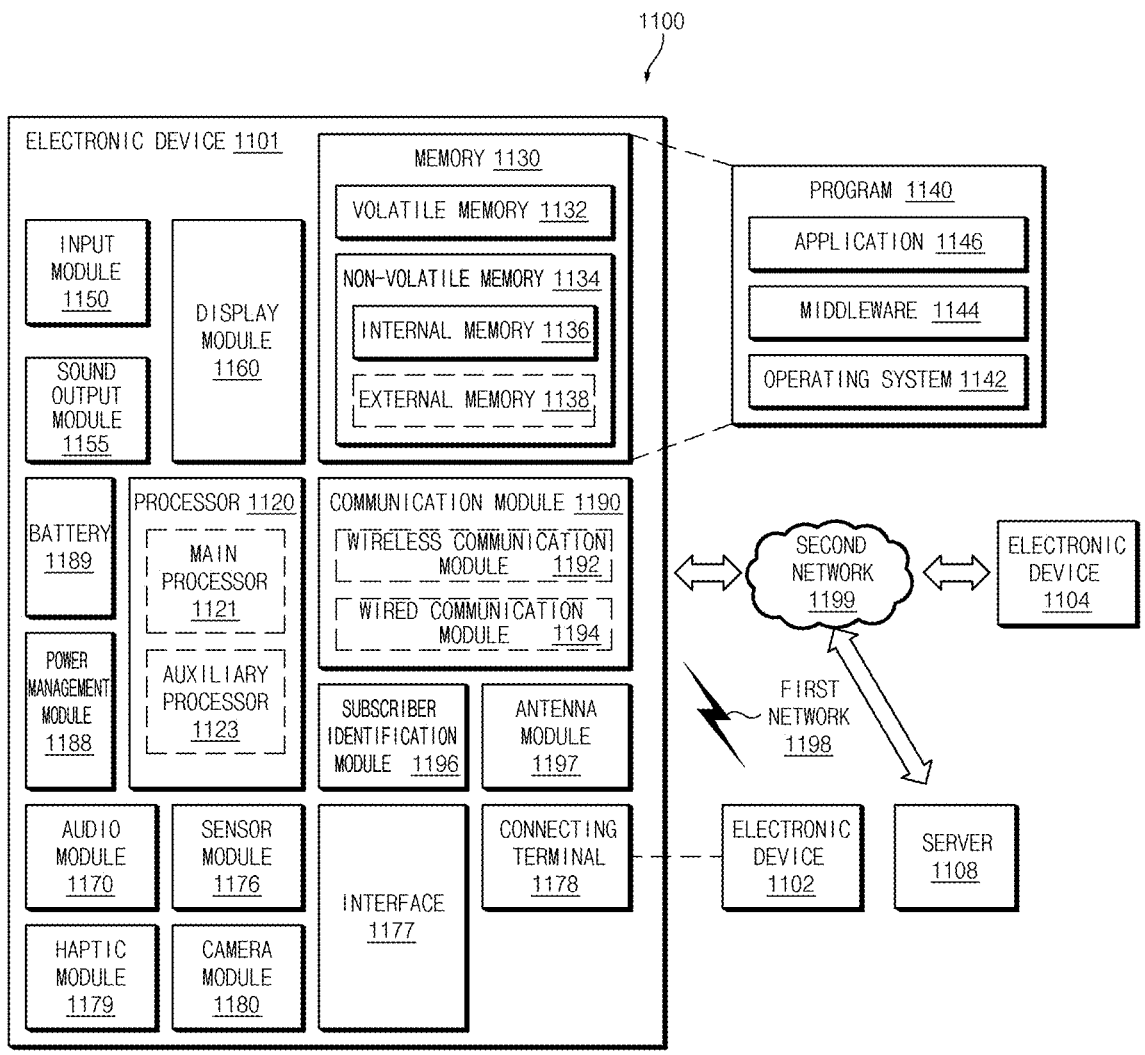
FIG. 11 is a block diagram of an electronic device in a network environment according to an embodiment of the disclosure.

FIG. 11 is a block diagram illustrating an electronic device in a network environment according to an embodiment of the disclosure.

Referring to FIG. 11, an electronic device 1101 (e.g., the electronic device 100 of FIG. 1) in a network environment 1100 may communicate with an external electronic device 1102 via a first network 1198 (e.g., a short-range wireless communication network), or an external electronic device 1104 or a server 1108 via a second network 1199 (e.g., a long-range wireless communication network). According to an embodiment of the disclosure, the electronic device 1101 may communicate with the external electronic device 1104 via the server 1108. According to an embodiment of the disclosure, the electronic device 1101 may include a processor 1120 (e.g., the processor 150 of FIG. 1), a memory 1130 (e.g., the memory 130 of FIG. 1), an input module 1150 (e.g., the input part 120 of FIG. 1), a sound output module 1155, a display module 1160 (e.g., the display 160 of FIG. 1), an audio module 1170, a sensor module 1176, an interface 1177, a connecting terminal 1178, a haptic module 1179, a camera module 1180, a power management module 1188, a battery 1189, a communication module 1190, a subscriber identification module (SIM) 1196, or an antenna module 1197. In some embodiments of the disclosure, at least one (e.g., the connecting terminal 1178) of the components may be omitted from the electronic device 1101, or one or more other components may be added in the electronic device 1101. In some embodiments of the disclosure, some of the components may be implemented as single integrated circuitry. For example, some (e.g., the sensor module 1176, the camera module 1180, or the antenna module 1197) of the components may be implemented as embedded in the display module 1160 (e.g., a display).

The processor 1120 may execute, for example, software (e.g., a program 1140) to control at least one other component (e.g., a hardware or software component) of the electronic device 1101 coupled with the processor 1120, and may perform various data processing or computation. According to one embodiment of the disclosure, as at least part of the data processing or computation, the processor 1120 may load a command or data received from another component (e.g., the sensor module 1176 or the communication module 1190) in a volatile memory 1132, process the command or the data stored in the volatile memory 1132, and store resulting data in a non-volatile memory 1134. According to an embodiment of the disclosure, the processor 1120 may include a main processor 1121 (e.g., a central processing unit (CPU) or an application processor (AP)), and an auxiliary processor 1123 (e.g., a graphics processing unit (GPU), a neural processing unit (NPU), an image signal processor (ISP), a sensor hub processor, or a communication processor (CP)) that is operable independently from, or in conjunction with, the main processor 1121. When the electronic device 1101 includes the main processor 1121 and the auxiliary processor, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display module 1160, the sensor module 1176, or the communication module 1190) among the components of the electronic device 1101, instead of the main processor 1121 while the main processor 1121 is in an inactive (e.g., a sleep) state, or together with the main processor 1121 while the main processor 1121 is in an active state (e.g., executing an application). According to an embodiment of the disclosure, the auxiliary processor 1123 (e.g., an image signal processor or a communication processor) may be implemented as part of another component (e.g., the camera module 1180 or the communication module 1190) functionally related to the auxiliary processor 1123. According to an embodiment of the disclosure, the auxiliary processor 1123 (e.g., a neural network processing device) may include a hardware structure specified for processing an artificial intelligence (AI) model. The AI model may be generated through machine learning. The learning may be performed by the electronic device 1101 performing the AI, and may be performed through an additional server (e.g., the server 1108). A learning algorithm may include, for example, a supervised learning algorithm, an unsupervised learning algorithm, a semi-supervised learning algorithm, or a reinforcement learning algorithm, but the disclosure is not limited thereto. The AI model may include a plurality of artificial neural network (ANN) layers. The ANN may include a deep neural network (DNN), a convolutional neural network (CNN), a recurrent neural network (RNN), a restricted Boltzman machine (RBM), a deep belief network (DBN), a bidirectional recurrent deep neural network (BRDNN), a deep Q-networks or the combination of the above networks, but the disclosure is not limited thereto. The AI model may additionally or alternatively include a software structure, in addition to a hardware structure.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by other component (e.g., the processor 1120) of the electronic device 1101, from the outside (e.g., a user) of the electronic device 1101. The input module 1150 may include, for example, a microphone, a mouse, a keyboard, a key (e.g., a button), or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record, and the receiver may be used for incoming calls. According to an embodiment of the disclosure, the receiver may be implemented as separate from, or as part of the speaker.

The display module 1160 may visually provide information to the outside (e.g., a user) of the electronic device 1101. The display module 1160 may include, for example, a display, a hologram device, or a projector and control circuitry to control a corresponding one of the displays, hologram device, and projector. According to an embodiment of the disclosure, the display module 1160 may include touch sensor adapted to detect a touch, or a pressure sensor adapted to measure the intensity of force incurred by the touch.

The audio module 1170 may convert a sound into an electrical signal and vice versa. According to an embodiment of the disclosure, the audio module 1170 may obtain the sound via the input module 1150, or output the sound via the sound output module 1155 or an external electronic device (e.g., the external electronic device 1102) (e.g., speaker of headphone) directly (e.g., by wire) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment of the disclosure, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the external electronic device 1102) directly (e.g., by wire) or wirelessly. According to an embodiment of the disclosure, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the external electronic device 1102). According to an embodiment of the disclosure, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 1179 may include, for example, a motor, a piezoelectric element, or an electric stimulator.

The camera module 1180 may capture a still image or moving images. According to an embodiment of the disclosure, the camera module 1180 may include one or more lenses, image sensors, image signal processors, or flashes.

The power management module 1188 may manage power supplied to the electronic device 1101. According to one embodiment of the disclosure, the power management module 1188 may be implemented as at least part of, for example, a power management integrated circuit (PMIC).

The battery 1189 may supply power to at least one component of the electronic device 1101. According to an embodiment of the disclosure, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the external electronic device 1102, the external electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment of the disclosure, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). The communication module according to an embodiment may communicate with the external electronic device via the first network 1198 (e.g., a short-range communication network, such as Bluetooth™, wireless-fidelity (WiFi) direct, or infrared data association (IrDA)) or the second network 1199 (e.g., a long-range communication network, such as a legacy cellular network, 5G network, next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify or authenticate the electronic device 1101 in a communication network, such as the first network 1198 or the second network 1199, using subscriber information (e.g., international mobile subscriber identity (IMSI)) stored in the subscriber identification module 1196.

The wireless communication module 1192 may support a 5G network and a next-generation communication technology, for example, a new radio (NR) access technology after a 4G network. The NR access technology may support high-speed transmission for high capacity data (enhanced mobile broadband; eMBB), terminal power minimizing and multiple terminal access (massive machine type communication; mMTC), or ultra-reliable and low-latency communications (URLLC). The wireless communication module 1192 may support a high-frequency band (e.g., mmWave band) to achieve, for example, a higher data rate. The wireless communication module 1192 may support various technologies, for example, beamforming, massive multiple-input and multiple-output (MIMO), Full-dimensional MIMO, an array antenna, analog beam-forming, or a large-scale antenna, to secure performance in high frequency bands. The wireless communication module 1192 may support various requirements defined in the electronic device 1101, the external electronic device (e.g., the external electronic device 1104) or the network system (e.g., the second network 1199). According to one embodiment of the disclosure, the wireless communication module 1192 may support a peak data rate (e.g., 20 Gbps or more) for eMBB realization, loss coverage (e.g., 164 dB or less) for mMTC realization, or U-plane latency (e.g., 0.5 ms or less, or the round trip of 1 ms or less in each of a downlink (DL) and an uplink (UL)) for URLCC realization.

The antenna module 1197 may transmit or receive a signal or power to or from the outside (e.g., the external electronic device) of the electronic device 1101. According to an embodiment of the disclosure, the antenna module 1197 may include an antenna including a radiating element including a conductive material or a conductive pattern formed in or on a substrate (e.g., PCB). According to an embodiment of the disclosure, the antenna module 1197 may include a plurality of antennas (e.g., an array antenna). In such a case, at least one antenna appropriate for a communication scheme used in the communication network, such as the first network 1198 or the second network 1199, may be selected, for example, by the communication module 1190 from the plurality of antennas. The signal or the power may then be transmitted or received between the communication module 1190 and the external electronic device via the selected at least one antenna. According to an embodiment of the disclosure, another component (e.g., a radio frequency integrated circuit (RFIC)) other than the radiating element may be additionally formed as part of the antenna module 1197.

According to various embodiments of the disclosure, the antenna module 1197 may form an mmWave antenna module. According to an embodiment of the disclosure, the mmWave antenna module may include a printed circuit board, an RFIC disposed on a first surface (e.g., a bottom surface) of the printed circuit board, or disposed adjacent to the first surface to support the specific high frequency band (e.g., mmWave band), and a plurality of antennas (e.g., an array antenna) disposed on a second surface (e.g., a top surface or a side surface) of the printed circuit board or disposed adjacent to the second surface to transmit or receive a signal having the specified high frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 1101 and the external electronic device 1104 via the server 1108 coupled with the second network 1199. Each of the external electronic devices 1102 or 1104 may be a device of a same type as, or a different type, from the electronic device 1101. According to an embodiment of the disclosure, all or some of operations to be executed at the electronic device 1101 may be executed at one or more of the external electronic devices 1102, 1104, or 1108. For example, when the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, mobile edge computing (MEC), or client-server computing technology may be used, for example. The electronic device 1101 may provide an ultra-latency service by using, for example, distributed computing or mobile edge computing. According to various embodiments of the disclosure, the external electronic device 1104 may include the Internet of things (IoT). The server 1108 may be an artificial server using machine learning and/or a neural network. According to an embodiment of the disclosure, the external electronic device 1104 or the server 1108 may be included in the second network 1199. The electronic device 1101 may be applied to an artificial intelligence service (e.g., a smart home, a smart city, a smart car, or healthcare service) based on the 5G communication technology and the IoT-related technology.

Figure 12:
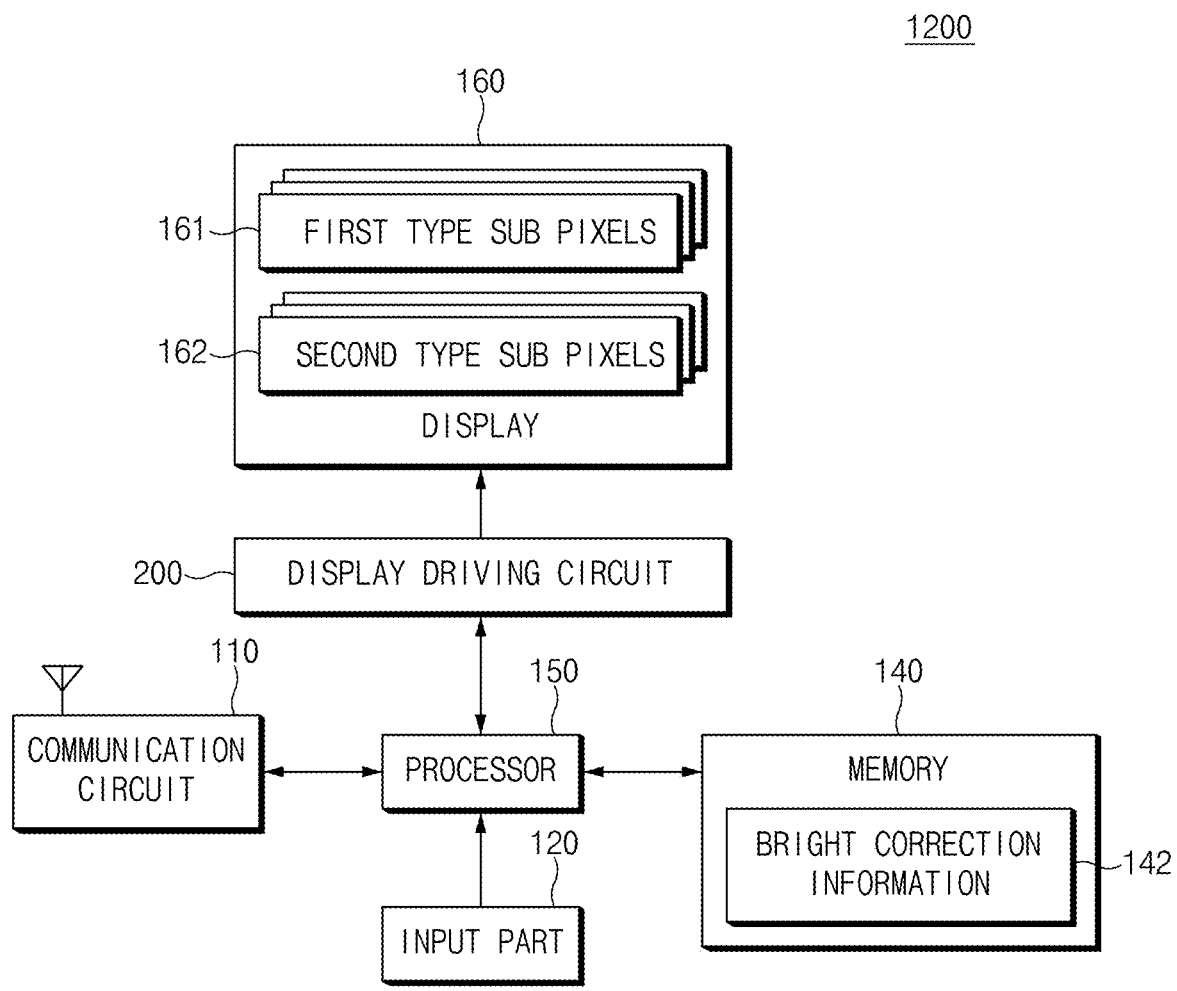
FIG. 12 is a view illustrating a configuration of an electronic device according to an embodiment of the disclosure.
Figure 13:
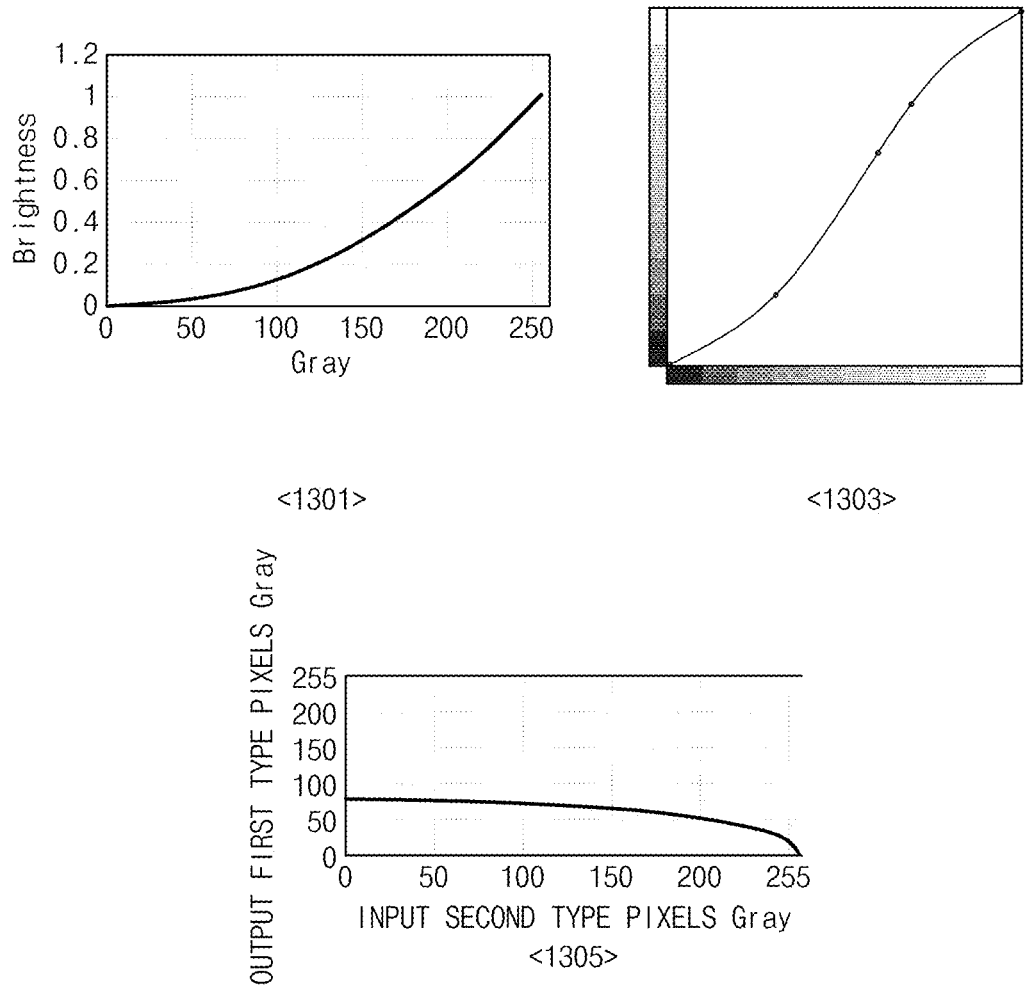
FIG. 13 is a view illustrating a relationship between brightness values and gradation values according to an embodiment of the disclosure.

FIG. 12 is a view illustrating a configuration of an electronic device according to an embodiment of the disclosure. FIG. 13 is a view illustrating a relationship between brightness values and gradation values according to an embodiment of the disclosure.

Referring to FIG. 12, an electronic device 1200 (or a display device) according to an embodiment may include a communication circuit 110, an input part 120, a memory 140, a display driving circuit 200 (a display driver IC (DDI)), a display 160 (or a display panel), and/or a processor 150. The above-described electronic device 1200 may include the same or similar configurations, except for the description of the configuration of the display driving circuit 200, the description of the information stored in the memory 140, and the description of the configuration of the processor 150 for controlling them, as compared with the electronic device described above in FIG. 1. For example, the display 160, the communication circuit 110, and the input part 120 included in the electronic device 1200 may have configurations that are the same as or similar to the configurations of the display 160, the communication circuit, and the input part that have been described in FIG. 1.

The display 160 may include a plurality of pixels, and each of the plurality of pixels may include RGB (red, green, blue) or RGGB (red, green 1, green 2, blue) sub pixels. The plurality of pixels may include a plurality of types of sub pixels described above in FIG. 1. According to an embodiment of the disclosure, the plurality of pixels may be used to provide various display driving schemes (e.g., a scheme of selectively driving at least one of first type sub pixels (wide sub pixels) having light irradiation characteristics of a first viewing angle and second type sub pixels (narrow sub pixels) having light irradiation characteristics of a second viewing angle). For example, the plurality of pixels may support an operation of a normal mode, in which a screen is constituted by operating the first type sub pixels and the second type sub pixels together, an operation of a first private mode (or a first narrow viewing angle mode), in which the screen is constituted by operating only the second type sub pixels, or a third private mode, in which a screen is constituted by operating some of the first type sub pixels while reducing the luminance or the second type sub pixels.

The memory 140 may store at least one of data, a program, or an application related to an operation of the electronic device 100. According to an embodiment of the disclosure, the memory 140, as described above in FIG. 1, may store set information related to the scheme of driving the display 160. According to various embodiments of the disclosure, the memory 140 of FIG. 1, which has been described above, may be disposed in an interior of the display driving circuit. According to various embodiments of the disclosure, the memory 140 may store brightness correction information 142 in relation to support of the third private mode. The brightness correction information 142 may include a brightness correction value of at least one first type pixel during an operation of constituting the screen based on the second type pixels. Alternatively, the brightness correction information 142 may include brightness values (or gradation values corresponding to brightness) that are to be output while the first type pixels included in the display 160 are operated in the third private mode.

According to an embodiment of the disclosure, the brightness correction information 142 may include a value (e.g., a brightness value or a gradation value) that is defined to show the same brightness as that of at least one of the second type pixels that are adjacent to the first type pixels at a specific viewing angle (e.g., a viewing angle, at which the display 160 is viewed at an angle that is inclined at a specific angle (e.g., 45 degrees) or more with respect to a direction that is perpendicular to the front surface of the display 160). According to various embodiments of the disclosure, when the first type pixels and the second type pixels of the display 160 are disposed alternately in a matrix form, four first type pixels may be disposed around a specific second type pixel with respect to the specific second type pixel. In this case, brightness correction information (or value) of the specific second type pixel may include information (e.g., a brightness value or a gradation value) that is set such that a sum of a brightness value (or an average brightness value of at least two first type pixels) of one of the first type pixels that are adjacent to each other (that share border lines that are proximate to each other in a diagonal direction, which are adjacent to a right side, a left side, an upper side, or a lower side of a field of view of the user who observes the display 160) and a brightness value of the second type pixels becomes a specific brightness.

The brightness correction information 142 may be written based on physical characteristics of the at least one display 160. In relation to writing of the brightness correction information 142, in a state, in which a specific screen is output with only the second type pixels disposed in the display 160 (e.g., the first type pixels are displayed at a specific gradation value—a gradation value corresponding to black, or turned off and a data signal and a gate signal are supplied only to the second type pixels), a gradation value 301 of the display 160 may be measured from the font side (e.g., a direction that is perpendicular to a surface of the display 160 or a direction that is perpendicular to a center point of the display 160 when it is assumed that the display 160 is flat) of the display 160 by busing measurement equipment. Then, the entire gradation value 301 of the display, which is measured through an operation of only the second type pixels may have an integer value of $2^n-1$ to 0 when a specific value (e.g., an image (or display data) expressed on the display 160) is expressed by n bits according to an output screen. As an example, when a value of n is 8, the gradation value may be a value between 255 and 0. A brightness value 302 corresponding to the entire gradation value on front surfaces of the second type pixels may correspond to Equation 10 as follows.

$$\text{Brightness} = \left(\frac{\text{Gray}}{n}\right)^\gamma \qquad \text{Equation 10}$$

The gamma (γ) value is a value for determining a correlation between the gradation level (gray level) of a signal input to the display 160 and a luminance of an image that is displayed on the screen, and the brightnesses of the input and the output may be the same when the gamma value is 1, the screen of the middle gradation and the low gradation may be expressed darker when the gamma value is larger than 1, and a value that represents a higher brightness may be shown when the gamma value is smaller than 1. The gamma (γ) value, for example, may be 2.2 with reference to a standard value of national television system committee (NTSC). A relationship between the brightness value 303 and the gradation (gray) value 301, for example, may have a change according to graph 1301 of FIG. 13. According to various embodiments of the disclosure, as illustrated in graph 1303 of FIG. 13, the relationship between the brightness and the gradation value may be defined as a curved in an S shape while deviating from the relationship between the brightness and the gradation values, which follows Equation 10 described above. In this case, a screen having a relatively high contrast as compared with 1301 of FIG. 13 may be output. According to various embodiments of the disclosure, in relation to writing of the brightness correction information 142, the brightness at a viewing angle that is inclined at a specific angle (e.g., 45 degrees) in a lateral direction of the display 160 with respect to the front surface of the display 160 for the screen including the second type pixels may be measured by using the same measurement equipment that is used to measure brightness from a front side. Based on the measured values, a brightness degradation value (e.g., N_ratio) at a specific angle with respect to the front surface of the display 160 may be calculated. The brightness degradation value may be a value that represents a ratio of a value measured on the front surface of the display 160 and a value measured at a specific angle. After experimentally acquiring the brightness degradation value (e.g., acquiring it through comparison of the brightness values measured on the front surface of the display 160 or at a specific angle by using the measurement equipment) or statistically acquiring it (e.g., experimentally acquiring it for the plurality of displays 160), the brightness value 303 at a specific angle (e.g., 45 degrees) with respect to the screen expressed by the second type pixels (e.g., a brightness value at a specific angle obtained by multiplying the brightness on the front surface of the screen expressed by the second type pixels by the brightness degradation value at the specific angle).

When the brightness value 303 of the second type pixels at a specific angle is calculated, the brightness value 304 of the first type pixels, which has to be compensated for at the specific angle, may be calculated based on a target brightness value (e.g., a brightness value that is to be provided to the front surface of the display 160 through operations of the first type pixels and the second type pixels, or T_brightness). The brightness value 304 of the first type pixels, which has to be compensated for, may be acquired by subtracting the brightness 303 of the second type pixels at the specific angle from the target brightness value T_brightness. In this regard, the entire gradation value of the screen of the display 160 may be set such that a sum of the brightness of the first type pixels and the brightness of the second type pixels at a specific angle are the same.

When the brightness value 304 of the first type pixels at the specific angle is calculated, a brightness 305 of the first type pixels on the front surface of the display 160 may be calculated. In this regard, by using the measurement equipment, the brightness of the entire front surface and the brightness value at the specific angle of the screen (e.g., the screen, in which the second type pixels are processed by a specific black gradation value or turned off) of the display 160 including only the first type pixels. A change rate (e.g., W_ratio) of the brightness of the first type pixels may be acquired based on the brightnesses of the first type pixels on the front surface and at the specific angle, which have been measured by using the measurement equipment. The brightness value 305 of the first type pixels on the front surface thereof may be calculated based on the change rate of the brightness of the first type pixels.

Based on the brightness value 305 of the first type pixels on the front surface thereof, a gradation value 306 of the first type pixels, which is to be changed, may be calculated through Equation 11 as follows.

$$Gradatioj \text{ value of first type pixels} = \frac{(\text{Brightness of first type pixels at specific angle})^{\frac{1}{2.2}}}{X_{n(bit \text{ value for expressing image})}}$$

Equation 11

The brightness correction information 142 (or a gradation transformation table), which is calculated according to the above description may include information as illustrated in Table 4 as follows.

TABLE 4

| | Second type pixels | | | First type pixels | | |
|---|---|---|---|---|---|---|
| | | | | Compensated | | |
| Gray 0 degrees | Brightness 0 degrees | Brightness 45 degrees | =>>> | brightness 45 degrees | Brightness 0 degrees | Gray 0 degrees |
| 301 | 302 | 303 | | 304 | 305 | 306 |
| 255 | 1.000 | 0.054 | | 0.000 | 0.000 | 0 |
| 254 | 0.991 | 0.053 | | 0.000 | 0.001 | 9 |
| 253 | 0.983 | 0.053 | | 0.001 | 0.001 | 12 |
| ... | ... | ... | | ... | ... | ... |
| 205 | 0.619 | 0.033 | | 0.021 | 0.027 | 49 |
| 204 | 0.612 | 0.033 | | 0.021 | 0.027 | 50 |
| 203 | 0.605 | 0.033 | | 0.021 | 0.028 | 50 |
| 202 | 0.599 | 0.032 | | 0.022 | 0.028 | 50 |
| ... | ... | ... | | ... | ... | ... |
| 188 | 0.511 | 0.028 | | 0.026 | 0.035 | 55 |
| 187 | 0.505 | 0.027 | | 0.027 | 0.035 | 56 |
| 186 | 0.500 | 0.027 | | 0.027 | 0.035 | 56 |
| 185 | 0.494 | 0.027 | | 0.027 | 0.036 | 56 |
| ... | ... | ... | | ... | ... | ... |
| 43 | 0.020 | 0.001 | | 0.053 | 0.069 | 76 |
| 42 | 0.019 | 0.001 | | 0.053 | 0.069 | 76 |
| 41 | 0.018 | 0.001 | | 0.053 | 0.069 | 76 |
| 40 | 0.017 | 0.001 | | 0.053 | 0.069 | 76 |
| 39 | 0.016 | 0.001 | | 0.053 | 0.070 | 76 |
| 38 | 0.015 | 0.001 | | 0.053 | 0.070 | 76 |
| 15 | 0.002 | 0.000 | | 0.054 | 0.071 | 76 |
| ... | ... | ... | | ... | ... | ... |
| 13 | 0.001 | 0.000 | | 0.054 | 0.071 | 76 |
| ... | ... | ... | | ... | ... | ... |
| 3 | 0.000 | 0.000 | | 0.054 | 0.071 | 76 |
| 2 | 0.000 | 0.000 | | 0.054 | 0.071 | 76 |
| 1 | 0.000 | 0.000 | | 0.054 | 0.071 | 76 |
| 0 | 0.000 | 0.000 | | 0.054 | 0.071 | 76 |

The gradation values that are to be applied to the first type pixels illustrated in Table 4 may correspond to the values of graph 1305 of FIG. 13. Graph 1305 illustrates output gradations that are to be applied to the first type pixels for the gradation values according to a specific target brightness value (e.g., a value obtained by setting an average brightness value of the adjacent first type pixels is set to 76 when the maximum gradation of the second type pixels is 255—for example, the gradation value of the adjacent first type pixels is set to 0 and the average brightness value of the first type pixels and the second type pixels is set to 76 when the gradation value of the second type pixels is 255). Meanwhile, in relation to the above-described calculation of the brightness correction information 142, the measure of calculating the gradation value 306 of the first type pixels through estimation 304 of the gradation value 301 of the second type pixels, the brightness value of the second type pixels on the front surface, the brightness 303 of the second type pixels at a specific angle, and the brightness of the first type pixels at a specific angle has been described, but the disclosure is not limited thereto. For example, at least a portion of the brightness correction information 142 may be fixed to an arbitrary specific value (e.g., a specific ratio value with reference to a gradation value that is to be displayed on the second type pixels) according to the characteristics of the display 160 or may be determined according to graphs by experimental and statistical materials. As described above, in the description, the brightness correction information 142 may be specific gradation values for lowering the brightness of the first type pixels such that the brightness at a specific angle or on a side surface thereof is implemented similarly to the screen implemented by only the second type pixels while the brightness and the contrast on the entire front surface of the display 160 are improved as compared with the screen implemented by only the second type pixels by lowering the brightness of the first type pixels in a process of operating the private mode constituted by the second type pixels. The processor 150 may perform delivery and signal processing of data related to an operation of the electronic device 100. According to an embodiment of the disclosure, the processor 150 may perform an operation that is the same as or similar to the operation of the processor 150, which has been described above in FIG. 1. According to various embodiments of the disclosure, the processor 150 may perform a control related to performance of at least one of the normal mode, and the first to third private modes.

In relation to the performance of the third private mode, the processor 150 may identify whether execution of a specific application is requested or a specific user function related to the electronic device 100 is executed. Alternatively, the processor 150 may identify execution of a function or an application corresponding to a security level mapped in relation to the performance of the third private mode. When an event related to the performance of the third private mode occurs, the processor 150 may correct display data (e.g., a gradation value) of the first type pixels based on the brightness correction information 141 stored in the memory 140, and then may deliver the corrected display data to the display driving circuit 200. According to various embodiments of the disclosure, when the event related to the performance of the third private mode, the processor 150 may deliver the brightness correction information 142 stored in the memory 140 to the display driving circuit 200. According to various embodiments of the disclosure, when a user input related to the execution of the third private mode occurs or a driving scheme related to the driving of the third private mode is determined according to the kinds of the contents or application that is executed, the driving of the pixels may be controlled by the display driving circuit 200 in correspondence to the control of the processor 150.

The display driving circuit 200 may be disposed between the processor 150 and the display 160, and may store and process the display data delivered by the processor 150 and output them on the display 160. According to an embodiment of the disclosure, the display driving circuit 200 may receive the display data, to which the correction of the gradation value of the first type pixels are applied, from the processor 150 in relation to the display of the screen based on the third private mode, and may output the received display data on the display 160. According to various embodiments of the disclosure, the display driving circuit 200 may receive the brightness correction information 142 from the processor 150. When the processor 150 receives display data that are to be output on the display 160, the display driving circuit 200 may perform correction of the gradation values of, among the received display data, the data (or display data) of the first type pixels, to which the brightness correction information 142 is to be applied, and then may deliver the data of the first type pixels and the data of the second type pixels, to which the correction of the gradation values has been applied, to the display 160.

Figure 14:
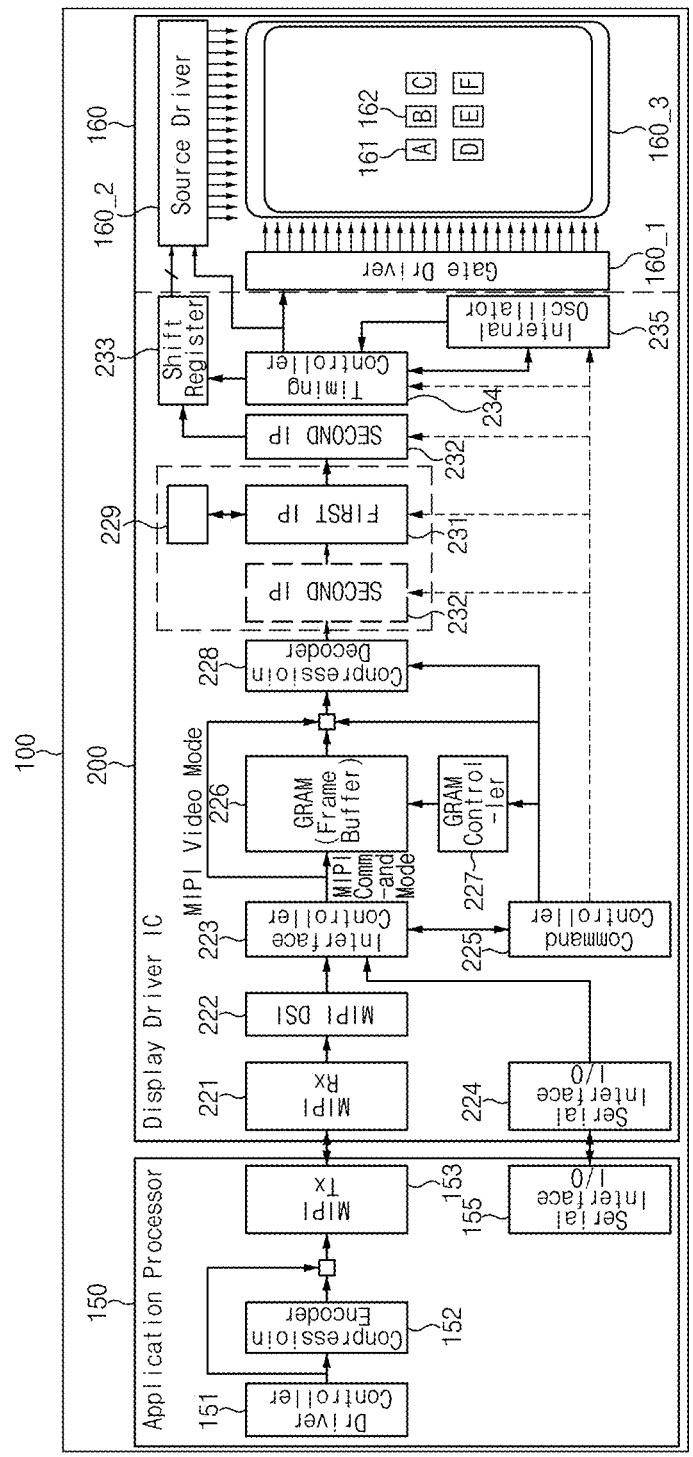
FIG. 14 is a view illustrating some configurations of an electronic device related to support of a private mode according to an embodiment of the disclosure.

FIG. 14 is a view illustrating some configurations of an electronic device related to support of a private mode according to an embodiment of the disclosure.

Referring to FIG. 14, the electronic device 100 according to an embodiment may include the processor 150, the display driving circuit 200 (a display driver IC (DDI), and the display 160. The display 160 may include a display panel 160_3 including a gate driver 160_1, a source driver 160_2, a plurality of first type pixels 161, and a plurality of second type pixels 162.

The processor 150 (e.g., an application processor, a communication processor, a sensor hub, and a touch screen panel IC (TSP IC) may generate display data related to a configuration of the screen, and may provide the generated display data (e.g., data that constitute the screen including at least one of an image or a text) to the display driving circuit 200. For example, the processor 150 may encode or compress the display data in a specific scheme, and may provide them to the display driving circuit 200. In this regard, the processor 150 may include a display controller 151 (or a driver controller), a compression encoder 152, an internal signal transmission interface 153 (e.g., a mobile industry processor interface (MIPI) Tx), and a first serial interface 155.

The display controller 151 may receive data from a central processing unit (GPU)/graphic processing unit (GPU). The display controller 151 may generate the display data that are to be delivered to the display driving circuit 200 based on the data received from the CPU/GPU.

The compression encoder 152 may encode the display data generated by the display controller in a specific scheme (e.g., a display stream compression (DSC) scheme determined by VESA). Through this, the display data generated by the display controller 151 may be compressed and the size of the data may be reduced. For example, the size of the display data generated by the display controller 151 may be reduced to 1/n through the encoding by the compression encoder 152. According to various embodiments of the disclosure, the compression encoder 152 may be omitted. For example, the display data may be delivered to the display driving circuit 200 without any compression process.

The internal signal transmission interface 153 may deliver the display data encoded by the compression encoder 152 to the display driving circuit 200. The internal signal transmission interface 153, for example, may include a mobile industry processor interface (MIPI).

The first serial interface 155 may deliver a control signal related to control of the display driving circuit 200 to the display driving circuit 200. For example, when a touch input signal is received from the touch circuit, the first serial interface 155 may deliver the received touch input signal to the display driving circuit 200.

According to various embodiments of the disclosure, the processor 150 may collect an event signal (or a message) (e.g., a signal that instructs execution of the normal mode, and the first to third private mode) related to an operation of the display 160, and may deliver the collected sensor signal to the display driving circuit 200 through the first serial interface 155.

The display driving circuit 200 may calculate and apply color deformation values of the display data according to settings and may output them on the display 160 (e.g., the display panel 160_3). According to an embodiment of the disclosure, the display driving circuit 200 may include an internal signal reception interface 221 (e.g., an MIPI Rx), an MIPI display serial interface (MIPI DSI) 222, an interface controller 223, a second serial interface 224, a command controller 225, a first memory 226 (GRAM), a memory controller 227, a compression decoder 228, a second memory 229 (SPSRAM), a first internal processing module 231 (or a processing circuit), a second internal processing module 232 (or a processing circuit), a shift register 223, a display timing controller 234, and an internal oscillator 235. According to various embodiments of the disclosure, at least some of the configurations included in the display driving circuit 200 may be excluded (e.g., excluded when the corresponding electronic device 100 is designed not to support the function corresponding to the corresponding configuration) or may be disposed in the processor 150 (designed such that the function corresponding to the corresponding configuration is supported but is processed by the processor 150).

The internal signal reception interface 221 may perform communication with the processor 150, and may receive control information and display data from the processor 150. The internal signal reception interface 221, for example, may include an MIPI signal reception circuit. When the internal signal reception interface 221 receives control information (e.g., information that instructs performance of at least one of the normal mode, and the first to third private modes) and display data through the internal signal transmission interface 153 (the MIPI signal transmission circuit) of the processor 150, it may deliver it to the interface controller 223 through the MIPI DSI 222. The MIPI DSI 222 is a configuration that may be added when the internal signal reception interface 221 is designed to process the data in the MIPI scheme, and may be omitted or replaced by another configuration when the internal signal transmission interface 153 and the internal signal reception interface 221 are changed.

The interface controller 223 may receive the display data and/or the control information from the processor 150 (or the second serial interface 224 and/or the MIPI DIS 222). The interface controller 223 may deliver the received display data to the memory controller 227. The interface controller 223 may deliver the received control information to the command controller 225. According to an embodiment of the disclosure, the interface controller 223 may receive the control information related to the performance of the mode through the second serial interface 224. For example, the interface controller 223 may receive the control information related to the performance of the third private mode through the second serial interface 224, and may deliver the corresponding information to the command controller 225.

The memory controller 227 may write the display data received from the interface controller 223 in the first memory 226. For example, the memory controller 227 may write the corresponding display data in the first memory 226 according to a frame rate of the display data that are to be delivered by the processor 150.

The first memory 226 may include a graphic RAM (GRAM). The first memory 226 may store the display data that have been delivered by the memory controller 227. The stored display data may include display data that are compressed by the processor 150 or are not compressed. The first memory 226 may include a memory space corresponding to a resolution and/or the number of color gradations of the display panel 160_3. The first memory 226 may include a frame buffer or a line buffer. The display data corresponding to a location of the display panel 160_3, at which they are output, may be written in the first memory 226. For example, the display data delivered to the first type pixels and the display data delivered to the second type pixels may be written in the memory 226. In this regard, the display data stored in the memory 226 may include coordinate values that are to be displayed in the display areas of the display 160 or the sequence of the display data may correspond to the coordinate that is to be displayed on the display 160.

The command controller 225 may control the display timing controller 234 such that corresponding color deformation values are applied to the display data stored in the memory 226 and are output in a specific area of the display panel 160_3. The command controller 225 may be referenced as control logic. According to various embodiments of the disclosure, the command controller 225 may deliver according to which mode (e.g., the normal mode, the first private mode, the second private mode, or the third private mode) the display data stored in the memory 226 are to be processed to the first internal processing module 231. For example, when receiving control information that instructs performance of the third private mode from the processor 150, the command controller 225 may deliver the control information to the first internal processing module 231 such that the brightness correction information 142 is applied to the display data stored in the memory 226. According to various embodiments of the disclosure, the command controller 225 may generate a control signal for controlling at least one of the compression decoder 228, the first internal processing module 231 (or the first processor), the second internal processing module 232 (or the second processor), the internal oscillator 235, and the timing controller 234, and may supply the generated control signal to the corresponding configuration (e.g., at least one of the compression decoder 228, the first internal processing module 231, the second internal processing module 232, the internal oscillator 235, and the timing controller 234).

The compression decoder 228 may decode at least some of the display data read from the first memory 226 when the at least some display data are encoded, and may deliver the decoded data to the display timing controller 234. For example, when the size of the display data is compressed to 1/n by the compression encoder 152 of the processor 150, the compressor decoder 228 may decompress the at least some display data and store them to the display data before the compression. The first internal processing module 231 and the second internal processing module 232 (e.g., an up-scaler and/or an image pre-processing part) may be disposed between the compression decoder 228 and the display timing controller 234. According to various embodiments of the disclosure, when at least some display data selected by the command controller 225 are not encoded, the compression decoder 228 may be omitted or bypassed.

The first internal processing module 231 may perform display data processing according to an operation of the normal mode or the private mode. For example, when the normal mode is set (when control information (or signal) that instructs performance of the normal mode is received from the processor 150 or the normal mode is set as a basic function), the first internal processing module 231 may bypass the display data read from the first memory 226 while not performing separate data processing of them and may deliver the display data to the second internal processing module 232.

According to various embodiments of the disclosure, when, among the private modes, the first private mode is set (when control information (or signal) that instructs performance of the first private mode is received from the processor 150), the first internal processing module 231 may deliver, among the display data read from the first memory 226, only the display data related to the second type pixels to the second internal processing module 232. In this operation, the first internal processing module 231 may determine to which type pixels the data are to be delivered, based on the coordinate value or sequence value of the display data. According to various embodiments of the disclosure, the first internal processing module 231 may deliver the display data set such that the first type pixels are displayed at a specific color gradation (e.g., a black gradation) during an operation of the first private mode to the second internal processing module 232.

According to various embodiments of the disclosure, when, among the private modes, the third private mode is set (when control information (or signal) that instructs performance of the third private mode is received from the processor 150), the first internal processing module 231 may deliver the display data read from the first memory 226, and may deliver the display data corrected based on the brightness correction information 142 in relation to the first type pixels to the second internal processing module 232. In this regard, the first internal processing module 231 may acquire the brightness correction information 142 from the second memory 229. According to various embodiments of the disclosure, the first internal processing module 231 may acquire the brightness correction information 142 from the first memory 226. In this regard, at least a portion of the first memory 1226 may store the brightness correction information 142 temporarily or semi-permanently. When the brightness correction information 142 is stored in the memory 226, the second memory 229 may be omitted.

When the electronic device 100 is booted or a state of the display is changed from a turn-off state to a turn-on state, the display driving circuit 200 may receive the brightness correction information 142 from the processor 150 and may store it in the second memory 229 in advance. Alternatively, the brightness correction information 142 may be written in the second memory 229 in a process of manufacturing the electronic device 100 (or a process of manufacturing the display driving circuit 200). When the brightness correction information 142 is stored in the second memory 229 in advance, the memory 140 described above in FIG. 12 may be designed not to store separate brightness correction information 142. The brightness correction information 142, as described above, may include gradation values for adjusting (e.g., lowering) the brightness of the display data that are to be output on the first type pixels to a predefined target brightness.

The second internal processing module 232 may be implemented by a scaler or a hardware processor that may process an image pre-processing function, or may be provided in a form of a software block to be loaded in the display driving circuit 200. The second internal processing module 232 may perform an up-scaler function of enlarging the decompressed image at a specific ratio. According to an embodiment of the disclosure, the second internal processing module 232 may enlarge the corresponding display data when it is necessary to enlarge the display data according to the size of the display data that are to be output on the display panel 160_3 or setting by the user. The enlarged display data may be delivered to the display timing controller 234. When it is not necessary to enlarge at least some of the display data, the up-scaler function of the second internal processing module 232 may be omitted or bypassed. The second internal processing module 232 may perform a pre-processing function of improving a screen quality of the display data. The second internal processing module 232, for example, may include a pixel data processing circuit, a pre-processing circuit, land a gating circuit. The second internal processing module 232, for example, may be disposed on a front side of the first internal processing module or may be disposed on a rear side thereof due to an aspect of a data processing process.

The display timing controller 234 may control timings of the configurations included in the display driving circuit 200. For example, the display timing controller 234 may process a timing, at which the display data received from the processor 150 are stored in the first memory 226, and a timing, at which the display data stored in the first memory 226 are read, such that they do not overlap each other by adjusting them. The display timing controller 234 may control a timing of, at which, after the display data stored in the first memory 226 is read a frame rate in correspondence to the control of the command controller 225, delivering the timing to the compression decoder 228, the first internal processing module 231, and the second internal processing module 232.

The display timing controller 234 may deliver the display data received from the second internal processing module 232 (or the first internal processing module 231) in correspondence to the control of the command controller 225 to the source driver 160_2, and may control output of a gate signal of the gate driver 160_1. According to an embodiment of the disclosure, the display timing controller 234 may be included in the command controller 225 to be implemented. The display timing controller 234 may convert the display data received from the first memory 226 or the second memory 229 through the second internal processing module 232 to an image signal, and may supply the image signal to the source driver 160_2 and the gate driver 160_1 of the display panel 160_3.

The shift register 233 may receive the data processed by the second internal processing module 232, and may deliver the received data to the source driver 160_2 according to a control of the display timing controller 234. The internal oscillator 235 may generate a timing signal that is necessary for an operation of the display timing controller 234, and may deliver the generated timing signal to the display timing controller 234.

The display 160, as described above, may include the source driver 160_2, the gate driver 160_1, and the display panel 160_3. Additionally, the display 160 may further include a touch panel and a touch IC related to a user input, a pressure sensor and a pressure sensor IC, and a digitizer.

The display panel 160_3 may display various pieces of information (information including at least one of multimedia data or text data) to the user. The display panel 160_3, for example, may include a liquid crystal display (LCD) panel or an active matrix organic light emitting diode (AM-OLED) panel. The display panel 160_3 may be implemented to be, for example, flexible, transparent, or wearable. Furthermore, the display panel 160_3, for example, may be included in a cover of a case that is electrically coupled to the electronic device 100.

The display panel 160_3 may receive an image signal corresponding to the display data from the display driving circuit 200, and may display a screen according to the display data. A plurality of data lines and a plurality of gate lines cross each other in the display panel 160_3, and a plurality of pixels may be disposed in the crossing area. When the display panel 160_3 corresponds to an OLED panel, each of the plurality of pixels may include at least one switching element (e.g., FET) and one OLED. Each pixel may receive an image signal and the like from the display driving circuit 200 at a specific timing and may generate light. The display panel 160_3, for example, may have a specific resolution (e.g., 1536 (horizontal)×2152 (vertical)).

The source driver 160_2 and the gate driver 160_2 may generate signals that are supplied to a scan line and a data line (not illustrated) of the display panel 160_3, based on a source control signal and a gate control signal received from the display timing controller 234, respectively.

Figure 15:
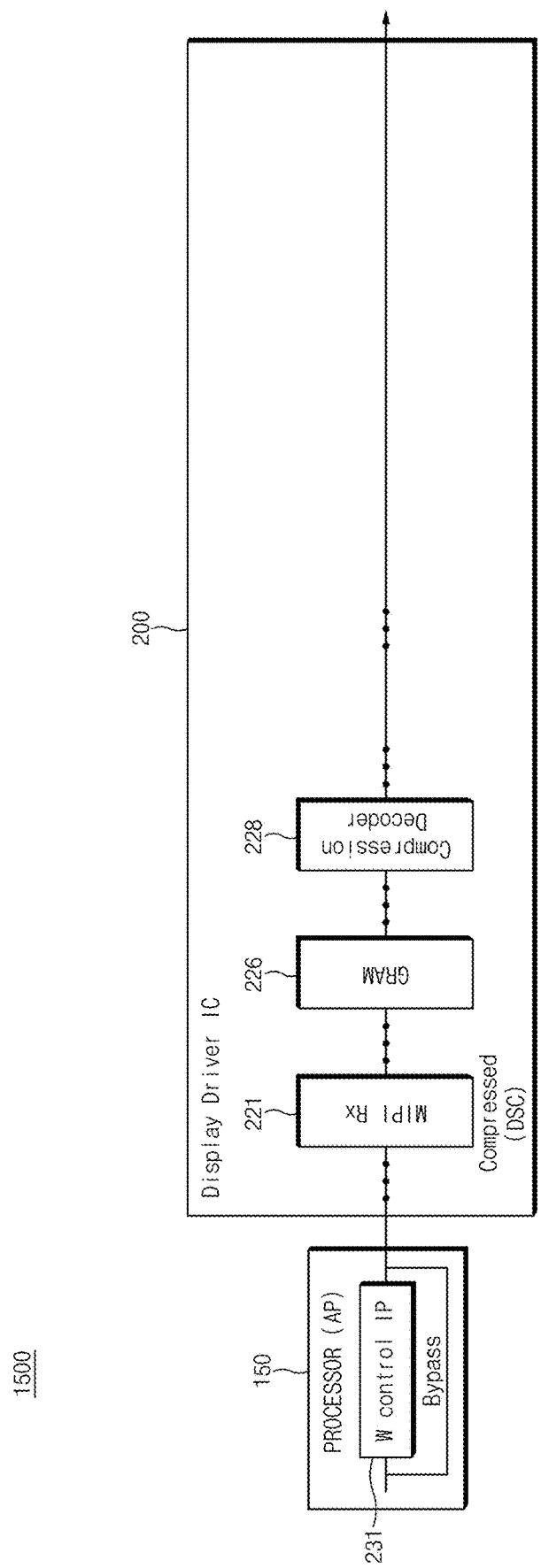
FIG. 15 is a view illustrating a configuration of an electronic device having a stripe pixel structure according to an embodiment of the disclosure.

FIG. 15 is a view illustrating a configuration of an electronic device having a stripe pixel structure according to an embodiment of the disclosure.

Referring to FIG. 15, although the structure, in which the processing module related to the operation of the third private mode is disposed in the display driving circuit 200, has been described above in FIG. 14, the disclosure is not limited thereto. For example, an electric device 1500 having a stripe pixel structure, as illustrated in FIG. 15, may include the processor 150 and the display driving circuit 200, and the processing module 231 that processes the display data in relation to the operation of the third private mode may be disposed in an interior of the processor 150. In an operation of the normal mode, the processing module 231 may bypass the display data received from a GPU and may deliver the display data to the display driving circuit 200. According to various embodiments of the disclosure, in an operation of the first private mode, the processing module 231 may deliver the display data that are to be delivered to the second type pixels to the display driving circuit 200 after bypassing them, and may deliver the display data that are to be delivered to the first type pixels after deleting them or replacing them with a specific gradation (e.g., a black gradation).

According to various embodiments of the disclosure, in an operation of the third private mode, the processing module 231 may deliver the display data that are to be delivered to the second type pixels after bypassing them, and may convert the gradation of the display data that are to be delivered to the first type pixels to a gradation corresponding to a specific target brightness (a brightness obtained by reducing a sum of the brightnesses of the first type pixels band the second type pixels that are adjacent to the first type pixels to a specific brightness value) based on the brightness correction information 1432 stored in the memory 140.

According to various embodiments of the disclosure, regardless of the size of the gradation value of the display data, the first private mode may include a driving scheme of supplying the gradation value corresponding to a black gradation or 0 to the first type pixels, and the third private mode may include a driving scheme of reducing the gradation value at a specific ratio in proportion to the size of the gradation value of the display data that are to be supplied to the first type pixels and supplying the reduced gradation value to the first type pixels. Accordingly, in the first private mode, a specific gradation value (e.g., a gradation value of 0, the same low gradation value according to necessities) may be supplied regardless of the gradation value of the display data that are to be supplied to the first type pixels, and in the third private mode, another gradation value that is reduced at a specific ratio according to the size of the gradation value of the display data that are to be supplied to the first type pixels is provided by the processing module 231 and the display data of the reduced gradation value may be supplied to the first type pixels.

The display driving circuit 200 may deliver the display data received from the processor 150 after performing at least one of storing, compressing, and scaling the display data. Although it is illustrated that the display driving circuit 200 includes the internal signal reception interface 221, the first memory 226, and the compression decoder 228, the disclosure is not limited thereto. For example, the display driving circuit 200 may include at least some of the remaining configurations of the display driving circuit 200, which have been described above in FIG. 4, except for the first internal processing module 231 and the second memory 229.

Figure 16:
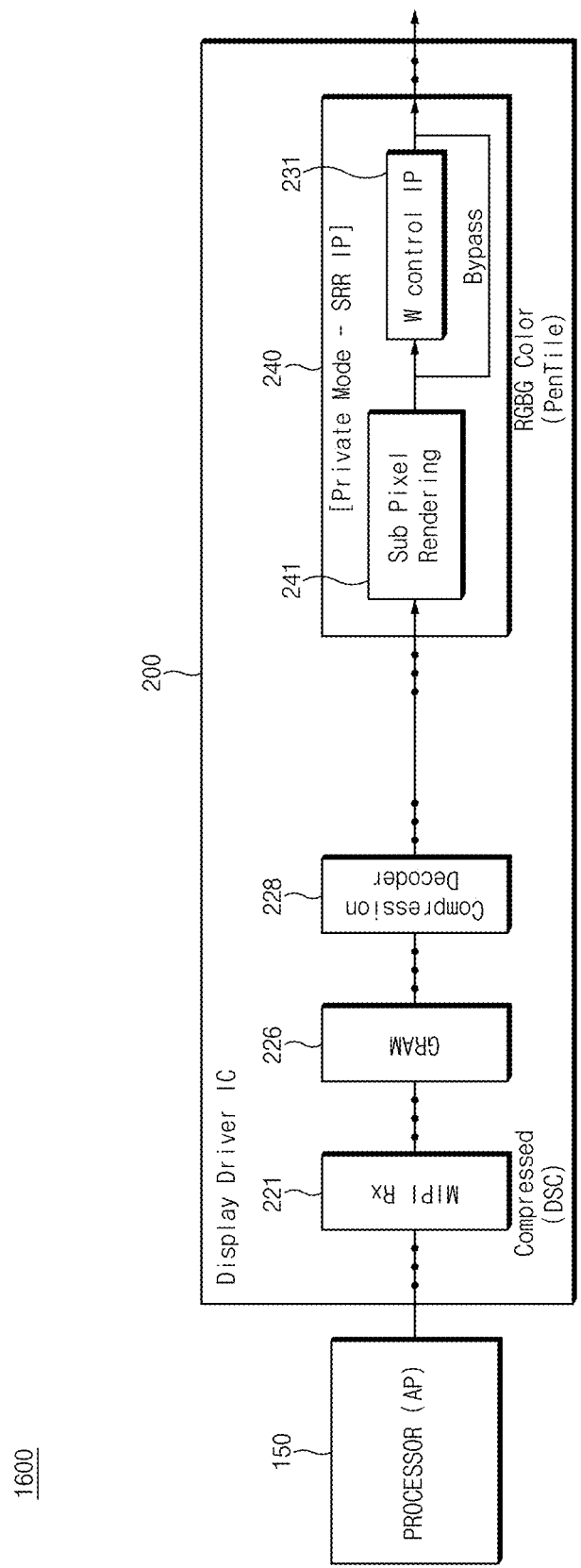
FIG. 16 is a view illustrating a configuration of an electronic device having a pen tile pixel structure according to an embodiment of the disclosure.

FIG. 16 is a view illustrating a configuration of an electronic device having a pen tile pixel structure according to an embodiment of the disclosure.

Referring to FIG. 16, the electronic device 100 and 1500 described above in FIGS. 14 and 15 is a description of an example of the display driving circuit 200 that may be applied when the pixel structure of the display panel 160_3 is a stripe pixel structure (e.g., a repeated pattern structure of RGB). Meanwhile, in the electronic device 1600 having a pen tile pixel structure, as illustrated in FIG. 16, the processing module related to performance of the third private mode may be disposed in an interior of the display driving circuit 200 together with the processing module related to driving of the pen tile pixels.

For example, the electronic device 1600 may include the processor 150 and the display driving circuit 200. The processor 150 may implement a configuration and an operation that is similar to that of the processor 150 described above in FIG. 14. The display driving circuit 200, for example, may at least include the internal signal reception interface 221, the first memory 226, and the compression decoder 228, and may include the processing module 240 for supporting the support mode. At least a portion of the processing module 240 for supporting the private mode may be implemented by hardware or implemented by a software module to be uploaded in a logic circuit of the display driving circuit 200. The processing module 240 for supporting the private mode, for example, may include a pen tile sub pixel rendering module 241 (or a rendering circuit) and the processing module 231 that supports processing of the private mode. The pen tile sub pixel rendering module 241 may render the display data that are to be delivered to the pen tile type sub pixels when the display 160 is of a pen tile type. The processing module 231 may identify, among the rendering data received from the pen tile sub pixel rendering module 241, the rendering data that are to be output on the first type pixels, and may deliver the gradation value to the display 160 after reducing the gradation value at a specific ratio based on the brightness correction information 142. In this regard, the display driving circuit 200 may further include a second memory that stores the brightness correction information 142.

Figure 17:
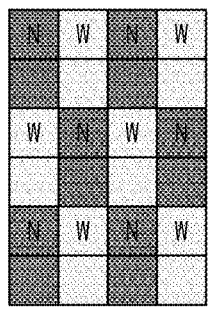
FIG. 17 is a view related to comparison of brightness of a screen according to application of a normal mode and a private mode in a specific high gradation according to an embodiment of the disclosure.
Figure 17:
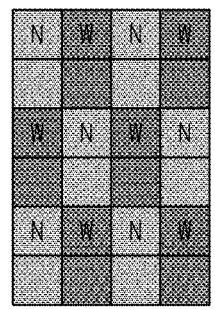
Figure 17:
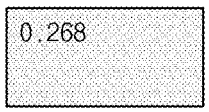
Figure 17:
Figure 17:
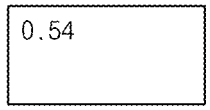
Figure 17:
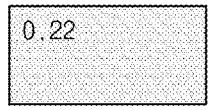
Figure 17:
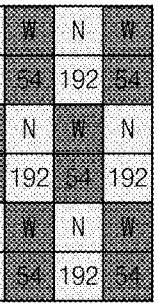
Figure 17:
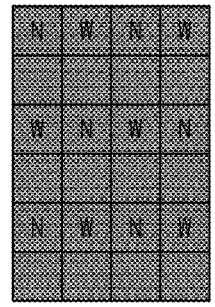
Figure 17:
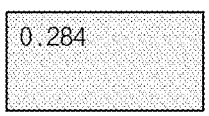
Figure 17:
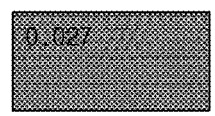
Figure 18:
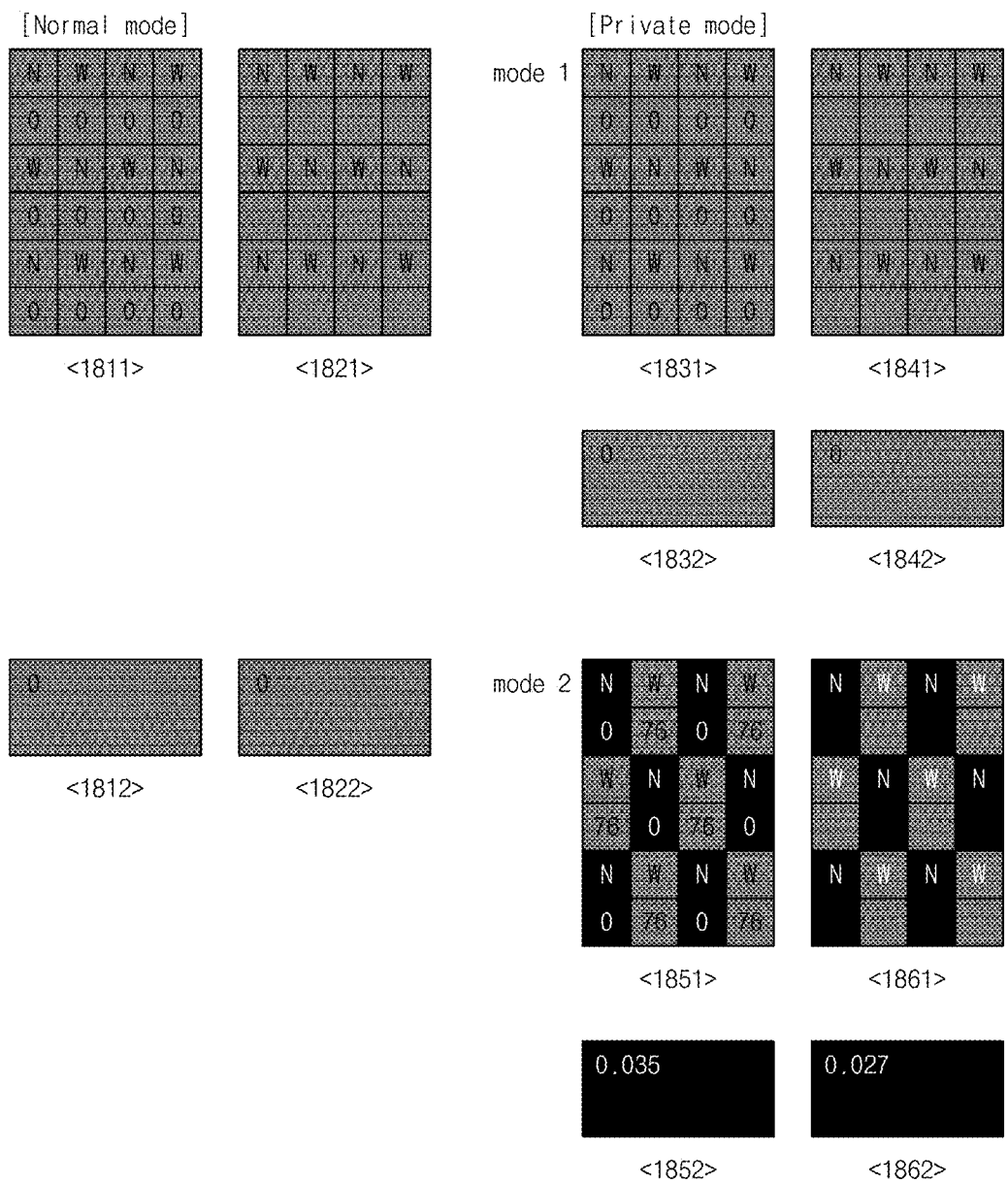
FIG. 18 is a view related to comparison of brightness of a screen according to application of a normal mode and a private mode in a specific low gradation according to an embodiment of the disclosure.

FIG. 17 is a view related to comparison of brightness of a screen according to application of a normal mode and a private mode in a specific high gradation according to an embodiment of the disclosure. FIG. 18 is a view related to comparison of brightness of a screen according to application of a normal mode and a private mode in a specific low gradation according to an embodiment of the disclosure.

Referring to FIGS. 1 and 17, in a situation, in which the display 160 is operated in the normal mode, as in state 1711, the display data that are to be supplied to the first type pixels "W" and the second type pixels "N" may include the same gradation value, for example, a gradation value of 192. The display data indicated by state 1711 may be set to be supplied to at least a partial area of the display 160. According to an embodiment of the disclosure, when the display data corresponding to state 1711 are supplied to the display 160, the brightness value on the front surface of the display 160, as in state 1712, may be observed to be 0.54 that is an average brightness value of the first type pixels "W" and the second type pixels "N" due to the brightness difference between the first type pixels "W" and the second type pixels "N".

According to various embodiments of the disclosure, in an environment, in which the gradation values (e.g., a gradation value of 192) of the display data in state 1711 are supplied to the first type pixels "W" and the second type pixels "N", when an angle, at which the display 160 is viewed, is a specific angle (e.g., 45 degrees) that is larger than 0 degrees (an angle that is perpendicular to the front surface of the display 160), as in state 1721, the brightness degradation values (the specific angle brightness degradation value N_ratio of the second type pixels that has been described above and a specific angle brightness degradation value W_ratio of the second type pixels) of the pixels may be applied. As the brightness degradation value is applied, a brightness value (or an average brightness value of the display 160 at a specific angle) of the display 160 at the specific angle, as in state 1722, may be a value of 0.22 (a value obtained by applying the brightness degradation value according to the specific angle to the pixels).

According to various embodiments of the disclosure, in an operation of the first private mode (mode 1), as in state 1731, a gradation value of 0 may be supplied to the first type pixels "W" (or the first type pixels "W" are turned off), and a gradation value of 192 may be supplied to the second type pixels "N". When the display data corresponding to state 1731 are supplied to the display 160, the brightness value on the front surface of the display 160 including the first type pixels "W" and the second type pixels "N" may be observed to be 0.268 that is an average brightness value as in state 1732.

According to various embodiments of the disclosure, when an angle, at which the display 160, to which the display data in state 1731 are supplied, is viewed, is a specific angle (e.g., 45 degrees) that is larger than 0 degrees (an angle that is perpendicular to the front surface of the display 160), as in state 1741, the brightness degradation values (the specific angle brightness degradation value N_ratio of the second type pixels that has been described above and a specific angle brightness degradation value W_ratio of the second type pixels) of the pixels may be applied. Here, as the gradation value of 0 is applied to the first type pixels "W", the brightness degradation value may be applied to only the second type pixels. As the brightness degradation value is applied, a brightness value (or an average brightness value of the display 160 at a specific angle) of the display 160 at the specific angle, as in state 1742, may be a value of 0.014 (a value obtained by applying the brightness degradation value according to the specific angle to the second type pixels).

According to various embodiments of the disclosure, in an operation of the third private mode (mode 3), as in state 1751, the display data that are to be supplied to the first type pixels "W" and the second type pixels "N" may have different gradation values, for example, such that a gradation value of 54 (a value selected in correspondence to the second type pixels "W" based on the brightness correction information 142) may be supplied to the first type pixels "W" and a gradation value of 912 may be supplied to the second type pixels "N". When the display data corresponding to state 1751 are supplied to the display 160, the brightness value on the front surface of the display 160 including the first type pixels "W" and the second type pixels "N" may be observed to be 0.284 that is an average brightness value as in state 1732. In this way, the average brightness value in an operation of the third private mode may have a brightness value that is higher than that of the first private mode.

According to various embodiments of the disclosure, when an angle, at which the display 160, to which the display data in state 1751 are supplied, is viewed, is a specific angle (e.g., 45 degrees) that is larger than 0 degrees (an angle that is perpendicular to the front surface of the display 160), as in state 1761, the brightness degradation values (the specific angle brightness degradation value N_ratio of the second type pixels that has been described above and a specific angle brightness degradation value W_ratio of the second type pixels) of the pixels may be applied. Here, because the brightness degradation value W_ratio of the first type pixels, which has been described above, is applied to the first type pixels "W", to which, among the gradation values of the display data, a gradation value of 54 is applied, and the brightness gradation value N_ratio of the second type pixels, which has been described above, is applied to the second type pixels "N", to which a gradation value of 192 is applied, the brightness value (or the average brightness value of the display 160 at the specific angle) of the display 160, as in state 1762, may be a value of 0.027 (a value obtained by applying the brightness degradation value according to the specific angle is applied to the second type pixels). The average value of the display 160 at the specific angle is a value that is higher than that of the first private mode, but may be a value, by which it is difficult to recognize the screen.

Referring to FIGS. 1 and 18, in a situation, in which the display 160 is operated in the normal mode, as in state 1811, the display data that are to be supplied to the first type pixels "W" and the second type pixels "N" may include the same gradation value, for example, a gradation value of 0. The display data having a gradation value of 0, which have been described in state 1811, may be set to be supplied to at least a partial area of the display 160. According to an embodiment of the disclosure, when the display data corresponding to state 1811 are supplied to the display 160, as in state 1812, 0 that is the average brightness value of the first type pixels "W" and the second type pixels "N" may be observed.

According to various embodiments of the disclosure, in an environment, in which the gradation values (e.g., a gradation value of 0) of the display data in state 1811 are supplied to the first type pixels "W" and the second type pixels "N", when an angle, at which the display 160 is viewed, is a specific angle (e.g., 45 degrees) that is larger than 0 degrees (an angle that is perpendicular to the front surface of the display 160), as in state 1821, the brightness degradation values (the specific angle brightness degradation value N_ratio of the second type pixels that has been described above and a specific angle brightness degradation value W_ratio of the second type pixels) of the pixels may be applied. As the brightness degradation value is applied, a brightness value (or an average brightness value of the display 160 at a specific angle) of the display 160 at the specific angle, as in state 1822, may be a gradation value of 0 (a value obtained by applying the brightness degradation value according to the specific angle to the pixels).

According to various embodiments of the disclosure, in an operation of the first private mode (mode 1), as in state 1831, a gradation value of 0 may be supplied to the first type pixels "W" (or the first type pixels "W" are turned off) and a gradation value of 0 also may be supplied to the second type pixels whereby the brightness value of the display 160 including the first type pixels "W" and the second type pixels "N" on the front surface thereof may be observed to be a gradation value of 0 that is an average brightness value as in state 1832.

According to various embodiments of the disclosure, when an angle, at which the display 160, to which the display data in state 1831 are supplied, is viewed, is a specific angle (e.g., 45 degrees) that is larger than 0 degrees (an angle that is perpendicular to the front surface of the display 160), as in state 1841, the brightness degradation values (the specific angle brightness degradation value N_ratio of the second type pixels that has been described above and a specific angle brightness degradation value W_ratio of the second type pixels) of the pixels may be applied. Here, because a gradation value of 0 is applied to all of the first type pixels "W" and the second type pixels "N", the brightness value (or the average brightness value of the display 160 at the specific angle) of the display 160 at the specific angle may be a value of 0 (a value obtained by applying the brightness degradation value according to the specific angle to the second type pixels) as in state 1842 even after the brightness degradation value is applied.

According to various embodiments of the disclosure, in an operation of the third private mode (mode 3), as in state 1851, when a gradation value of 0 is supplied to the second type pixels "N", a gradation value of 76 (a value selected in correspondence to the second type pixels "W" based on the brightness correction information 142) may be supplied to the first type pixels "W". For example, the display data of a specific gradation (e.g., a gradation, by which the average brightness value with the adjacent second type pixels "N" is expressed by a specific gradation value, and is a predefined value as in Table 4 that has been described above) may be supplied to the first type pixels "W" such that the screen is expressed by the target brightness value even when the display data corresponding to the gradation value of 0 are supplied to the second type pixels "N".

When the display data corresponding to state 1851 are supplied to the display 160, the brightness value on the front surface of the display 160 including the first type pixels "W" and the second type pixels "N" may be observed to be 0.035 that is an average brightness value as in state 1852. In this way, the average brightness value in an operation of the third private mode may have a targeted specific brightness value.

According to various embodiments of the disclosure, when an angle, at which the display 160, to which the display data in state 1851 are supplied, is viewed, is a specific angle (e.g., 45 degrees) that is larger than 0 degrees (an angle that is perpendicular to the front surface of the display 160), as in state 1861, the brightness degradation values (the specific angle brightness degradation value N_ratio of the second type pixels that has been described above and a specific angle brightness degradation value W_ratio of the second type pixels) of the pixels may be applied. Here, because the brightness degradation value W_ratio of the first type pixels, which has been described above, is applied to the first type pixels "W", to which, among the gradation values of the display data, a gradation value of 76 is applied, and the brightness gradation value N_ratio of the second type pixels, which has been described above, is applied to the second type pixels "N", to which a gradation value of 0 is applied, the brightness value (or the average brightness value of the display 160 at the specific angle) of the display 160, as in state 1862, may be a value of 0.027 (a value obtained by applying the brightness degradation value according to the specific angle is applied to the first type pixels and the second type pixels). The average value of the display 160 at the specific angle is a value that is higher than that of the first private mode, but may be a value, by which it is difficult to recognize the screen on a side surface thereof.

Figure 19:
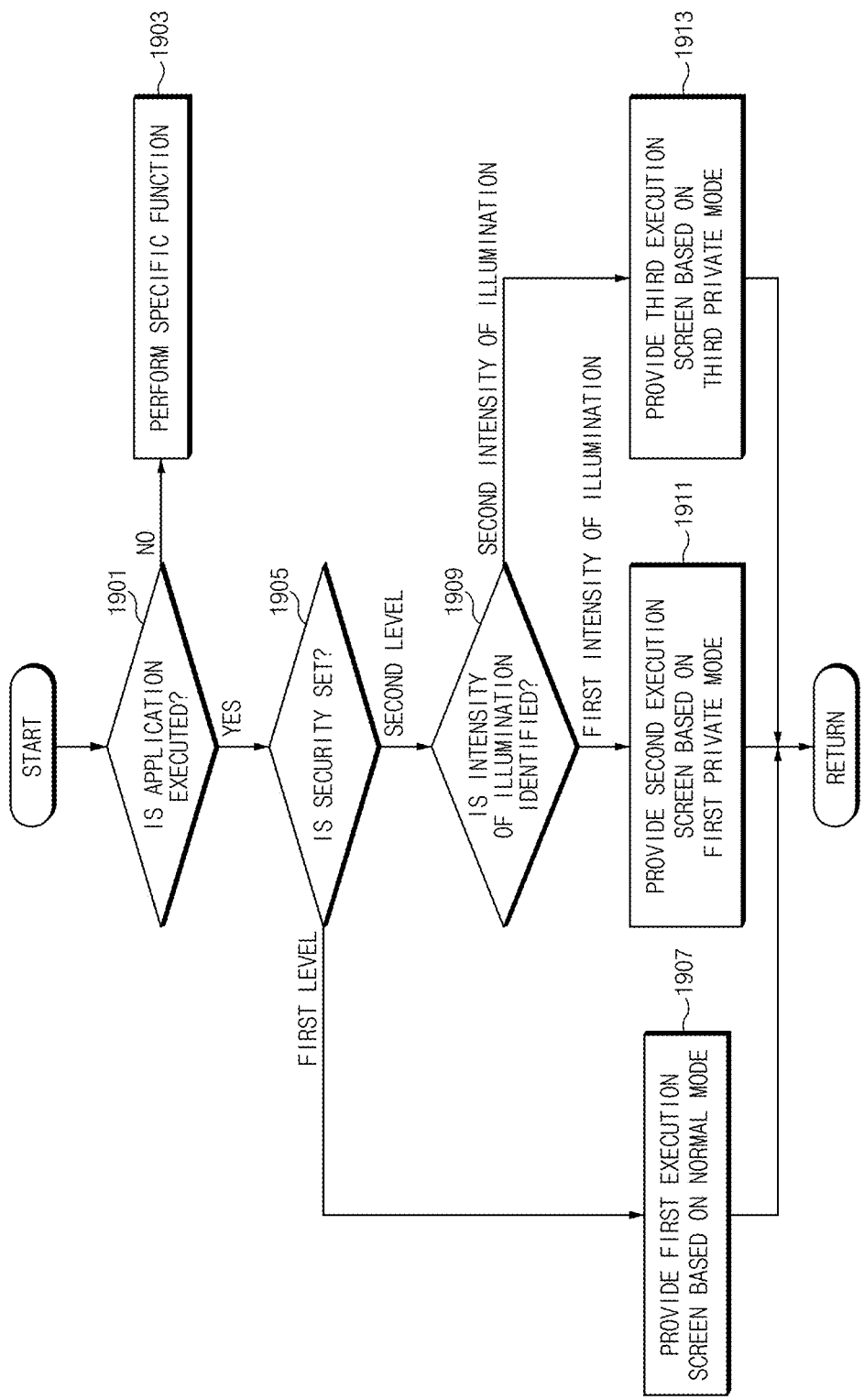
FIG. 19 is a view illustrating a method for operating an electronic device according to an embodiment of the disclosure.

FIG. 19 is a view illustrating a method for operating an electronic device according to an embodiment of the disclosure.

Referring to FIG. 19, in relation to a method for operating an electronic device according to an embodiment of the disclosure, the processor 150 (or the display driving circuit 200, hereinafter will be described with reference to the processor 150) of the electronic device 100, 1500, or 1600 may identify whether an event for converting a screen display mode occurs. For example, the processor 150, as an example of converting the screen display mode, may identify whether execution of an application is requested. According to various embodiments of the disclosure, the processor 150 may identify whether the state of the display is changed from a turn-off state to a turn-on state or the state of the electronic device 100, 1500, or 1600 is changed from a turn-off state to a turn-on state, or whether a specific system message (a message that is delivered as a residual charge of the battery is decreased to a specific value or less or a message that is delivered as a specific security related event occurs) related to a change of the screen is received. Alternatively, the processor 150 may identify whether a user input for converting the screen display mode of the display 160 is made, a specific voice instruction is received, or a user gesture occurs (e.g., a touch gesture or when the electronic device 100, 1500, or 1600 is shaken in a specific direction while being gripped, or a specific operation is performed).

If it is determined in operation 1901 that there is no request for execution of a separate application, the processor 150 may perform a control to perform a specific function defined in advance in operation 1903. For example, the processor 150 may maintain a current state of the electronic device 100, or may change a state of the display 160 from a turn-on state to a turn-off state or maintain the previous state (e.g., a turn-off state).

When an event related to the request for execution of the application, in operation 1905, it may be identified whether a security is set in relation to execution of the corresponding application. In relation, the electronic device 100 may store information related to setting of a security for applications to manage the information. Alternatively, the security setting information for the applications may be included in the application (or the application information), and it may be identified whether a security is set, through identification of the application, in an application executing process.

When the security setting is of a predefined first level (or is of a relatively low level), in operation 1907, the processor 150 may provide a first execution screen based on the normal mode. For example, the processor 150 may turn on all of the first type pixels 160*a* (or the modified first type pixels 160*c*) and the second type pixels 160*b* (or the third type pixels 160*d*) and output the first execution screen according to execution of the application.

When the security setting is of a predefined second level (e.g., a second level having a security grade that is higher than the first level), in operation 1909, the processor 150 may identify an external illumination value.

When the external illumination value is a first illumination value (or is lower than the first illumination value), in operation 1911, the processor 150 may provide a second execution screen based on the first private mode. For example, the processor 150 may turn on, among the pixels, the second type pixels 160*b* (or the third type pixels 160*d*), and may turn on all of the first type pixels 160*a* to output a second execution screen according to the execution of the application.

When the external illumination value is the second illumination value (or a value that is higher than the first illumination value), in operation 1913, the processor 150 may provide the third execution screen based on the third private mode. For example, the processor 150, as described above in FIGS. 12 to 18, the gradation value corresponding to the display data that are to be output may be applied to the second type pixels (e.g., 160*b*, 160*d*, or "N"), and a specific gradation value may be applied to the first type pixels (e.g., 160*a* or "W") such that a predefined target brightness value is obtained in correspondence to the gradation value that is to be output on the second type pixels. The third execution screen may be displayed brighter than the second execution screen in the first private mode (or a screen having a higher luminance may be displayed) in the first private mode. The execution screen output in the third private mode has a brightness that is the same as or similar to the execution screen that is output in the second private mode (e.g., the first type pixels are turned on or turned off at random or turned on or turned off in a matrix form) that has been described above, a performance of the private mode may be provided. In this operation, because the third private mode has a uniform turn-on state, a life span performance of the pixels may be improved as compared with an operation of the second private mode.

Thereafter, when an input for requesting ending of the execution screen is made, an application ending screen may be output, and is branched to a standby screen or a previous execution screen. When the standby screen is output, the standby screen may be output (e.g., the screen is output in a state, in which all of the first type pixels 160*a* or "W" and the second type pixels 160*b* or "N" are turned on) based on the normal mode. In the previous execution screen, the pixels may be controlled to be operated according to any one of the normal mode, the first private mode, or the third private mode according to the characteristics of the previous execution screen.

According to various embodiments of the disclosure, an electronic device according to an embodiment may include a display including a plurality of pixels, and a processor that drive the display, the plurality of pixels may include first type pixels including first type sub pixels that are observed at a first viewing angle in a first direction, and second type pixels including second type sub pixels that are observed at a second viewing angle that is narrower than the first viewing angle in the first direction, and the processor may be configured to drive the first type pixels that are adjacent to the second type pixels with second gradation values that are lower than the first gradation values while the second type pixels are driven with the first gradation values corresponding to the data in a private mode.

According to various embodiments of the disclosure, the processor may be configured to supply the second gradation values based on brightness correction information such that an average brightness of the first type pixels and the second type pixels that are adjacent to the first type pixels becomes a predefined target brightness value.

According to various embodiments of the disclosure, the processor may be configured to identify setting of a security related to execution of an application when a request for execution of the application is received, output the screen by turning on the first type pixels and the second type pixels when the setting of the security is of a predefined first level, and drive the first type pixels with the second gradation values and drive the second type pixels with the first gradation values when the setting of the security is of a second level that is lower than the predefined first level.

According to various embodiments of the disclosure, the processor may be configured to identify the setting of the security related to execution of an application when a request for execution of the application is received, output the screen by turning on the first type pixels and the second type pixels when the setting of the security is of a predefined first level, identify an external intensity of illumination when the setting of the security is of a second level that is higher than the first level, supply a gradation value of 0 to the first type pixels and driving the second type pixels with the first gradation value when the external intensity of illumination is less than a first illumination intensity, and drive the second type pixels with the first gradation value while supplying the second gradation value to the first type pixels.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., by wire), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments of the disclosure as set forth herein may be implemented as software (e.g., the program 1140) including one or more instructions that are stored in a storage medium (e.g., an internal memory 1136 or an external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities and some of multiple entities may be separately disposed on the other components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display including a plurality of pixels;
memory, comprising one or more non-transitory storage media, storing instructions; and
one or more processors communicatively coupled to the memory and the display,
wherein the instructions, when executed by the one or more processors individually or collectively, cause the electronic device to drive the display,
wherein the plurality of pixels includes:
first type pixels including first type sub pixels that are observed at a first viewing angle in a first direction, and
second type pixels including second type sub pixels that are observed at a second viewing angle that is narrower than the first viewing angle in the first direction, and
wherein the instructions, when executed by the one or more processors individually or collectively, further cause the electronic device to:
control turn-on ratios of the first type pixels and the second type pixels in a first group including a portion of the plurality of pixels differently from turn-on ratios of the first type pixels and the second type pixels in a second group including another portion of the plurality of pixels different from the first group in response to gradation values of partial areas of contents, while at least part of sub pixels including the first group is turned-on and at least part of sub pixels including the second group is turned-on in the partial areas of contents,
drive the first type pixels that are adjacent to the second type pixels with second gradation values that are lower than first gradation values while the second type pixels are driven with the first gradation values corresponding to data in a private mode.

2. The electronic device of claim 1, wherein the instructions, when executed by the one or more processors individually or collectively, further cause the electronic device to:
supply the second gradation values based on brightness correction information such that an average brightness of the first type pixels and the second type pixels that are adjacent to the first type pixels becomes a predefined target brightness value.

3. The electronic device of claim 1, wherein the instructions, when executed by the one or more processors individually or collectively, further cause the electronic device to:
output a screen by turning on the first type pixels and the second type pixels when a setting of security is of a predefined first level, and
drive the first type pixels with the second gradation values and drive the second type pixels with the first gradation values when the setting of the security is of a second level that is lower than the predefined first level.

4. The electronic device of claim 3, wherein the instructions, when executed by the one or more processors individually or collectively, further cause the electronic device to:
output the screen by turning on the first type pixels and the second type pixels when the setting of the security is of the predefined first level,
identify an external intensity of illumination when the setting of the security is of a second level that is higher than the predefined first level,
supply a gradation value of 0 to the first type pixels and driving the second type pixels with the first gradation values when the external intensity of illumination is less than a first illumination intensity, and drive the second type pixels with the first gradation values while supplying the second gradation values to the first type pixels.

5. An electronic device comprising:

a display including a plurality of pixels;

memory, comprising one or more non-transitory storage media, storing instructions; and one or more processors communicatively coupled to the display and the memory, wherein the instructions, when executed by the one or more processors individually or collectively, cause the electronic device to drive the display, wherein each of the plurality of pixels includes:

a plurality of sub pixels, wherein the plurality of sub pixels include:

first type pixels including first type sub pixels observed at a first viewing angle, and second type pixels being adjacent to the first type pixels and including second type sub pixels observed at a second viewing angle that is smaller than the first viewing angle, wherein the instructions, when executed by the one or more processors individually or collectively, further cause the electronic device to:

display a content by a plurality of groups including at least one pixel of the first type pixels and at least one pixel of the second type pixels, wherein the plurality of groups includes at least a first group and a second group, and wherein the instructions, when executed by the one or more processors individually or collectively, further cause the electronic device to control turn-on ratios of the first type pixels and the second type pixels in the first group differently from turn-on ratios of the first type pixels and the second type pixels in the second group different from the first group in response to gradation values of partial areas of contents, in related to display of the content, while at least part of sub pixels including the first group is turned-on and at least part of sub pixels including the second group is tuned-on in the partial areas of contents.

6. The electronic device of claim 5, wherein the instructions, when executed by the one or more processors individually or collectively, further cause the electronic device to:

turn on only the second type pixels when gradation values of partial areas of contents displayed by at least one of the plurality of groups are a maximum value.

7. The electronic device of claim 5, wherein the instructions, when executed by the one or more processors individually or collectively, further cause the electronic device to:

set the turn-on ratios of the second type pixels to be higher when the gradation values of the partial areas of the contents displayed by at least one of the plurality of groups are relatively high.

8. The electronic device of claim 5, wherein the instructions, when executed by the one or more processors individually or collectively, further cause the electronic device to:

set the turn-on ratios of the second type pixels to be lower when the gradation values of the partial areas of the contents displayed by at least one of the plurality of groups are relatively low.

9. The electronic device of claim 5, wherein the instructions, when executed by the one or more processors individually or collectively, further cause the electronic device to:

classify region of an interest (ROI) area and a background area of the contents, when a luminance of the ROI area is lower than a luminance of the background area, set the turn-on ratios of the first type pixels in pixel groups disposed in the ROI area to be higher, and set the turn-on ratios of the first type pixels in pixel groups disposed in the background area to be lower.

10. The electronic device of claim 9, wherein the instructions, when executed by the one or more processors individually or collectively, further cause the electronic device to:

when a text is displayed in the ROI area, set the turn-on ratios of the first type pixels in pixel groups disposed in an area, in which the text is displayed, to be lower, and set the turn-on ratios of the first type pixels in pixel groups disposed in an ROI background area around the text to be higher.

11. The electronic device of claim 5, wherein the instructions, when executed by the one or more processors individually or collectively, further cause the electronic device to:

make grouping sizes of the first type pixels and the second type pixels different according to a kind of an application, make grouping sizes of the first type pixels and the second type pixels, which correspond to a size of an object or a background included in the contents, different, or make grouping sizes of the first type pixels and the second type pixels different according to a change in contents.

12. The electronic device of claim 5, further comprising:

first shield members disposed between a periphery of the first type pixels and the first type sub pixels, wherein the first shield members comprise black matrices.

13. A method for driving pixels of a display, wherein the display includes:

first type pixels including first type sub pixels observed at a first viewing angle, and second type pixels being adjacent to the first type pixels and including second type sub pixels observed at a second viewing angle that is smaller than the first viewing angle, wherein the method comprises:

receiving a request for execution of an application, and in response to the request for execution of the application, displaying a content by a plurality of groups including at least one pixel of the first type pixels and at least one pixel of the second type pixels, wherein the plurality of groups includes at least a first group and a second group, and wherein the displaying the content comprises:

controlling turn-on ratios of the first type pixels and the second type pixels in the first group differently from the turn-on ratios of the first type pixels and the second type pixels in the second group that is different from the first group in response to gradation values of partial areas of the content, while at least part of sub pixels including the first group is turned-on and at least part of sub pixels including the second group is turned-on in the partial areas of contents.

14. The method of claim 13, wherein the controlling includes:
turning on only the second type pixels when gradation values of partial areas of contents displayed by at least one of the plurality of groups are a maximum value.

15. The method of claim 13, wherein the controlling includes:
turning on a larger number of the second type pixels than the first type pixels to be higher when gradation values of partial areas of contents displayed by at least one of the plurality of groups are relatively high, or
turning on a larger number of the first type pixels than the second type pixels when gradation values of partial areas of contents displayed by at least one of the plurality of groups are relatively low.

16. The method of claim 13, further comprising:
classifying a region of an interest (ROI) area and a background area of the contents,
wherein the performing of the control includes:
turning on a larger number of the first type pixels in pixel groups disposed in the ROI area and turning on a smaller number of the first type pixels in pixel groups disposed in the background area when a luminance of the ROI area is lower than a luminance of the background area.

17. The method of claim 16, wherein the controlling includes:
turning on a smaller number of the first type pixels in the pixel groups disposed in an area, in which a text is displayed, and
turning on a larger number of the first type pixels in the pixel groups disposed in an ROI background area around the text when the text is displayed in the ROI area.

18. The method of claim 13, further comprising:
making grouping sizes of the first type pixels and the second type pixels different according to a change in the contents.

19. The method of claim 13, further comprising:
identifying setting of security of the application;
turning on all of the first type pixels and the second type pixels and displaying the contents when the setting of security of the application is relatively low; and
turning on at least some of the second type pixels and displaying the contents when the setting of security of the application is relatively high.

20. The method of claim 13, further comprising at least one of:
identifying setting of security of the application;
identifying setting of a brightness related to execution of the application when the setting of security of the application is relatively high;
turning off the first type pixels, turning on at least some of the second type pixels, and displaying the contents when the setting of the brightness is relatively lower; or
turning on some of the first type pixels and at least some of the second type pixels and displaying the contents when the setting of the brightness is relatively high.

21. An electronic device comprising:
a display including a plurality of pixels;
memory, comprising one or more non-transitory storage media, storing instructions; and
one or more processors communicatively coupled to the display and the memory,
wherein the instructions, when executed by the one or more processors individually or collectively, cause the electronic device to drive the display,
wherein each of the plurality of pixels includes:
a plurality of sub pixels,
wherein the plurality of sub pixels include:
first type pixels including first type sub pixels observed at a first viewing angle, and second type pixels being adjacent to the first type pixels and including second type sub pixels observed at a second viewing angle that is smaller than the first viewing angle,
wherein the instructions, when executed by the one or more processors individually or collectively, further cause the electronic device to:
display a content by a plurality of groups including at least one pixel of the first type pixels and at least one pixel of the second type pixels, wherein the plurality of groups includes at least a first group and a second group, and
wherein the instructions, when executed by the one or more processors individually or collectively, further cause the electronic device to control contrast ratio of the first group differently from contrast ratio of the second group different from the first group in response to gradation values of partial areas of contents, in related to display of the content, while at least part of sub pixels including the first group is turned-on and at least part of sub pixels including the second group is turned-on in the partial areas of contents.

* * * * *